United States Patent
Park et al.

(10) Patent No.: US 10,110,758 B2
(45) Date of Patent: Oct. 23, 2018

(54) DISPLAY DEVICE, DISPLAY CONTROL METHOD, AND COMPUTER-READABLE RECORDING MEDIUM

(71) Applicant: S-PRINTING SOLUTION CO., LTD., Suwon-si, Gyeonggi-do (RE)

(72) Inventors: Yong-shik Park, Yongin-si (KR); Eun-bit Kwak, Suwon-si (KR); Ho-jun Jang, Seongnam-si (KR); Song-baik Jin, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 15/038,610

(22) PCT Filed: Oct. 2, 2014

(86) PCT No.: PCT/KR2014/009292
§ 371 (c)(1),
(2) Date: May 23, 2016

(87) PCT Pub. No.: WO2015/080374
PCT Pub. Date: Jun. 4, 2015

(65) Prior Publication Data
US 2016/0295035 A1    Oct. 6, 2016

(30) Foreign Application Priority Data

Nov. 26, 2013 (KR) .......... 10-2013-0144377
Nov. 26, 2013 (KR) .......... 10-2013-0144380
Aug. 18, 2014 (KR) .......... 10-2014-0106901

(51) Int. Cl.
*H04N 1/00* (2006.01)
*H04N 1/407* (2006.01)
*H04N 1/409* (2006.01)

(52) U.S. Cl.
CPC ..... *H04N 1/00177* (2013.01); *H04N 1/00161* (2013.01); *H04N 1/00167* (2013.01); *H04N 1/00183* (2013.01); *H04N 1/00188* (2013.01)

(58) Field of Classification Search
CPC .......... H04N 1/00177; H04N 1/00161; H04N 1/00167; H04N 1/00188
USPC .............................. 358/3.27, 1.15, 527, 504
See application file for complete search history.

(56) References Cited

U.S. PATENT DOCUMENTS

| | | |
|---|---|---|
| 2003/0156200 A1* | 8/2003 | Romano ............ H04N 1/00278 348/207.99 |
| 2008/0266239 A1 | 10/2008 | Iwamoto |
| 2009/0027413 A1 | 1/2009 | Pyo |
| 2010/0103444 A1* | 4/2010 | Farrell ............. G06F 3/1205 358/1.15 |
| 2011/0200317 A1 | 8/2011 | Ichikawa |

FOREIGN PATENT DOCUMENTS

| | | |
|---|---|---|
| EP | 1309187 | 5/2003 |
| EP | 1321923 | 6/2003 |

* cited by examiner

*Primary Examiner* — Quang N Vo
(74) *Attorney, Agent, or Firm* — Staas & Halsey LLP

(57) ABSTRACT

A display apparatus includes: a display for displaying an image; a detector for detecting an exposure speed of a portable image-forming device which exposes an instant film to light using light from a screen displayed on the display; and an image processor for adjusting brightness of the image displayed on the display depending on the detected exposure speed.

16 Claims, 74 Drawing Sheets

(a)  (b)

DISPLAY DEVICE, DISPLAY CONTROL METHOD, AND COMPUTER-READABLE RECORDING MEDIUM

CROSS-REFERENCE TO RELATED APPLICATIONS

This application is a U.S. national stage application of International Application No. PCT/KR2014/009292 filed Oct. 2, 2014, and claims the priority benefit of Korean Application No. 10-2013-0144380, filed Nov. 26, 2013 in the Korean Intellectual Property Office, Korean Application No. 10-2013-0144377, filed Nov. 26, 2013 in the Korean Intellectual Property Office, and Korean Application No. 10-2014-0106901, filed Aug. 18, 2014 in the Korean Intellectual Property Office, the disclosures of which are incorporated herein by reference.

BACKGROUND

1. Field

The following description relates to a display device, a display control method, and a computer-readable recording medium, and more particularly, to a display device capable of enhancing an image quality of a portable image-forming device printing an image displayed on a screen of the display device on an instant film, a display control method, and a computer-readable recording medium.

2. Description of the Related Art

Generally, an instant camera has an instant film embedded therein and performs exposure and development processing on the embedded instant film after photographing to discharge the instant film to the outside of the camera, thereby acquiring the printed photograph on the spot.

The existing instant camera needs to maintain a wide interval between a lens and the instant film, and therefore the entire volume of the instant camera is increased, such that the instant camera is hard to carry.

Furthermore, the existing instant camera may not output an image stored in a memory of the portable display device.

Meanwhile, a digital still camera or a small portable photo printer using an instant film which is being released these days may be connected to the portable display device through a cable to receive and output an image. In this case, to output a photograph, the digital still camera or the small portable photo printer needs a separate cable and therefore may be inconvenient to use.

Furthermore, the digital still camera or the small portable photo printer is operated (operated for exposure and development) by being supplied with power, and therefore needs to include a charging battery for supplying power to the device. Therefore, when the charging battery is discharged, the digital still camera or the small portable photo printer may not print a photograph.

SUMMARY

Additional aspects and/or advantages will be set forth in part in the description which follows and, in part, will be apparent from the description, or may be learned by practice of the disclosure.

The present disclosure provides a display device capable of enhancing an image quality of a portable image-forming device printing an image displayed on a screen of the display device on an instant film, a display control method, and a computer-readable recording medium.

The present disclosure also provides a portable image-forming device that may be simple in a structure and may be manufactured at a small size and low costs by printing an image displayed on a screen of a display device by using a user's manipulation and an instant film as provided.

An object of the present disclosure is to provide a display device capable of enhancing an image quality of a portable image-forming device printing an image displayed on a screen of the display device on an instant film, a display control method, and a computer-readable recording medium.

According to an aspect of the present disclosure, a display device includes: a display for displaying an image; a detector for detecting an exposure speed of a portable image-forming device which exposes an instant film to light using light from a screen displayed on the display; and an image processor for adjusting brightness of the image displayed on the display depending on the detected exposure speed.

The portable image-forming device may include a touch sensor moving to correspond to an exposure position, the display may be a touch screen which detects a position on the display of the touch sensor, and the detector may detect the exposure speed depending on the position on the touch screen of the touch sensor.

The image processor may adjust the brightness of the image in real time depending on the exposure speed detected in real time.

The display device may further include: an imager photographing the exposure position of the portable image-forming device, in which the detector may detect the exposure speed depending on the photographed exposure position.

The display device may further include: a storage for storing the detected exposure speed, in which the image processor may adjust the brightness of the image depending on the exposure speed stored in the storage.

The portable image-forming device may use an exposure member manually driven to expose the instant film.

The image processor may adjust the brightness value of the image to provide the same light quantity at each exposure position of the portable image-forming device to the instant film.

The image processor may adjust the brightness of the image to have the brightness value corresponding to the detected exposure speed in a direction of the image corresponding to the exposure direction.

The detector may separately detect the exposure speeds for a plurality of exposure sections, respectively, and the image processor may adjust the brightness of the image depending on moving speeds for a plurality of image areas, respectively, corresponding to the exposure sections.

The display device may further include: a controller adjusting the brightness of the display to be predetermined brightness or more and controlling the image processor to adjust the brightness of the image depending on the adjusted brightness of the display, when a printing command is input.

According to an aspect of the present disclosure, a display control method of a display device including a display displaying an image, includes: detecting an exposure speed of a portable image-forming device which exposes an instant film to light using light from a screen displayed on a display; adjusting brightness of the image to be displayed on the display depending on the detected exposure speed; and displaying the image of which the brightness is adjusted.

The portable image-forming device may include a touch sensor moving to correspond to an exposure position, the display device may include a touch screen which detects a position on the display of the touch sensor, and in the sensing, the exposure speed may be detected depending on the position on the touch screen of the touch sensor.

In the adjusting, the brightness of the image may be adjusted in real time depending on the exposure speed detected in real time.

The display control method may further include: photographing the exposure position of the portable image-forming device, in which in the detecting, the exposure speed may be detected depending on the photographed exposure position.

The display control method may further include storing the detected exposure speed, in which in the adjusting, the brightness of the image may be adjusted depending on the stored exposure speed.

In the adjusting, the brightness of the image may be adjusted to provide the same light quantity at each exposure position of the portable image-forming device to the instant film.

In the adjusting, the brightness of the image may be adjusted to have a brightness value corresponding to the detected exposure speed in a direction of the image corresponding to the exposure direction.

In the detecting, the exposure speeds for the plurality of exposure sections may be separately detected and in the adjusting, the brightness of the image depending on the moving speeds for a plurality of image areas, respectively, corresponding to the exposure sections may be adjusted.

In the adjusting, the brightness of the display may be adjusted to be the predetermined brightness or more and the brightness of the image may be adjusted depending on the adjusted brightness of the display.

In a computer readable recording medium including a program for executing a display control method of a display device, the display control method includes: detecting an exposure speed of a portable image-forming device which exposes an instant film to light using light from a screen displayed on a display; adjusting brightness of the image to be displayed on the display depending on the detected exposure speed; and displaying the image of which the brightness is adjusted.

According to an aspect of the present disclosure, a display device includes: a display for displaying an image at a predetermined refresh rate; an input for receiving a printing command; and a controller for controlling the display to display the image at a refresh rate different from the predetermined refresh rate when the printing command is input through the input.

The controller may control the display to display the image without the refresh of the image.

The controller may control the display to display the image at the refresh rate corresponding to the exposure speed of the portable image-forming device which exposes an instant film to light using light from a screen displayed on the display.

The display device may further include: a storage for storing information on the refresh rate corresponding to the portable image-forming device, in which the controller may control the display to display the image at the refresh rate depending on the information on the stored refresh rate when the printing command is input through the input.

The controller may control the display to change the changed refresh rate to an original state when the printing command is input and the predetermined time elapses.

The display device may further include a detector for detecting an exposure area of the portable image-forming device which exposes the instant film to light using light from the screen displayed on the display, in which the controller may control the display to display the image in the display area of the display corresponding to the detected exposure area.

The controller may control the display to adjust a size of the image to correspond to the detected exposure area and display the image of which the size is adjusted.

The portable image-forming device may include a plurality of touch sensors disposed to correspond to the exposure position and the detector may detect the position on the display of the plurality of touch sensors to detect the exposure area.

The plurality of touch sensors may be disposed in a form in which a disposition direction of the display device for the portable image-forming device may be understood and the controller may output a warning message if a disposition direction between the portable image-forming device and the display device is not a predetermined direction.

The controller may receive a touch corresponding to the disposition form of the plurality of touch sensors as the printing command.

According to an aspect of the present disclosure, a display control method of a display device includes: a display for displaying an image at a predetermined refresh rate; receiving a printing command; and adjusting the predetermined refresh rate and displaying the image at a refresh rate different from the predetermined refresh rate, when the printing command is input through the input.

In the adjusting and displaying, the image may be displayed without refreshing the image.

In the adjusting and displaying, the image may be displayed at the refresh rate corresponding to the exposure speed of the portable image-forming device which exposes the instant film to light using light from the screen displayed on the display.

The display control method may further include: storing information on the refresh rate corresponding to the portable image-forming device, in which in the adjusting and displaying, the image may be displayed at the refresh rate depending on the information on the stored refresh rate when the printing command is input through the input.

The display control method may further include changing the changed refresh rate to an original state when the printing command is input and the predetermined time elapses.

The display control method may further include: detecting an exposure area of the portable image-forming device which exposes the instant film to light using light from the screen displayed on the display, in which in the adjusting and displaying, the image may be displayed in the display area of the display corresponding to the detected exposure area.

In the adjusting and displaying, the display may be controlled to adjust a size of the image to correspond to the detected exposure area and display the image of which the size is adjusted.

The portable image-forming device may include a plurality of touch sensors disposed to correspond to the exposure position, in which in the detecting, the position on the display of the plurality of touch sensors may be detected to detect the exposure area.

The plurality of touch sensors may be disposed in a form in which a disposition direction of the display device for the portable image-forming device may be understood and the display control method may further include outputting a warning message if a disposition direction between the portable image-forming device and the display device is not a predetermined direction.

In the receiving of the printing command, the touch corresponding to the disposition form of the plurality of touch sensors may be received as the printing command.

In a computer readable recording medium including a program for executing a display control method of a display device, the display control method includes: displaying an image at a predetermined refresh rate; receiving a printing command; and adjusting the predetermined refresh rate and displaying the image at a refresh rate different from the predetermined refresh rate, when the printing command is input through the input.

According to the embodiments of the present disclosure, it is possible to reduce the size of the light emitting module and reduce the alignment tolerance of the light emitting module by directly mounting the light emitting diode chip on the substrate.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Hereinafter, embodiments of the present disclosure will be described with reference to the accompanying drawings. Embodiments described below are described to help understanding of the present disclosure and therefore it is to be understood that the present disclosure may be variously changed differently from the embodiments described herein. However, in describing the present disclosure, if it is determined that the detail description of relevant known functions or components makes subject matters of the present disclosure obscure, the detailed description and illustration thereof will be omitted. Further, to help understanding of the present disclosure, the accompanying drawings are not necessarily illustrated to scale but dimensions of some components may be illustrated to be exaggerated.

Figure 1:
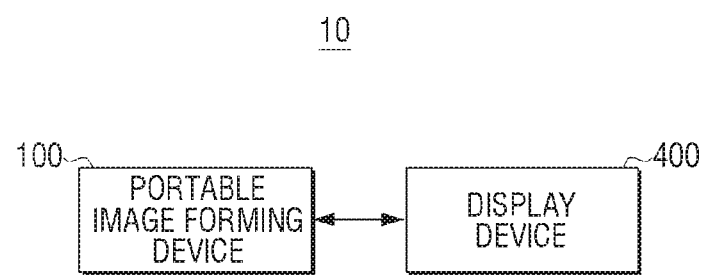
FIG. 1 is a diagram illustrating an image-forming system according to an embodiment of the present disclosure.

FIG. 1 is a diagram illustrating an image-forming system according to an embodiment of the present disclosure.

Referring to FIG. 1, an image-forming system 10 according to an embodiment of the present disclosure is configured to include a portable image-forming device 100 and a portable display device 400.

The portable image-forming device 100 is a printing device exposing an instant film using an exposure member that is manually driven and may expose an instant film to light from a screen of the portable display device 400 (hereinafter, called a display device) to develop the instant film, thereby performing printing. A detailed configuration and operation of the portable image-forming device 100 will be described below with reference to FIGS. 2 and 56.

The display device 400 is a device for displaying an image. The display device 400 performs a position correction, an image quality correction, a brightness correction, or the like of the displayed image so that the portable image-forming device 100 may print the image with a good quality. In detail, the related art performs various image quality corrections, or the like in the portable image-forming device, but the portable image-forming device 100 according to the embodiment of the present disclosure is driven in a non-electric manner/non-electronic manner, and therefore various correction operations are performed in the display device 400. A detailed configuration and operation of the display device 400 according to the embodiment of the present disclosure will be described below with reference to FIG. 57.

As described above, the image-forming system 10 according to the embodiment of the present disclosure may perform a printing operation using the portable image-forming device to which power need not be supplied, such that portability of the portable image-forming device may be enhanced.

Figure 2:
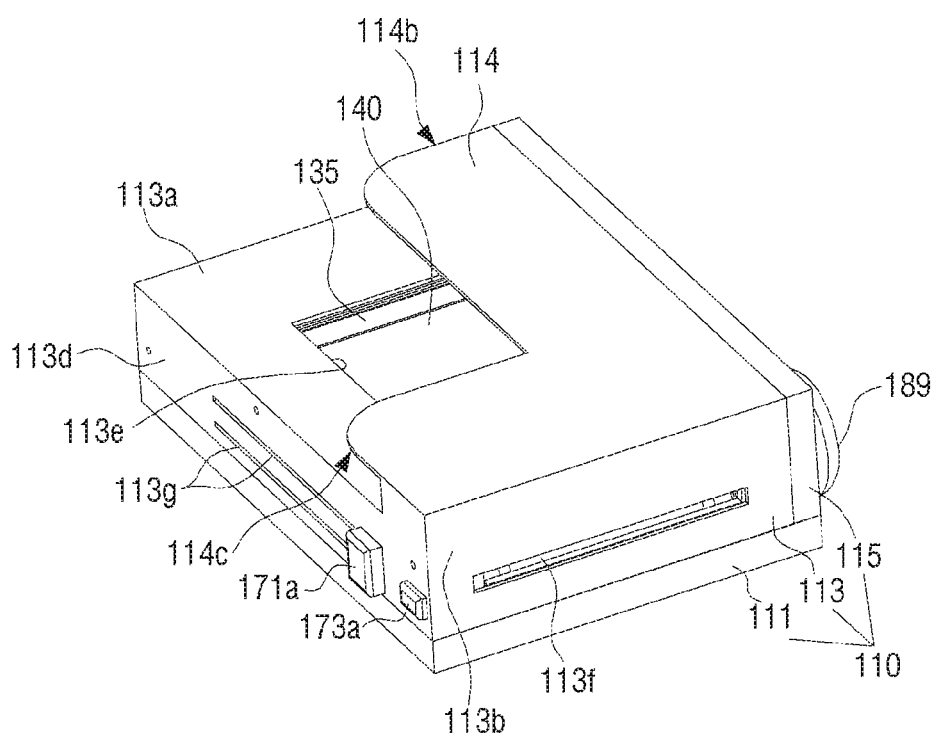
FIG. 2 is a perspective view illustrating a portable image-forming device according to an embodiment of the present disclosure.
Figure 3:
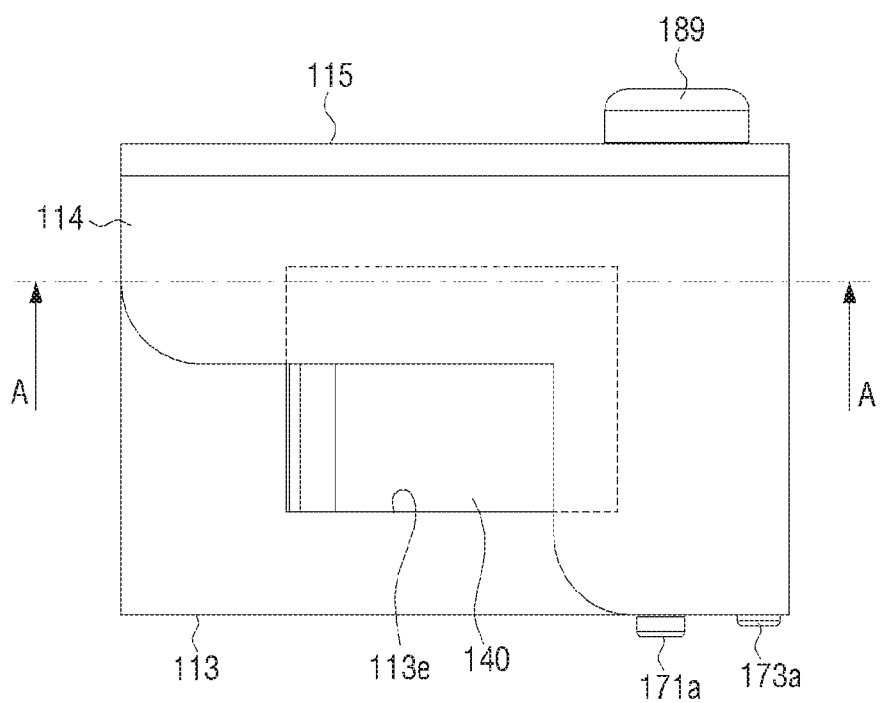
FIG. 3 is a plan view illustrating the portable image-forming device according to an embodiment of the present disclosure.
Figure 4:
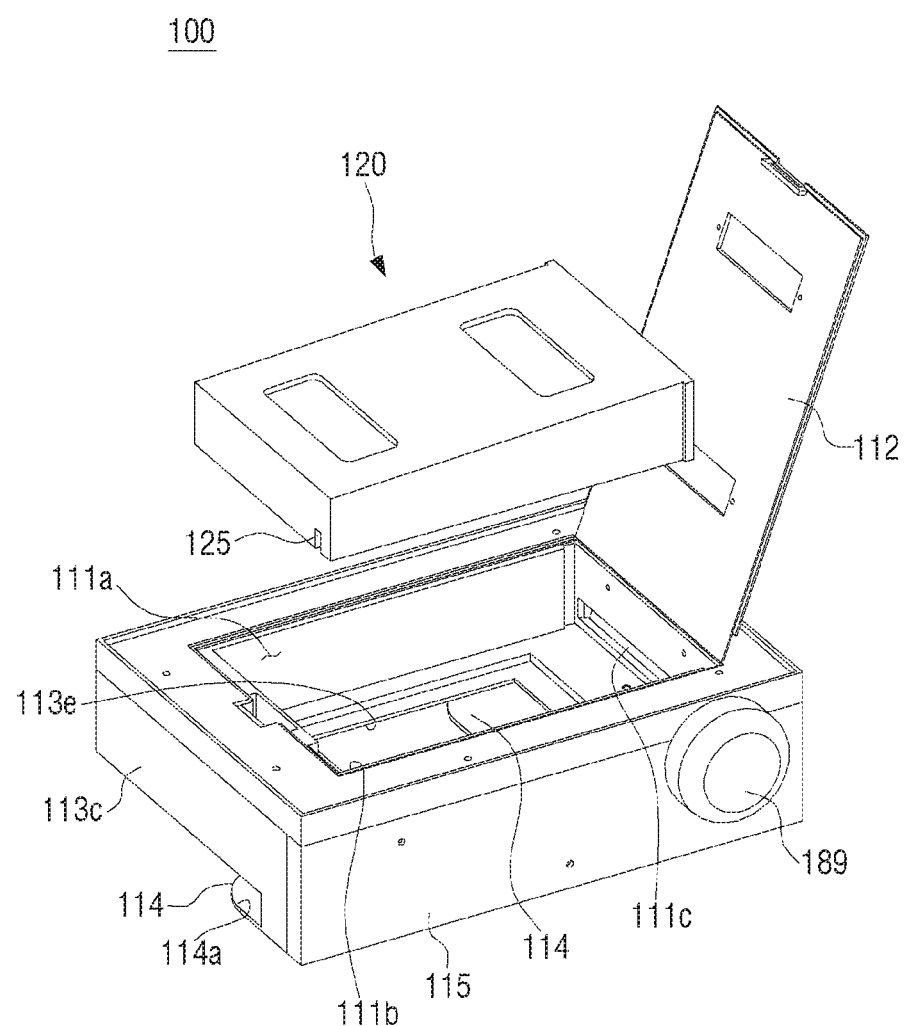
FIG. 4 is a perspective view illustrating a state in which a film cassette is mounted in the portable image-forming device according to the embodiment of the present disclosure.
Figure 5:
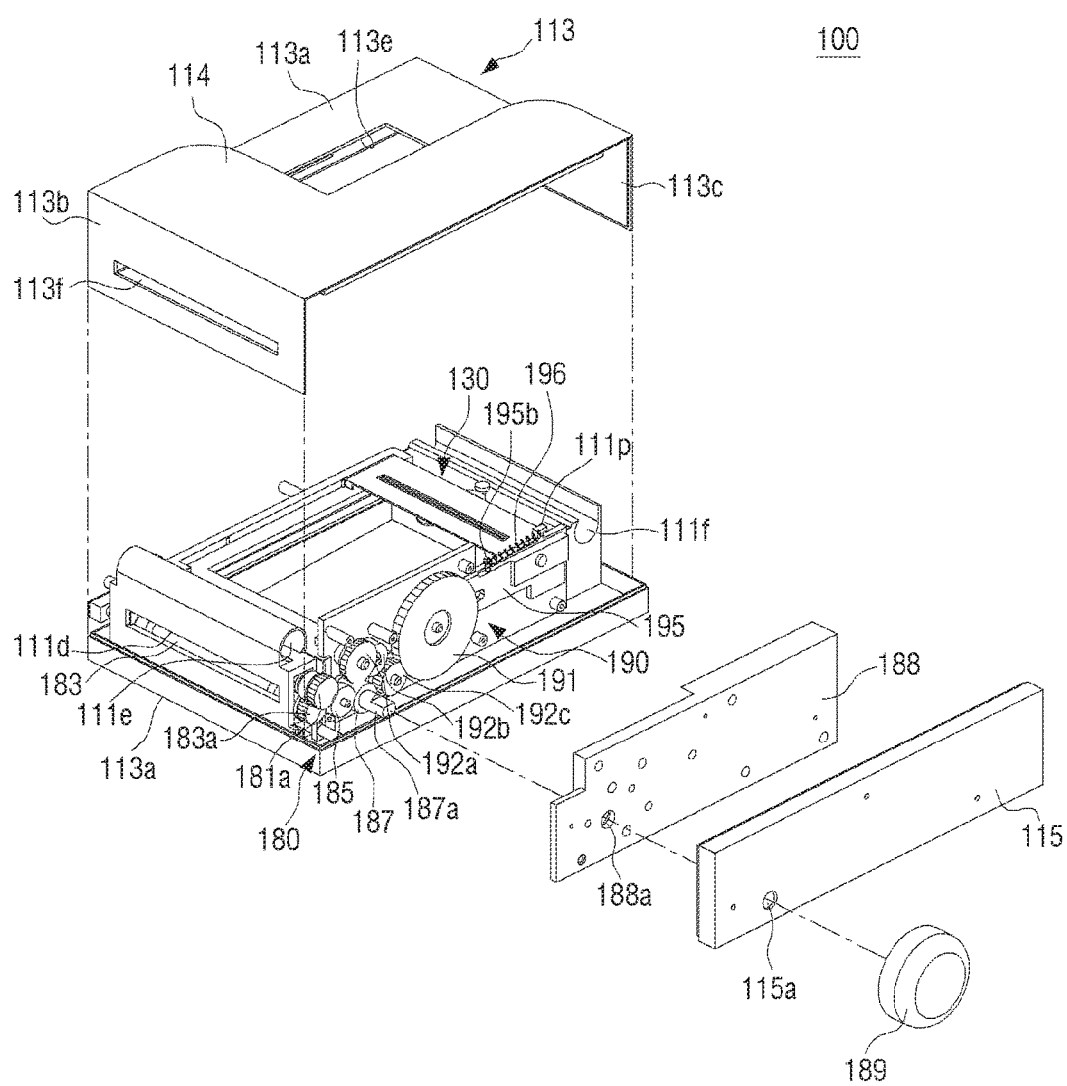
FIG. 5 is an exploded perspective view of the portable image-forming device according to the embodiment of the present disclosure, in which a light blocking member is omitted.
Figure 6:
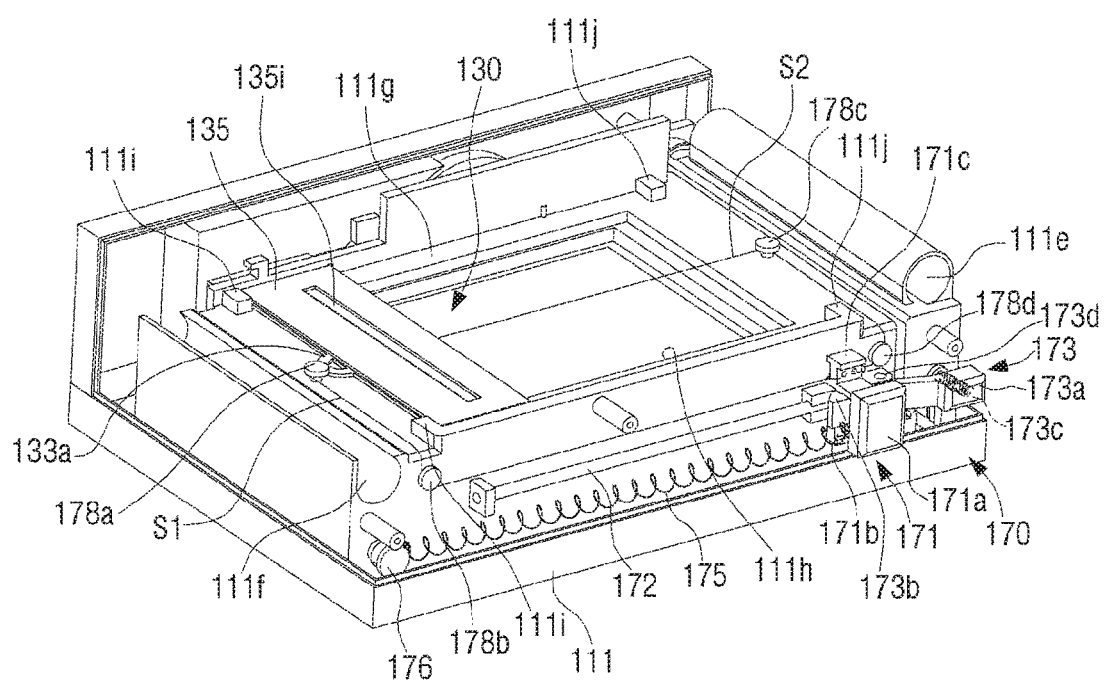
FIG. 6 is a perspective view of the portable image-forming device according to the embodiment of the present disclosure, in which an upper housing and the light blocking member are omitted.

FIG. 2 is a perspective view illustrating a portable image-forming device according to an embodiment of the present disclosure, FIG. 3 is a plan view illustrating the portable image-forming device according to the embodiment of the present disclosure, FIG. 4 is a perspective view illustrating a state in which a film cassette is mounted in the portable image-forming device according to the embodiment of the present disclosure, FIG. 5 is an exploded perspective view of the portable image-forming device according to the embodiment of the present disclosure, in which a light blocking member is omitted, and FIG. 6 is a perspective view of the portable image-forming device according to the embodiment of the present disclosure, in which an upper housing and the light blocking member are omitted.

The portable image-forming device 100 according to the embodiment of the present disclosure is configured to include a housing part 110, an exposure member 130, a light blocking member 150, damping parts 155, 156, and 157, a traction part 170, developer spreading members 180, and an instant film setting part 190.

The housing part 110 is configured to include a lower housing 111, an upper housing 113, and a side housing 115.

The exposure member 130, the light blocking member 150, the traction part 170, and the developer spreading member 180 are installed to be driven at a base of the lower housing 111. That is, an upper side of the lower housing 111 is provided with the exposure member 130 and the light blocking member 150, one side thereof is provided with the traction part 170 and the other side thereof is provided with a plurality of driven gears 192a, 192b, and 192c and the instant film setting part 190, and front end portions thereof are each provided with the developer spreading members 180.

An inside of the lower housing 111 is provided with a space part 111a in which an instant film cassette 120 is mounted. Further, a bottom portion of the lower housing 111 is provided with a mounting hole 111b through which the instant film cassette 120 is mounted in the space part 111a and a door 112 for opening and closing the mounting hole 111b.

Further, the front end portion of the lower housing 111 is provided with the mounting space 111b (see FIG. 10) in which a pair of pressing rollers 181 and 183 of the developer spreading member 180 is formed and wall surfaces facing each other to form the mounting space 111b are provided with first and second through holes 111c and 111d through which the instant film 140 passes.

Further, as illustrated in FIG. 6, the lower housing 111 has an upper portion provided with a first cylindrical groove 111e and a second cylindrical groove 111f into which a portion of the light blocking member 150 is inserted and first and second guide parts 111g and 111h on which both sides of the exposure member 130 are slidably seated are formed between the first and second cylindrical grooves 111e and 111f. In this case, the first and second guide parts 111g and 111h are provided with first and second restriction jaws 111i and 111j for limiting a moving range of the exposure member 130.

As illustrated in FIGS. 4 and 5, the upper housing 113 may be detachably coupled with the lower housing 111 to simultaneously cover the upper portion, the front end portion, a rear end portion, and one side portion of the lower housing 111. In this case, the upper housing 113 is config-
ured to include a first portion 113a covering the upper portion of the lower housing 111, a second portion 113b covering the front end portion of the lower housing 111, a third portion 113c covering the rear end portion of the lower housing 111, and a fourth portion 113d covering one side portion of the lower housing 111, in which the first portion 113a, the second portion 113b, the third portion 113c, and the fourth portion 113d are integrally formed.

An outer side surface of the first portion 113a is flat so that the display device 400 may stably contact the outer side surface. Further, referring to FIG. 2 and FIG. 20, an incident window 113e corresponding to a screen 401 of the display device 400 penetrates through the first portion 113a. Light diverging from the screen 401 of the display device 400 is incident on a photosensitive surface 141 (see FIG. 23A) of the instant film 140 through the incident window 113e. In this case, the light diverging from the screen 401 is incident on the photosensitive surface 141 of the instant film 140 at different light quantities depending on a contrast of an image 403 displayed on the screen 401 of the display device 400.

The second portion 113b is provided with a discharge hole 113f through which the instant film 140 transferred through the developer spreading member 180 (see FIG. 5) is discharged to the outside of the portable image-forming device 100.

The third portion 113c covers the rear end portion of the lower housing 111 so that the rear end portion of the lower housing 111 is completely closed. A plurality of guide holes 113g for guiding a straight movement of a lever 171 are formed along a length direction of the fourth portion 113d.

The side housing 115 is coupled with the other side of the lower housing 111 to enclose the plurality of driven gears 192a, 192b, and 192c and the instant film setting part 190.

The fixed part 114 has a thin plate shape and is disposed substantially in parallel with the first portion 113a of the upper housing 113 at a predetermined interval so that an insertion space 114a for inserting the display device 400 between the upper housing 113 and the fixed part 114 is prepared.

Further, as illustrated in FIG. 2, the fixed part 114 is provided with a first opening 114b and a second opening 114c formed in 2 directions so that any one of various display devices having different sizes may be easily inserted into the insertion space 114a of the display device 400.

Figure 7:
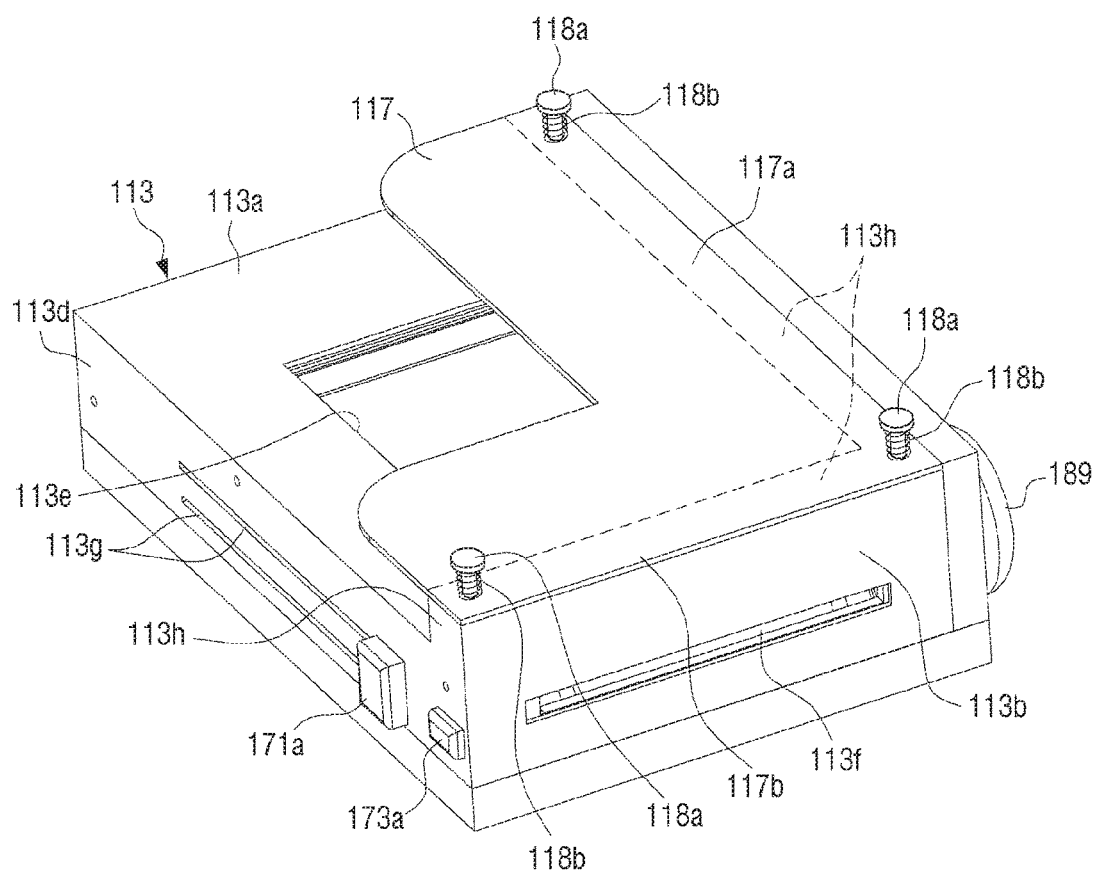
FIG. 7 is a diagram illustrating an example of a fixed part in the portable image-forming device illustrated in FIG. 2.
Figure 8:
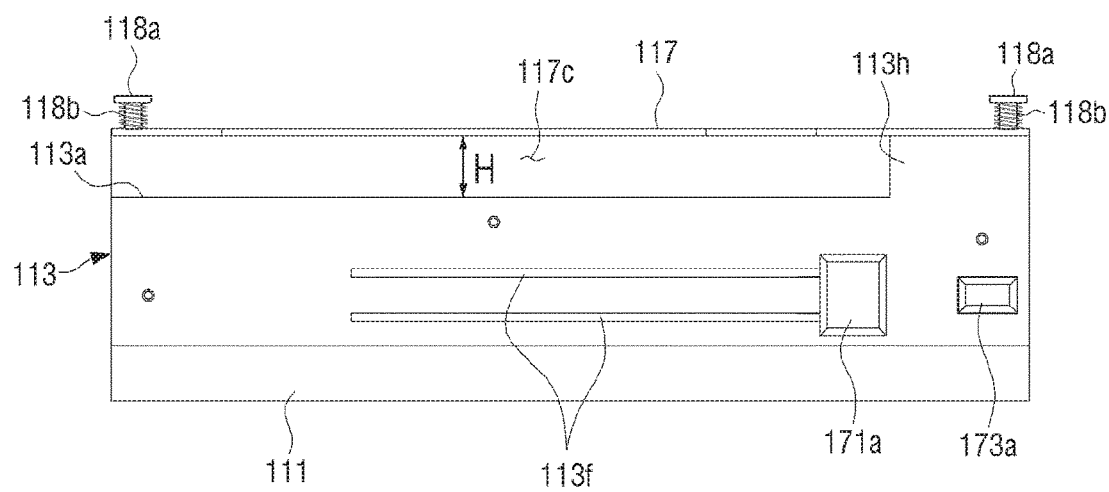
FIG. 8 is a side view illustrating the portable image-forming device illustrated in FIG. 7.
Figure 9:
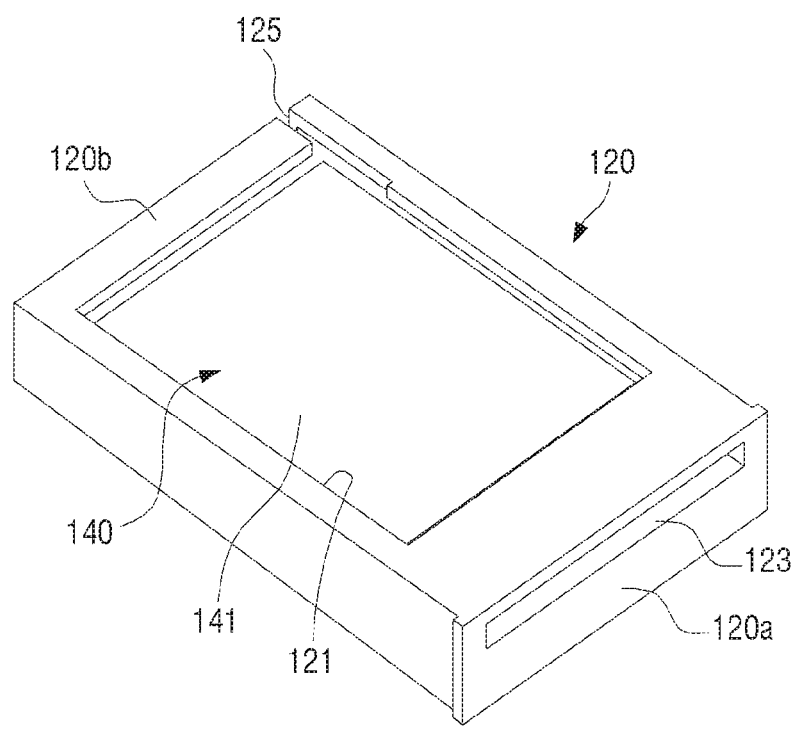
FIG. 9 is a perspective view illustrating a film cassette illustrated in FIG. 4.

FIG. 7 is a diagram illustrating an example of a fixed part in the portable image-forming device illustrated in FIG. 2, FIG. 8 is a side view illustrating the portable image-forming device illustrated in FIG. 7, and FIG. 9 is a perspective view illustrating a film cassette illustrated in FIG. 4.

Meanwhile, the foregoing fixed part 114 extends while being integrated with the upper housing 113, and as a result may not move with respect to the upper housing 113. However, the fixed part 114 is not limited to the structure, and as illustrated in FIGS. 7 and 8, a fixed part 117 may be movably disposed with respect to the upper housing 113.

That is, referring to FIG. 7, the fixed part 117 is configured as a separate member from the upper housing 113. In this case, end portions 117a and 117b of the fixed part 117 are seated on a protrusion 113h protruding along an end portion of the first portion 113a of the upper housing 113.

Further, the fixed part 117 may be maintained not to be separated from the protrusion 113h of the upper housing 113 by a plurality of guide pins 118a, and at the same time may move to be far away from or close to the first portion 113a of the upper housing 113 along the plurality of guide pins 118a. In this case, a coil spring 118b is coupled with the plurality of guide pins 118a, respectively, and the fixed part 117 adheres to the protrusion 113h by each coil spring 118b.

Referring to FIG. 8, in the fixed part 117 configured as described above, a height H of the insertion space 117c into which the display device 400 is inserted may be changed corresponding to a thickness of the display device 400. Therefore, the fixed part 117 may make different kinds of display devices 400 having different thicknesses firmly adhere to the upper housing 113.

Referring to FIG. 9, the plurality of instant films 140 are inserted into the instant film cassette 120 in the stacked state. One surface of the instant film cassette 120 is provided with an exposure hole 121 through which the photosensitive surface 141 of the instant film 140 is exposed.

The exposure hole 121 is disposed to approximately correspond to the incident window 113e of the upper housing 113 when the instant film cassette 120 is mounted in the space part 111a of the lower housing 111.

Further, a front end portion 120a of the instant film cassette 120 is provided with an instant film discharge hole 123 and a rear end portion 120b thereof is provided with a through groove 125 through which a hook part 197g penetrates so that the hook part 197g of a pusher 197 (see FIG. 19) interferes with the rear end portion 120b thereof and a rear end portion 140b (see FIG. 23A) of the instant film 120 may be pushed.

Figure 10:
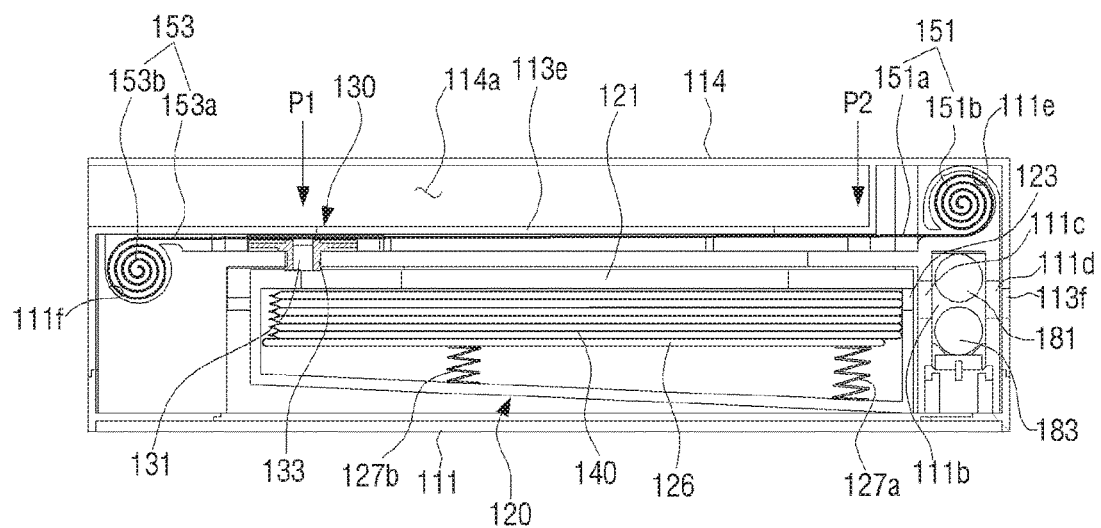
FIG. 10 is a cross-sectional view taken along the line A-A illustrated in FIG. 3.

Further, as illustrated in FIG. 10, the inside of the instant film cassette 120 is provided with a support plate 126 on which the instant film 140 is stacked, in which the support plate 126 is elastically supported to the exposure hole 121 side by a plurality of coil springs 127a and 127b. Therefore, the support plate 126 presses the plurality of instant films 140 upwardly to make the instant film 140 positioned at the top among the stacked instant films 140 adhere to the inner side surface of the upper portion of the instant film cassette 120. As a result, when the instant film setting part 190 is operated, the instant film 140 positioned at the top may be discharged through the instant film discharge hole 123.

The exposure member 130 exposes the photosensitive surface 141 of the instant film 140 disposed inside the housing part 110 using light diverging from the screen 401 of the display device 400 while moving along the incident window 113e.

Figure 11:
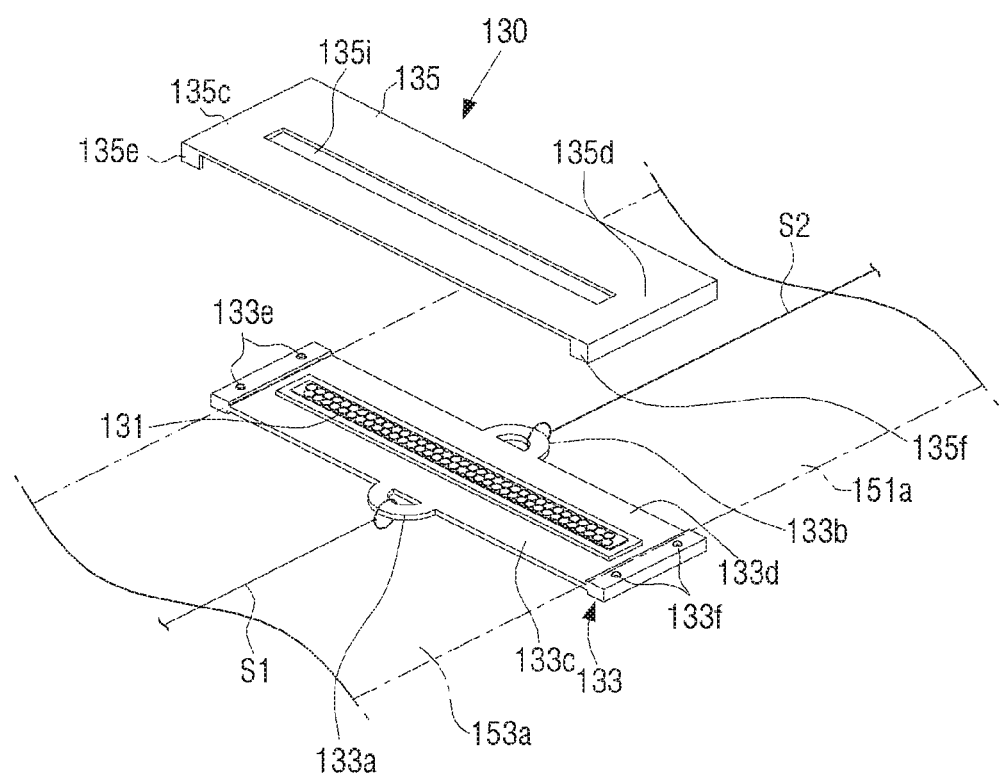
FIG. 11 is an exploded perspective view illustrating a portion of an exposure member and the light blocking member of the portable image-forming device according to the embodiment of the present disclosure.
Figure 12:
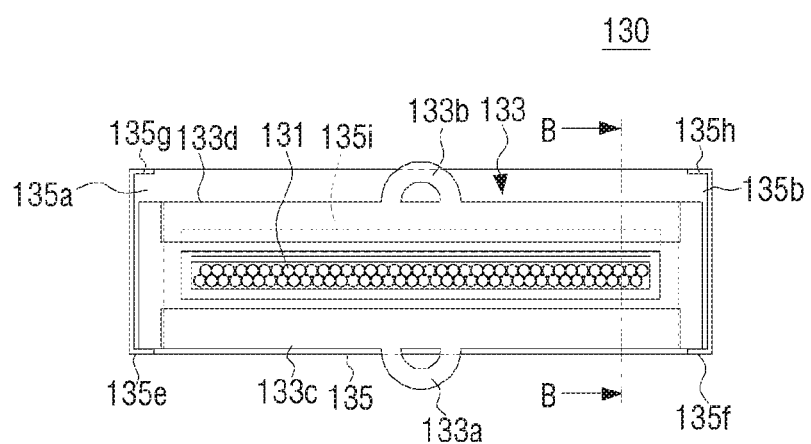
FIG. 12 is a bottom view illustrating the exposure member illustrated in FIG. 11.
Figure 13:
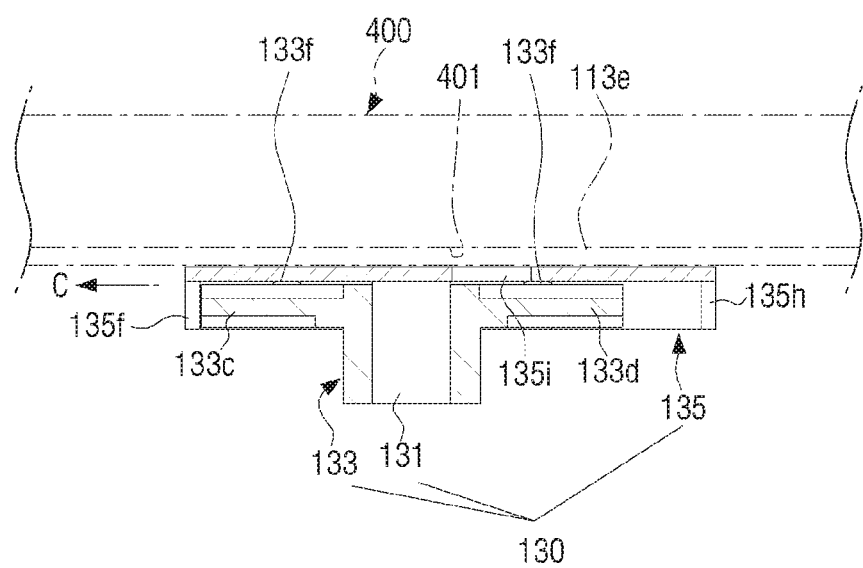
FIG. 13 is a cross-sectional view taken along the line B-B illustrated in FIG. 12 and is a diagram illustrating a state in which a lens of the exposure member is closed by a shutter.
Figure 14:
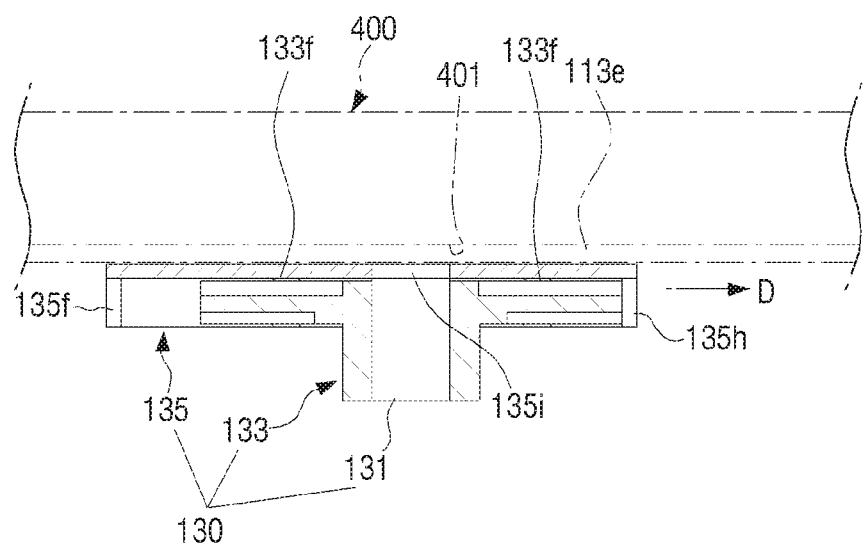
FIG. 14 is a diagram illustrating a state in which the lens of the exposure member illustrated in FIG. 13 is open by the shutter.

FIG. 10 is a cross-sectional view taken along the line A-A illustrated in FIG. 3, FIG. 11 is an exploded perspective view illustrating a portion of an exposure member and the light blocking member of the portable image-forming device according to a embodiment of the present disclosure, FIG. 12 is a bottom view illustrating the exposure member illustrated in FIG. 11, FIG. 13 is a cross-sectional view taken along the line B-B illustrated in FIG. 12 and is a diagram illustrating a state in which a lens of the exposure member is closed by a shutter, and FIG. 14 is a diagram illustrating a state in which the lens of the exposure member illustrated in FIG. 13 is open by the shutter.

Referring to FIGS. 10 to 14, the exposure member 130 includes a lens array 131, a frame 133, and a shutter 135.

The lens array 131 is a small lens group using a difference in refractive index within a glass fiber and is a typical lens array adopted when like a scanner, an interval between an object to be scanned and a reader is narrow.

As illustrated in FIG. 10, the frame 133 reciprocates the lens array 131 between a pre-exposure position P1 and a post-exposure position P2. As illustrated in FIG. 11, a first string S1 and a second string S2 to be described below are each fixed to first and second ring parts 133a and 133b formed at one end portion 133c and the other end portion 133d of the frame 133, and thus the frame 133 is towed in a direction in which a first string S1 or a second string S2 is pulled.

Further, one end portion 133c of the frame 133 is connected to one end portion 151a of a first light blocking film 151 of the light blocking member 150 and the other end portion 133d thereof is connected to one end portion 153a of a second light blocking film 153 of the light blocking member 150. Therefore, the frame 133 moves between the pre-exposure position P1 and the post-exposure position P2 along with the light blocking member 150.

Further, a plurality of contact protrusions 133e and 133f are formed on upper surfaces of both sides of the frame 133 and the plurality of contact protrusions 133e and 133f minimize a contact area between the frame 133 and bottom surfaces 135a and 135b of the shutter 135. In this case, the shutter 135 have an upper surfaces 135c and 135d contact a bottom surface of the first portion 113a of the upper housing 113. In this case, the contact area is wider than that between the frame 133 and the bottom surface of the shutter 135 by the plurality of contact protrusions 133e and 133f.

Therefore, when the frame 133 is towed by the first string S1 or the second string S2, since a friction force generated at the bottom surface of the first portion 113a of the upper housing 113 is larger than a friction force at the frame 133, a moving speed of the shutter is slower than that of the frame 133.

Therefore, as illustrated in FIG. 13, when the frame 133 moves from the post-exposure position P2 to the pre-exposure position P1 (C direction), one end portion 133c of the frame 133 moves while pushing first projecting parts 135e and 135f depending on a difference in moving speed between the frame 133 and the shutter 135. In this case, since a position of a light passing hole 135i of the shutter 135 mismatches a position of the lens array 131, the lens array 131 is closed by the shutter 135. Consequently, the instant film 140 is blocked by the shutter 135 and the light blocking member 150 while the lens array 131 moves from the post-exposure position P2 to the pre-exposure position P1.

On the contrary, as illustrated in FIG. 14, when the frame 133 moves from the pre-exposure position P1 to the post-exposure position P2 (D direction), one end portion 133d of the frame 133 moves while pushing second projecting parts 135g and 135h of the shutter 135 depending on a difference in moving speed between the frame 133 and the shutter 135. In this case, since the position of the light passing hole 135i of the shutter 135 is changed to correspond to the position of the lens array 131, the lens array 131 is open. Therefore, while the lens array 131 moves from the pre-exposure position P1 to the post-exposure position P2, light diverging from the screen 401 of the display device 400 is incident on the incident film 140 through the lens array 131, and thus the photosensitive surface 141 of the instant film 140 is exposed.

The light blocking member 150 may be formed of an opaque film having an elastic force in itself and includes the first light blocking film 151 and the second light blocking film 153.

Referring to FIG. 10, the first light blocking film 151 is inserted into the first cylindrical groove 111e in a state in which the other end portion 151b of the first light blocking film 151 is rolled up. The other end portion 151b is unfolded while being released when the frame 133 moves to the pre-exposure position P1 and then is again rolled up by an elastic force in itself when the frame 133 moves to the post-exposure position P2.

Similarly, the second light blocking film 153 is inserted into the second cylindrical groove 111f in a state in which the other end portion 153b of the second light blocking film 153 is rolled up. In this case, the other end portion 153b is unfolded while being released when the frame 133 moves to the post-exposure position P2 and then is again rolled up by an elastic force in itself when the frame 133 moves to the pre-exposure position P1.

Figure 15:
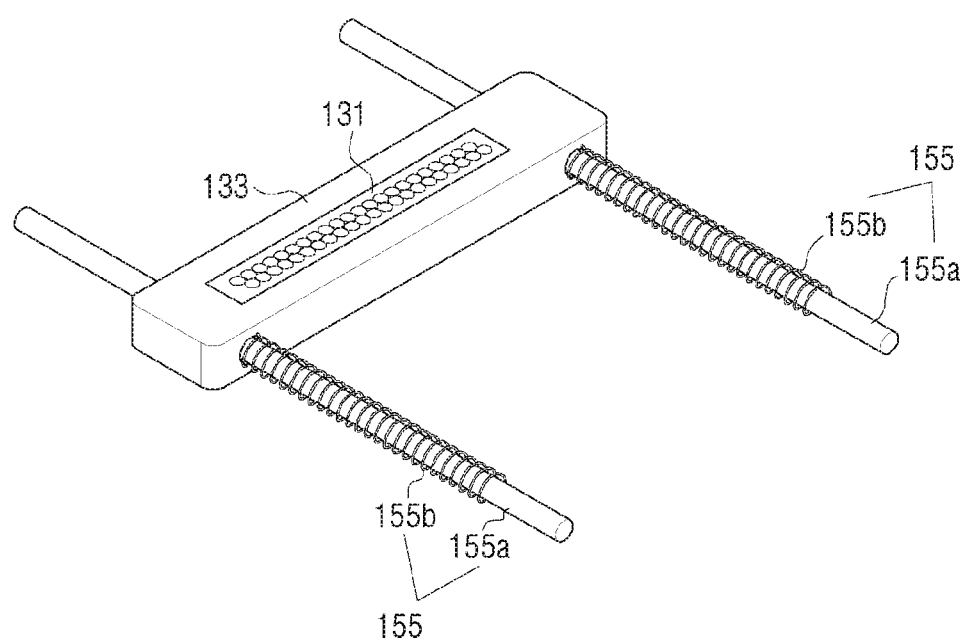
FIGS. 15, 16, and 17 are diagrams illustrating various damping structures for controlling a moving speed of a lens part when the lens part moves from a pre-exposure position to the exposure position.
Figure 16:
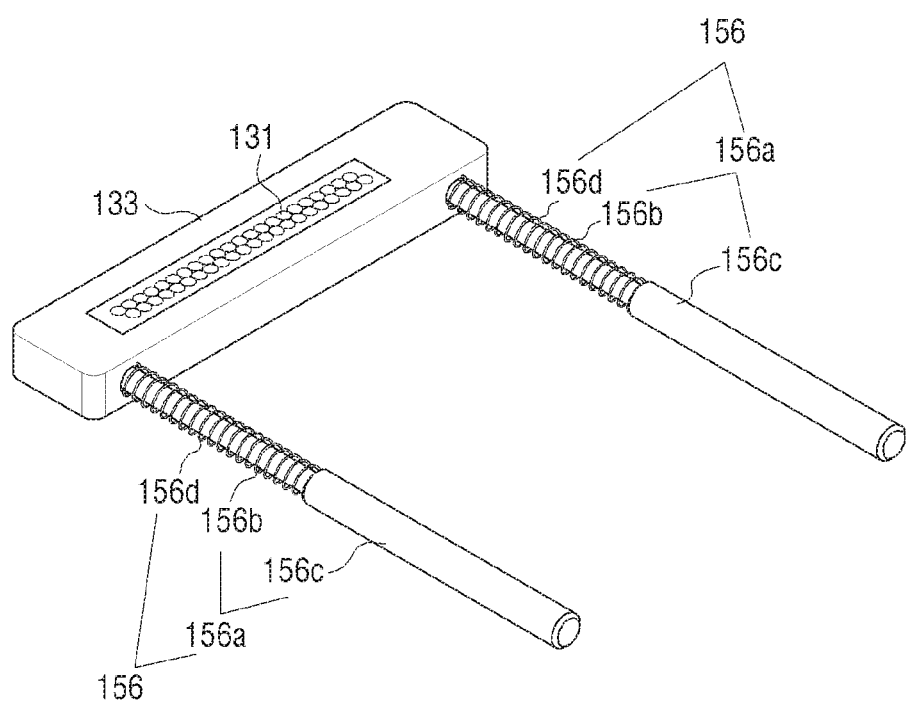
Figure 17:
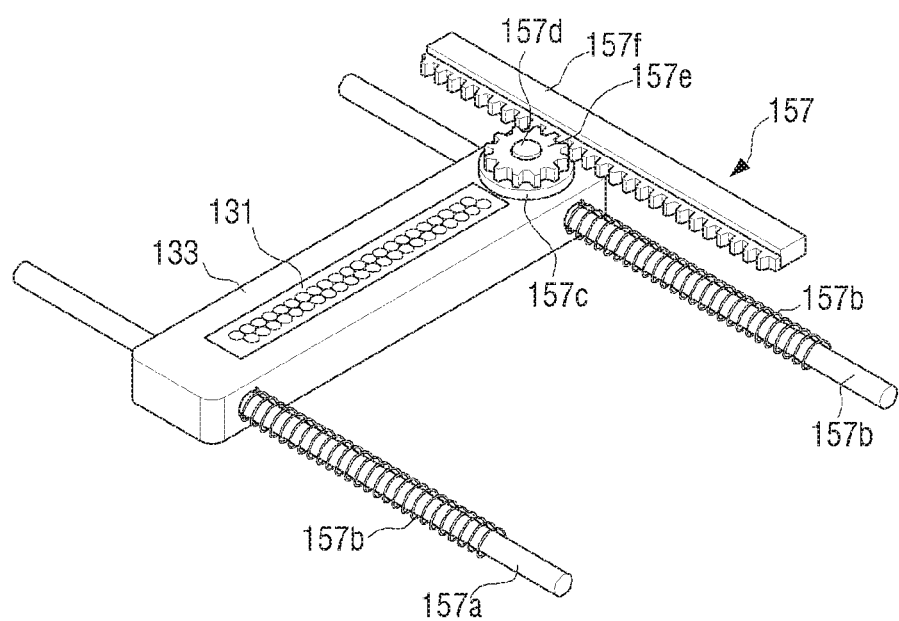

Meanwhile, according to the present disclosure, to clearly display the image printed on the instant film 140, the exposure amount may be controlled by appropriately controlling a moving speed of the lens array 131 from the pre-exposure position P1 to the post-exposure position P2. For this purpose, according to present disclosure, as illustrated in FIGS. 15 to 17, damping parts 155, 156, and 157 having various structures may be provided. Similar to the frame 133 illustrated in FIG. 11, the frame 133 illustrated in FIGS. 15 to 17 is coupled with the lens array 131 and the shutter 135 and is towed by the first and second strings S1 and S2 and is coupled with the light blocking member 150. However, for convenience of explanation, the detailed configuration of the frame 133, the first and second strings S1 and S2, and the light blocking member 150 are not illustrated.

FIGS. 15 to 17 are diagrams illustrating various damping structures for controlling a moving speed of a lens part when the lens part moves from a pre-exposure position to the exposure position.

Referring to FIG. 15, the damping part 155 may include a pair of guide rails 155a penetrating through both sides of the frame 133 and a pair of elastic members 155b coupled with each guide rail 155a.

The pair of guide rails 155a is disposed in parallel with each other and both ends thereof are each fixed to a predetermined position of the lower housing 111. The pair of guide rails 155a guides the frame 133 to reciprocate between the pre-exposure position P1 and the post-exposure position P2.

The pair of elastic members 155b is formed of the coil spring and elastically supports the frame 133 while being positioned at the instant film discharge hole 113f of the upper housing 113 based on the lens array 131. Therefore, the pair of elastic member 155b may reduce the moving speed when the lens array 131 moves from the pre-exposure position P1 to the post-exposure position P2 to appropriately expose light to the instant film 140 through the lens array 131.

Referring to FIG. 16, the damping part 156 may include a pair of typical linear dampers 156a elastically supporting the frame 133 and a pair of elastic members 156d coupled with each linear damper 156a.

The pair of linear dampers 156a are disposed in parallel with each other and positioned at the instant film discharge hole 113f based on the lens array 131. The pair of dampers 156a include one end of each piston 156b which is connected to one side of the frame 133 and one end of each cylinder 156c which is each fixed at a predetermined position of the lower housing 111.

The elastic member 156d is formed of the coil spring and is coupled with each piston In this case, similar to the foregoing damping part 155, the damping part 156 may reduce the moving speed when the lens array 131 moves from the pre-exposure position P1 to the post-exposure position P2 to appropriately expose the instant film 140 to light.

Referring to FIG. 17, the damping part 157 may include a pair of guide rails 157a penetrating through both sides of the frame 133, a pair of elastic members 157b coupled with each guide rail 157a, a typical rotary damper 157c, a pinion 157e, and a rack 157f.

The pair of guide rails 157a is disposed in parallel with each other and both ends thereof are each fixed to a predetermined position of the lower housing 111. The pair of guide rails 157a guides the frame 133 to reciprocate between the pre-exposure position P1 and the post-exposure position P2.

The pair of elastic members 157b are formed of the coil spring and elastically support the frame 133 while being positioned at the instant film discharge hole 113f based on the lens array 131.

The rotary damper 157c may be disposed at one side of the upper surface of the frame 133 and a rotating shaft 157d of the rotary damper 157c is coupled with the pinion 157e. The pinion 157e rotates while interlocking with the rotating shaft 157d and is engaged with the rack 157f fixed at the predetermined position of the lower housing 111.

In this case, the damping part 157 may reduce the moving speed when the lens array 131 moves from the pre-exposure position P1 to the post-exposure position P2 by the pair of elastic members 157b and the rotary damper 157c to appropriately expose the instant film 140 to light.

In this case, the damping part 157 may be used by replacing the rotary damper 157c with a typical mechanical vibrator (not illustrated).

The traction part 170 is to move the exposure member 130 from the post-exposure position P2 to the pre-exposure position P1 by the user force and is disposed at one side of the lower housing 111. Referring to FIG. 6, the traction part 170 includes a lever 171, a locking member 173, the elastic member 175, and the first and second strings S1 and S2.

The lever 171 is slidably coupled with the guide shaft 172 disposed along one side of the lower housing 111. In this case, one portion 171a of the lever 171 is exposed to the outside as illustrated in FIG. 2 so that the lever 171 may be operated by a user.

The locking member 173 includes an unlocking button 173a, a locking part 173b for locking the lever 171, an elastic member 173c elastically supporting the unlocking button 173a.

The unlocking button 173a penetrates through the fourth portion 113d of the upper housing 113 to be exposed to the outside of the portable image-forming device 100 so that it may be operated by a user. The unlocking button 173a operates the locking part 173b extending from the unlocking button 173a based on a hinge shaft 173d to unlock the locking of the lever 171. The elastic member 173c elastically supports the unlocking button 173a so that the locking part 173b may maintain the locking state of the lever 171.

One end portion of the elastic member 175 is fixed to one side portion 171b of the lever 171 and the other end portion thereof is fixed to a first fixing pin 176 formed at the lower housing 111 so that the lever 171 is pulled toward the opposite side of the instant film discharge hole 113f.

Therefore, if a user presses the unlocking button 173a to unlock the locking of the lever 171 in a state in which the lever 171 is locked by the locking member 173, the lever 171 moves to be far away from the locking position by the elastic member 175. Simultaneously therewith, the exposure member 130 moves from the pre-exposure position P1 to the post-exposure position P2.

Meanwhile, one end portion of the first string S1 and one end portion of the second string S2 are each fixed to the other side portion 171c of the lever 171 and the other end portion of the first string S1 and the other end portion of the second string S2 are each fixed to the first and second ring parts 133a and 133b. In this case, the first and second strings S1 and S2 are each installed at a plurality of first fixing pins 178a and 178b and a plurality of second fixing pins 178c and 178d which are fixed to the lower housing 111 to be tightly maintained so that the exposure member 130 immediately interlocks with the lever 171 when the lever 171 moves.

Referring to FIGS. 5 and 10, the developer spreading member 180 includes a pair of pressure rollers 181 and 183, a driven gear 185, a main gear 187, and a rotation knob 189.

The pair of pressure rollers 181 and 182 are rotatably disposed in the mounting space 111b (see FIG. 10) of the lower housing 111 and are preferable to maintain a predetermined interval from each other so that the pressure rollers 181 and 182 may feed the instant film 140 while pressing the instant film 140.

Further, one side of the pair of pressure rollers 181 and 183 is each provided with gears 181a and 183a. The gears 181a and 183a are engaged with each other to interlock with each other and thus when any one of the gears 181a and 183a rotates, the gears 181a and 183a simultaneously rotate the pair of pressure rollers 181 and 183.

The driven gear 185 is rotatably coupled with one side of the lower housing 111 and engaged with any one 181a of the gears 181a and 183a of the pair of pressure rollers 181 and 183. Therefore, the driven gear 185 may transfer a rotating force of the main gear 187.

The main gear 187 is rotatably coupled with one side of the lower housing 111 and engaged with the driven gear 185. In this case, the main gear 187 is extendedly provided with a coupling part 187a with which the rotation knob 189 is coupled. The coupling part 187a penetrates through a through hole 188a of a guide panel 188 and a through hole 115a of the side housing 115, respectively.

The rotation knob 189 is coupled with the coupling part 187a of the main gear 187 and exposed to the outside of the side housing 115. Further, the rotation knob 189 is rotated by a manipulation of a user to rotate the main gear 187.

As such, the developer spreading member 180 discharges the instant film 140 through the instant film discharge hole 113f while pressing and feeding the instant film 140 introduced by the instant film setting part 190. In this case, the pair of pressure rollers 181 and 183 gradually spread a developer 145 (see FIG. 24) formed of a liquid phase and included in the front end portion of the instant film 140 over the whole of the instant film 140 while feeding the instant film 140.

Figure 18:
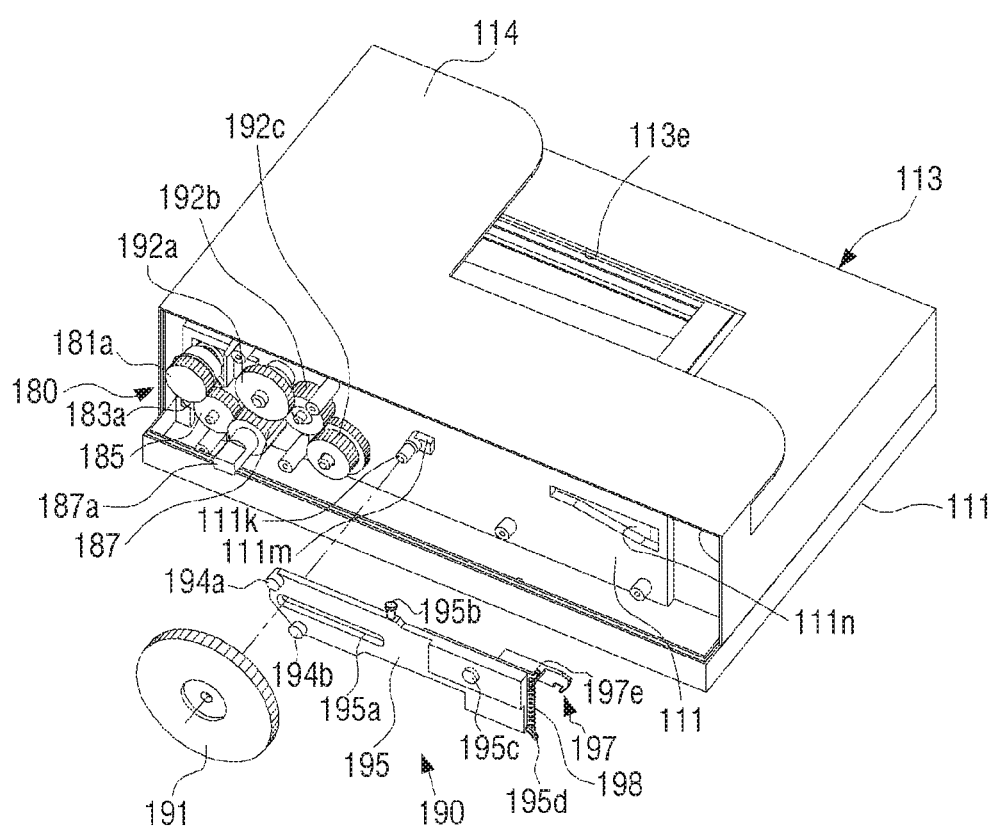
FIG. 18 is a perspective view illustrating a state in which a movable member and a movable gear of an instant film setting part illustrated in FIG. 4 are separated from one side of a lower housing.

FIG. 18 is a perspective view illustrating a state in which a movable member and a movable gear of an instant film setting part are separated from one side of a lower housing.

The instant film setting part 190 serves to interlock with the main gear 187 rotated by the operation of the rotation knob 189 at one side of the lower housing 111 in which the main gear 187 is disposed to introduce the front end portion 140a (see FIG. 24) of the instant film 140 between the pair of pressure rollers 181 and 183. Referring to FIG. 18, the instant film setting part 190 includes a movable gear 191, a movable member 195, and the pusher 197.

The movable gear 191 is rotatably coupled with a shaft protrusion 111k protruded at one side of the lower housing 111. In this case, the movable gear 191 is rotated by being supplied with a rotating force of the main gear 187 through a plurality of driven gears 192a, 192b, and 192c which are rotatably disposed at one side of the lower housing 111 and engaged with each other.

Further, the movable gear 191 drives the movable member 193 to the pair of pressure rollers 181 and 183 through a cam structure formed between the movable gear 191 and the movable member 195.

The cam structure includes a cam protrusion 193 (see FIG. 22A) formed on one surface of the movable gear 191 facing the movable member 195 to be integrated with the movable gear 191 and first and second cam followers 194a and 194b formed on one surface of the movable member 195 to cam-contact the cam protrusion 193.

The cam protrusion 193 is provided with a contact surface 193a (see FIG. 22A) contacting the first and second cam followers 194a and 194b. The contact surface 193a is curved at a curvature larger than that of the movable gear 191 from a location adjacent to a center of the movable gear 191 to a location adjacent toward an outer circumferential edge of the movable gear 191.

Figure 22A:
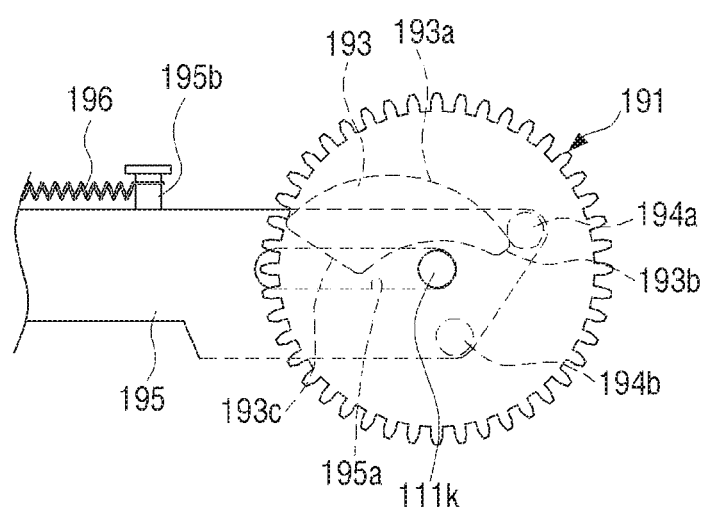
FIGS. 22A, 22B, and 22C are diagrams sequentially illustrating a driving process of the instant film setting part.

Further, referring to FIG. 22A, the other end portion 193c of the cam protrusion 193 is wider than one end portion 193b thereof and thus the movable gear 191 is not rotated by interfering with the second cam follower 194b when it is rotated counterclockwise, such that the movable gear 191 is rotated only in one direction (clockwise).

The movable member 195 moves in a direction in parallel with the transfer direction of the instant film 140 by interlocking with the rotation of the movable gear 187 to push the instant film 140 through the pusher 197 coupled with the movable member 195 up to a position where the front end portion 140a of the instant film 140 may be engaged with the pair of pressure rollers 181 and 183.

The movable member 195 is provided with a long hole 195a through which the shaft protrusion 111k penetrates and into which a guide protrusion 111m is slidably inserted. Further, the movable member 195 is elastically supported to the lower housing 111 by the elastic member 196 (see FIG. 5). In this case, one end portion of the elastic member 196 is fixed to the locking protrusion 195b of the movable member 195 and the other end portion thereof is fixed to a locking protrusion 111p of the lower housing 111. Therefore, the moving member 195 introduces the instant film 140 into the pair of pressure rollers 181 and 183 through the foregoing cam structure depending on the rotation of the movable gear 191 and then returns to an original position by the elastic member 196 when the cam contact is released.

Further, one surface of the movable member 195 is provided with the guide protrusion 195c and is slidably inserted into a long hole (not illustrated) formed at a predetermined position of an inner circumferential surface of the guide panel 188. The guide protrusion 195c guides a straight movement of the movable member 195 together with the guide protrusion 111m of the lower housing 111.

Figure 19:
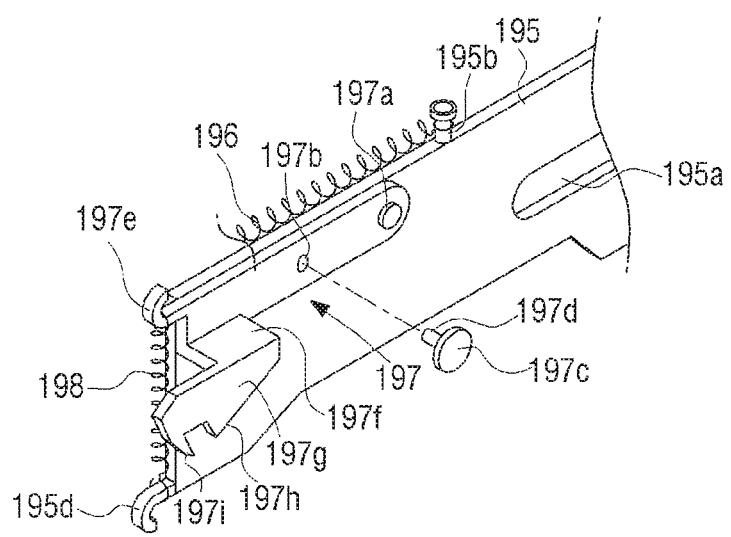
FIG. 19 is a perspective view illustrating a rear end portion of the movable member illustrated in FIG. 18.

FIG. 19 is a perspective view illustrating a rear end portion of the movable member illustrated in FIG. 18.

As illustrated in FIG. 19, the pusher 197 is disposed on one surface of the rear end portion of the movable member 195. The pusher 197 has one end portion hinge-coupled with the movable member 195 by the hinge pin 197a and has approximately a central portion provided with a restriction hole 197b.

A coupling protrusion 197d of a fixture 197c penetrates through the restriction hole 197b. In this case, the restriction hole 197b has approximately a long hole shape to move the pusher 197 up and down, which is to minimize the interference of the hook part 197g with the instant film 140 when the pusher 197 moves to an original position together with the movable member 195 to smoothly move the movable member 195.

Further, the other portion of the pusher 197 is provided with a fixed protrusion 197e to which one end portion of the elastic member 198 is fixed. In this case, the other end of the elastic member 198 is fixed to the fixed protrusion 195d formed at the rear end portion of the movable member 195. Therefore, the pusher 197 is pulled down by the elastic member 198 and thus is restricted from moving down due to the coupling protrusion 197d of the fixture 197c.

Further, in the pusher 197, a connection protrusion 197f protrudes toward the instant film 140 from one surface of the rear end portion of the movable member 195 and the hook part 197g is extendedly formed at one end portion of the connection protrusion 197f.

The hook part 197g is inserted into a through hole 111n formed in the lower housing 111 and is disposed at a position where it may be inserted along a through groove 125 (see FIG. 9) of the instant film cassette 120.

The hook part 197g is provided with an inclined part 197h slid on a surface of the instant film 140 when the pusher 197 moves toward the instant film 140 and a locking part 197i locked to the rear end portion 140b of the instant film 140 to push the instant film 140.

Hereinafter, an operation of the portable image-forming device 100 according to an embodiment of the present disclosure configured as described above will be sequentially described with reference to FIGS. 20 to 24.

Figure 20:
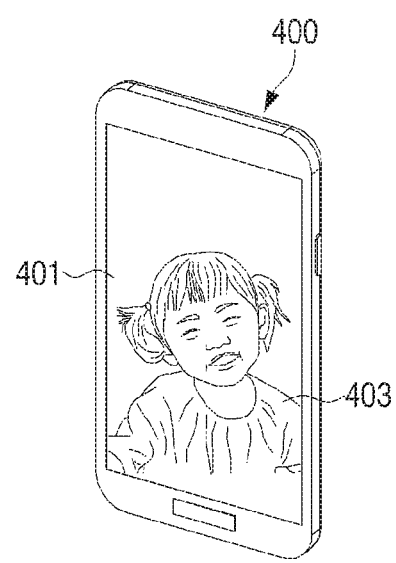
FIG. 20 is a perspective view illustrating a typical mobile phone.
Figure 21:
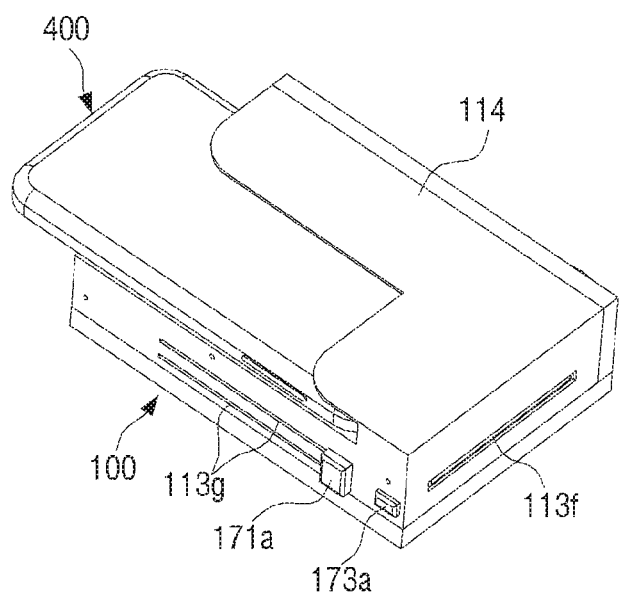
FIG. 21 is a perspective view illustrating a state in which the mobile phone illustrated in FIG. 20 is inserted into an insertion space formed by the fixed part of the portable image-forming device.
Figure 22B:
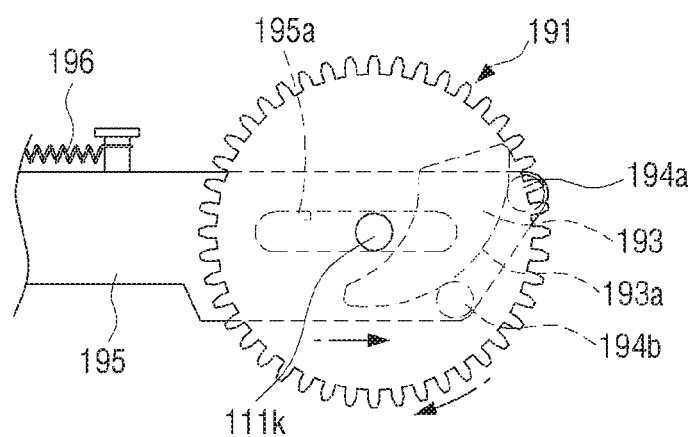
Figure 22C:
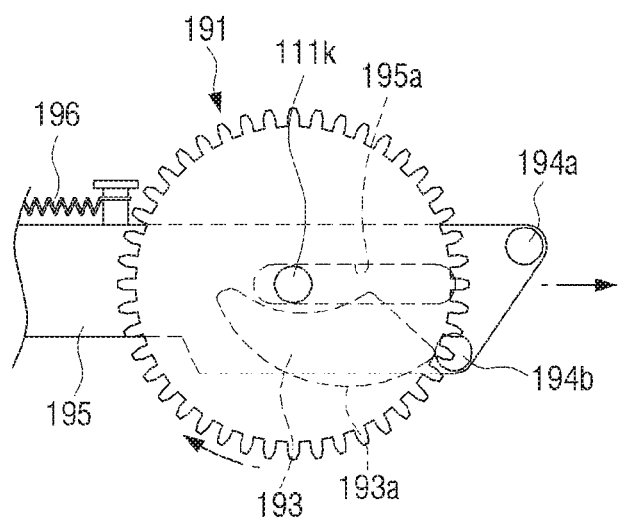
Figure 23A:
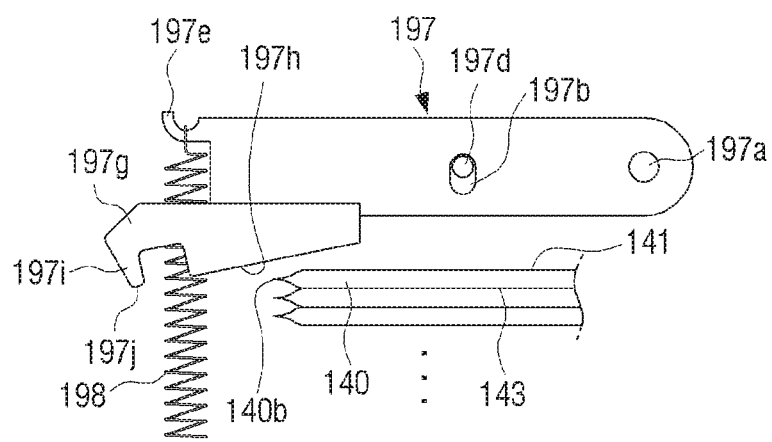
FIGS. 23A, 23B, and 23C are diagrams sequentially illustrating a process of pushing, by a pusher of the instant film setting part, the instant film.
Figure 23B:
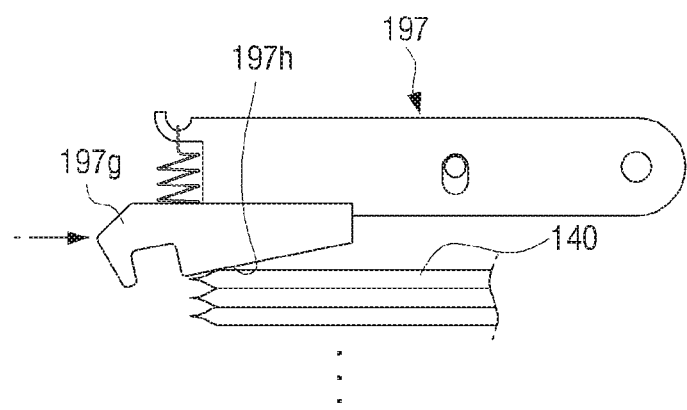
Figure 23C:
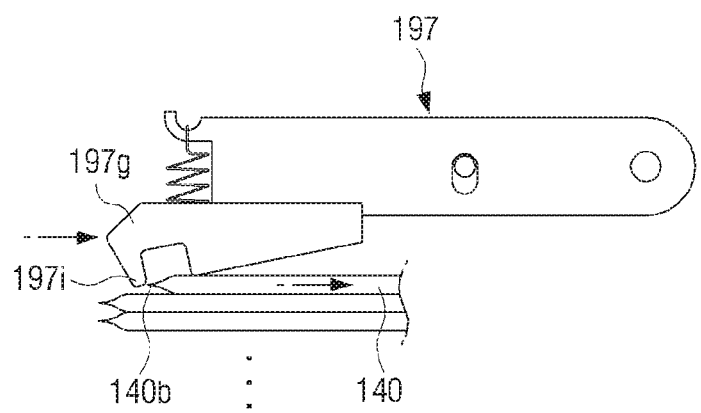
Figure 24:
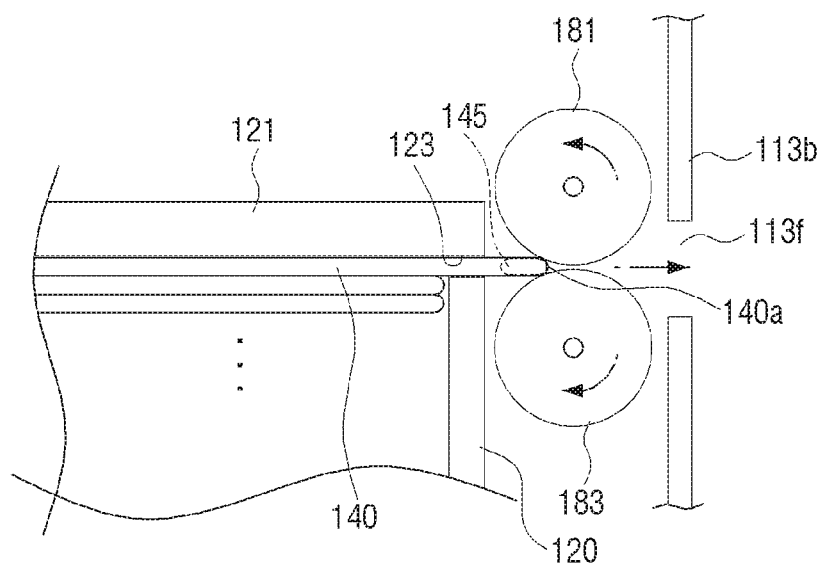
FIG. 24 is a cross-sectional view schematically illustrating a state in which the instant film is pushed by the pusher to be introduced into a developer spreading member.

FIG. 20 is a perspective view illustrating a typical mobile phone, FIG. 21 is a perspective view illustrating a state in which the mobile phone illustrated in FIG. 20 is inserted into an insertion space formed by the fixed part of the portable image-forming device, FIGS. 22A to 22C are diagrams sequentially illustrating a driving process of the instant film setting part, FIGS. 23A to 23C are diagrams sequentially illustrating a process of pushing, by a pusher of the instant film setting part, the instant film, and FIG. 24 is a cross-sectional diagram schematically illustrating a state in which the instant film is pushed by the pusher to be introduced into a developer spread member.

First, as illustrated in FIG. 4, the instant film cassette 120 into which the instant film 140 is inserted is mounted inside the housing part 110.

Next, as illustrated in FIG. 20, an image 403 to be printed is displayed on the screen 401 of the display device 400 and then as illustrated in FIG. 20, the screen 401 is toward the incident window 113e (see FIG. 2) to be inserted into the insertion space 114a (see FIG. 4) formed between the upper housing 113 and the fixed part 114.

In this state, as illustrated in FIG. 21, the traction part 170 pulls one portion 171a of the lever 171 toward the unlocking button 173a so that it is locked by the locking member 173. In this case, the lever 171 moves by a manual operation of a user.

In this case, the exposure member 130 moves from the post-exposure position P2 (see FIG. 10) to the pre-exposure position P1 (see FIG. 10) by interlocking with the movement of the lever 171 and as illustrated in FIG. 13, the lens array 131 is closed by the shutter 135 upon the movement. Therefore, the photosensitive surface 141 of the instant film 140 is not exposed to light diverging from the screen 401 due to the shutter 135 and the light blocking member 150.

Next, if the unlocking button 173a is pressed by a user, the lever 171 releases the locking by the locking member 173 and moves to an original position by the elastic force of the elastic member 175 (see FIG. 6).

The exposure member 130 interlocks with the movement of the lever 171 to move from the pre-exposure position P1 to the post-exposure position P2. Upon the movement of the exposure member 130, as illustrated in FIG. 14, the lens array 131 is open while the light passing hole 135i of the shutter 135 corresponds to the lens array 131. Therefore, the light diverging while the image 403 is displayed on the screen 401 of the display device 400 is exposed to the photosensitive surface 141 of the instant film 140 while being irradiated along the instant film 140 through the lens array 131.

In this case, the moving speed of the exposure member 130 toward the post-exposure position P2 is controlled (reduced) by at least any one of the foregoing damping parts 155, 156, and 157 and the exposure member 130 appropriately exposes the photosensitive surface 141 of the instant film 140 to light.

Next, the liquid-phase developer is spread into the instant film 140, and at the same time the rotation knob 189 is rotated to discharge the instant film 140 through the instant film discharge hole 113f.

Therefore, the rotating force of the main gear 187 is transferred to the movable gear 191 through the plurality of driven gears 192a, 192b, and 192c. As illustrated in FIGS. 22A to 22C, the movable gear 191 straight moves the movable member 195 toward the pair of pressure rollers 181 and 183 while the first and second cam followers 194a and 194b sequentially contact the contact surface 193a during the rotation of the cam protrusion 193.

Simultaneously, as illustrated in FIGS. 23A to 23C, the pusher 197 moves toward the rear end portion of the instant film 140. Therefore, the pusher 197 pushes the instant film 140 toward the pair of pressure rollers 181 and 183 in the state in which the hook part 197g is inserted into the through groove 125 (see FIG. 9) of the instant film cassette 120 and then the locking part 197i of the hook part 197g is locked to the rear end portion 140b of the instant film 140.

Therefore, as illustrated in FIG. 24, the instant film 140 is introduced so that the front end portion 140a is engaged between the pair of pressure rollers 181 and 183. In this case, if the cam contact is released, the movable member 193 returns to a position where it may push the rear end portion of the next instant film 140 by the elastic member 196.

The pair of pressure rollers 181 and 183 draw the front end portion 140a of the instant film 140 into the pair of pressure rollers 181 and 183 by the rotating force transferred from the main gear 187 depending on the rotation of the rotation knob 189 to feed the front end portion 140a of the instant film 140 toward the discharge hole 113f.

In this case, the liquid-phase developer 145 included in the instant film 140 is gradually spread to the instant film 140 while being pressed by the pair of pressure rollers 181 and 183. Therefore, the developer 145 is absorbed into an emulsion (not illustrated) of three layers which is disposed in the instant film 140 to perform development.

The instant film 140 is discharged to the outside of the portable image-forming device 100 through the discharge hole 113f by the pair of pressure rollers 181 and 183 and then after approximately few minutes, an image is displayed on a print surface of the instant film 140.

As such, the portable image-forming device 100 according to the embodiment of the present disclosure does not require a separate power supplying structure, for example, a separate battery or power supplier. Therefore, the present disclosure does not require the separate power supplying structure and therefore may reduce the weight of the portable image-forming device 100, such that the portable image-forming device 100 may be easily carried and conveniently maintained and managed.

Hereinafter, a configuration of a portable image-forming device according to a embodiment of the present disclosure will be described with reference to FIGS. 25 to 30.

Figure 25:
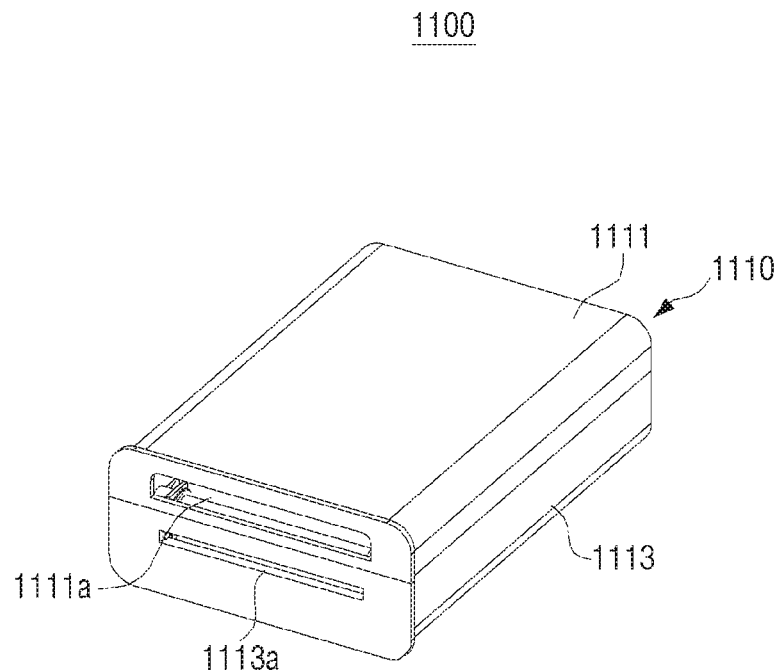
FIG. 25 is a perspective view illustrating a portable image-forming device according to an embodiment of the present disclosure.
Figure 26:
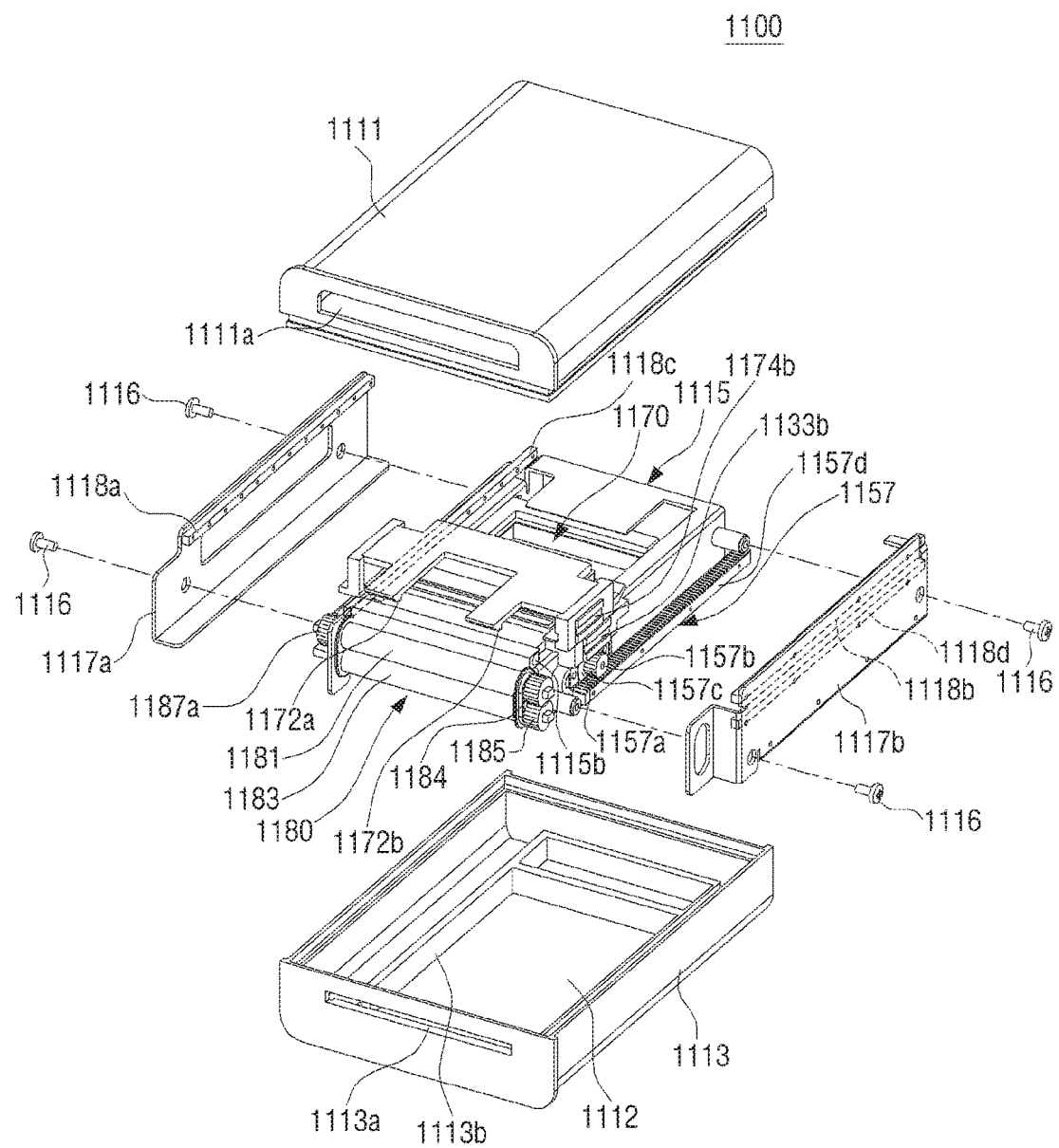
FIG. 26 is an exploded perspective view illustrating the portable image-forming device according to the embodiment of the present disclosure.
Figure 27A:
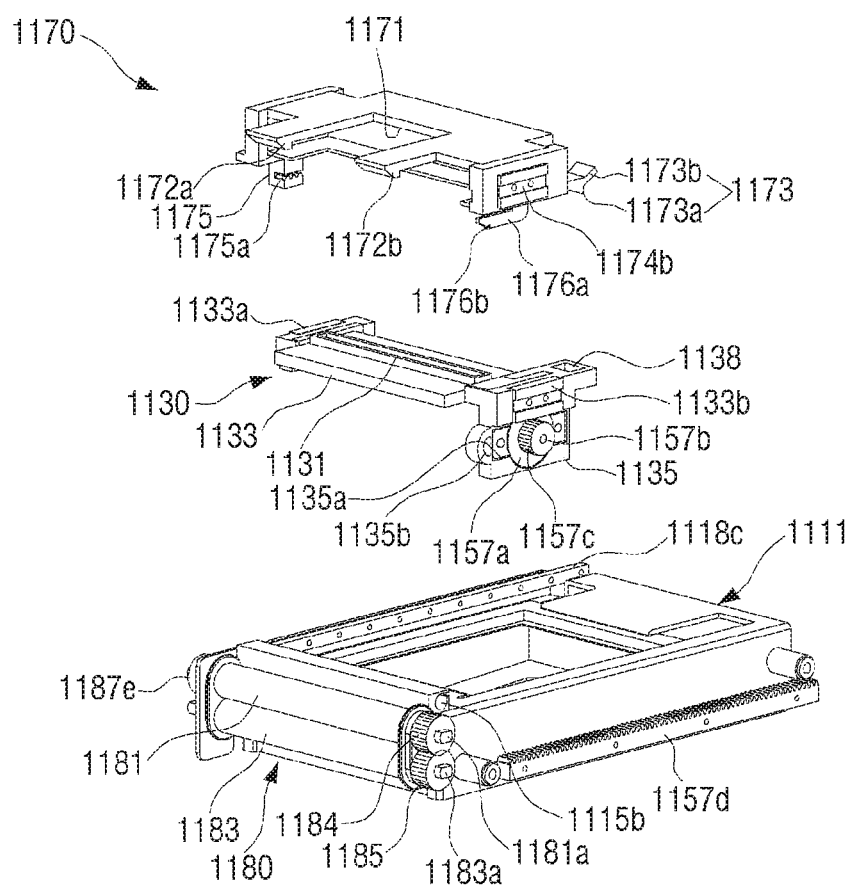
FIGS. 27A and 27B are perspective views illustrating an internal housing, an exposure member, and a traction part illustrated in FIG. 26.
Figure 27B:
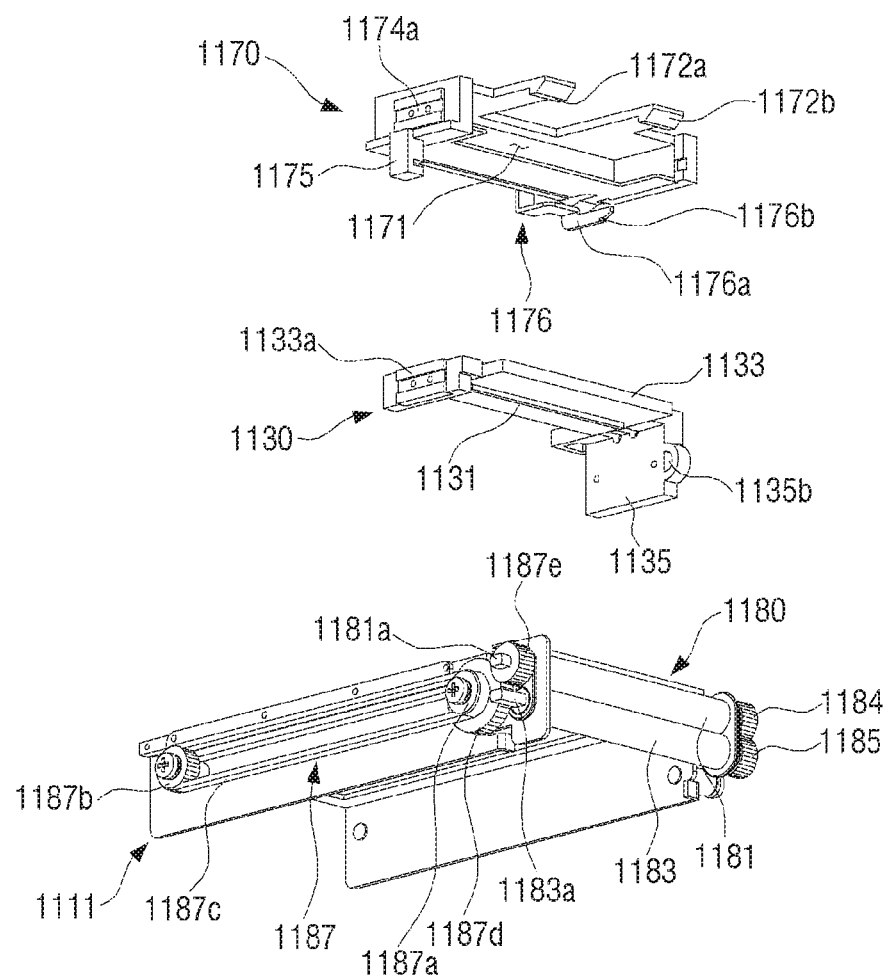
Figure 28:
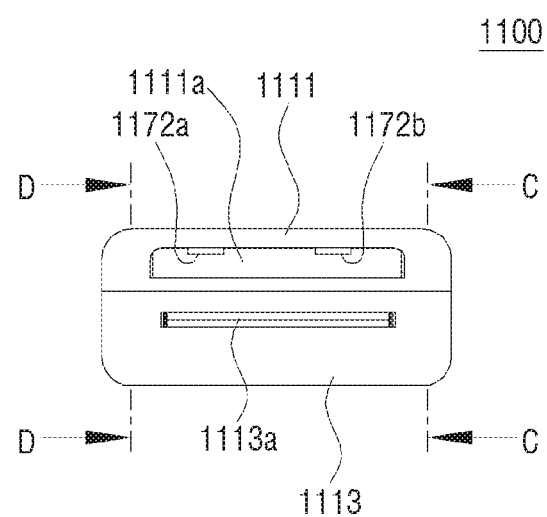
FIG. 28 is a front view illustrating the portable image-forming device according to the embodiment of the present disclosure.
Figure 29:
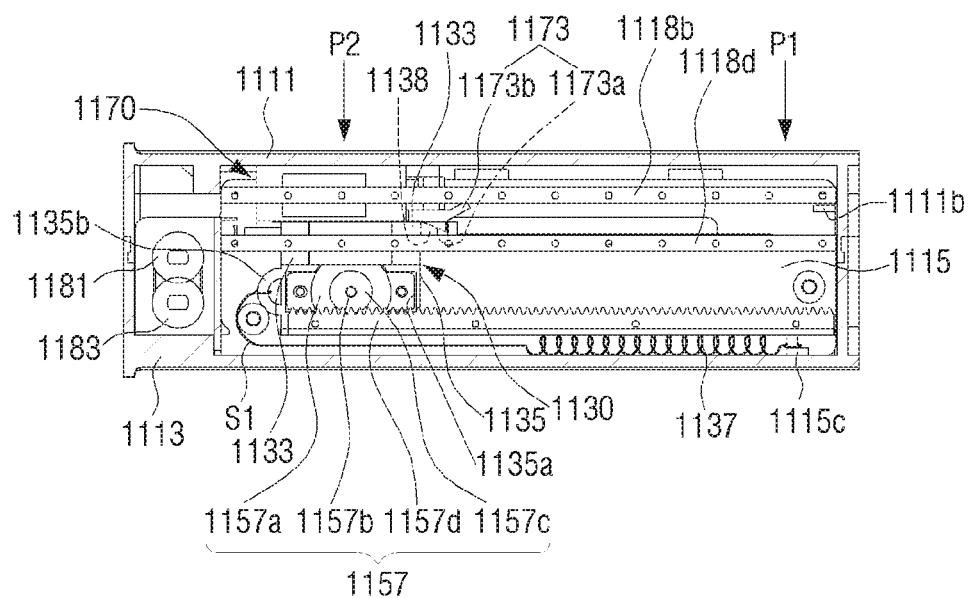
FIG. 29 is a cross-sectional view taken along the line C-C illustrated in FIG. 28.
Figure 30:
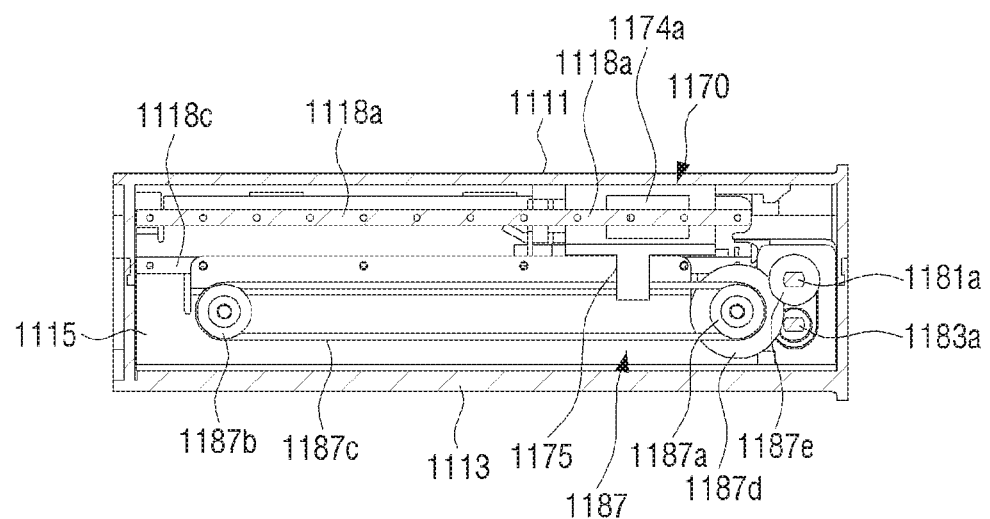
FIG. 30 is a cross-sectional view taken along the line D-D illustrated in FIG. 28.

FIG. 25 is a perspective view illustrating a portable image-forming device according to a embodiment of the present disclosure, FIG. 26 is an exploded perspective view illustrating the portable image-forming device according to the embodiment of the present disclosure, FIGS. 27A and 27B are perspective views illustrating an internal housing, an exposure member, and a traction part illustrated in FIG. 26, FIG. 28 is a front view illustrating the portable image-forming device according to the embodiment of the present disclosure, FIG. 29 is a cross-sectional view taken along the line C-C illustrated in FIG. 28, and FIG. 30 is a cross-sectional view taken along the line D-D illustrated in FIG. 28.

A portable image-forming device 1100 according to the embodiment of the present disclosure is configured to include a housing part 1110, an exposure member 1130, a light blocking member 1150, a damping part 1557, a traction part 1170, a developer spreading member 1180, and an instant film setting part 1190.

The housing part 1110 includes first and second outer housings 1111 and 1113 and an internal housing 1115 disposed inside the first and second inner housings 1111 and 1113.

Referring to FIGS. 25 and 26, the first outer housing 1111 encloses an upper portion of the inner housing 1115 and a front end portion thereof is provided with an insertion hole 1111a into which the portable display device 400 is inserted. The insertion hole 1111a includes a typical holder type variable structure (not illustrated) that varies to correspond to a size of the portable display device 400, and as a result the portable display device 400 having various sizes (width and thickness) depending on a type of portable display device 400 may be inserted.

The second outer housing 1113 encloses a lower portion of the inner housing 1115 and a front end portion (portion provided with the insertion hole 1111a of the first outer housing 1111) thereof is provided with a discharge hole 1113a through which the instant film 1140 is discharged.

Further, a bottom portion of the second outer housing 1113 is provided with a mounting hole 1113b through which an instant film cassette 1120 is mounted in a space part 1115a of the inner housing 1115 and is provided with a door 1112 for opening and closing the mounting hole 1113b.

In the case of the portable image-forming device 1100 according to the embodiment of the present disclosure, the portable display device 400 inserted into the insertion hole 1111a of the first outer housing 1111 is drawn out, and at the same time the instant film 1140 is discharged through the discharge hole 1113a of the second outer housing 1113. The operation of the portable image-forming device 1100 according to the embodiment of the present disclosure will be described below.

Referring to FIGS. 27A and 27B, the inside of the inner housing 1115 is provided with the space part 1115a into which the instant film cassette 1120 is inserted and the front end portion thereof is provided with a developer spreading member 1180. Further, one side of the inner housing 1115 is provided with a driver 1187 for driving the developer spreading member 1180.

Further, the front end portion of the upper portion of the inner housing 1115 is provided with a first cylindrical groove 1115b into which the other end portion 1151b of the first light blocking film 1151 of the light blocking member 1150 is inserted in a rolled state.

One side and the other side of the inner housing 1115 are each fastened with first and second brackets 1117a and 1117b at a predetermine interval by a plurality of fasteners 1116.

The first bracket 1117a is provided with a first guide rail 1118a for guiding a straight movement of the traction part 1170 along an inner side of the first bracket 1117a. In this case, an inner surface of one side of the inner housing 1115 is provided with a third guide rail 1118c for guiding a straight movement of the exposure member 1130.

The second bracket 1117b is provided with a second guide rail 1118b for guiding a straight movement of the traction part 1170 along the inner side of the second bracket 1117b and a fourth guide rail 1118d for guiding a straight movement of the exposure member 1130 in parallel with each other at a predetermined interval.

The exposure member 1130 exposes the photosensitive surface of the instant film 1140 disposed inside the housing part 1110 using light diverging from the screen 401 of the portable display device 400 while moving along the inner housing 1115.

The exposure member 1130 includes a lens array 1131, a frame 1133, a mounting part 1135, and an elastic member 1137.

The lens array 1131 is coupled with the frame 1133 and is a small lens group using a difference in refractive index within a glass fiber and a typical lens array adopted when like a scanner, an interval between an object to be scanned and a reader is narrow.

The frame 1133 reciprocates the lens array 1131 between the pre-exposure position P1 (see FIG. 29) and the post-exposure position P2 (see FIG. 29). Further, both sides of the frame 1133 are provided with first and second guide blocks 1133 that are slidably coupled with the first and second guide rails 1118a and 1118b. Therefore, the frame 1133 is linearly reciprocated along a length direction of the portable image-forming device 1100.

The mounting part 1135 extends toward the other side of the inner housing 1115 and is provided with a mounting groove 1135a in which a rotary damper 1157a is mounted and provided with a ring part 1135b to which one end portion of the first string S1 is fixed.

Referring to FIG. 29, the other end portion of the first string S1 is fixed to one end portion of the elastic member 1137 and the other end portion of the elastic member 1137 is fixed to a fixed protrusion 1115c of the inner housing 1115. Therefore, after the exposure member 1130 is towed from the post-exposure position P2 to the pre-exposure position P1 by the traction part 1170, the exposure member 1130 may return to the post-exposure position P2 by using the elastic force of the elastic member 1137 when the connection to the traction part 1170 is released.

Further, a portion of the frame 1133 is provided with a locking hole 1138 with which the locking protrusion 1173a of the traction part 1170 is detachably coupled. In this case, if the locking protrusion 1173a of the traction part 1170 keeps on being coupled with the locking hole 1138 of the frame 1133, the traction part 1170 may tow the exposure member 1130 from the post-exposure position P2 to the pre-exposure position P1. On the contrary, if the locking protrusion 1173a of the traction part 1170 is separated from the locking hole 1138 at the pre-exposure position P1, the traction part 1170 is disconnected from the exposure member 1130 and as described above, the exposure member 1130 returns to the post-exposure position P2 by the elastic force of the elastic member 1137.

Figure 34A:
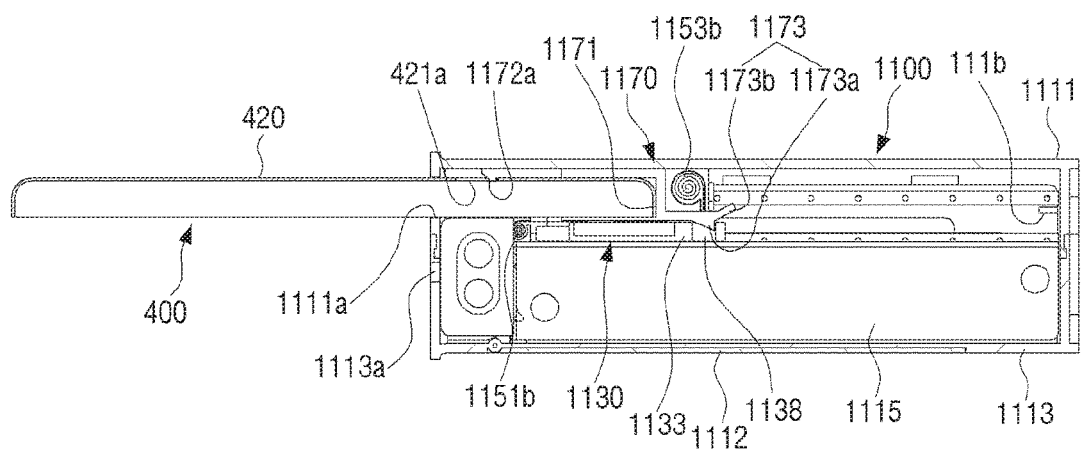
FIG. 34A is a cross-sectional view taken along the line E-E illustrated in FIG. 33.
Figure 34B:
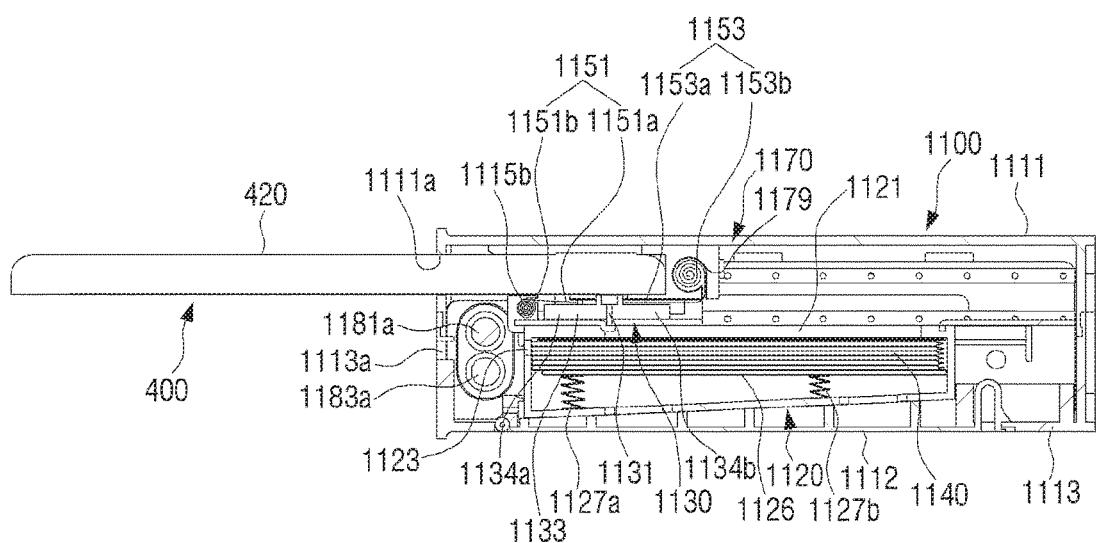
FIG. 34B is a cross-sectional view taken along the line F-F illustrated in FIG. 33.

The light blocking member 1150 may be formed of an opaque film having an elastic force in itself and includes the first light blocking film 1151 and the second light blocking film 1153 as illustrated in FIG. 34B.

One end portion 1151a of the first light blocking film 1151 is fixed to the front end portion 1134a of the frame 1133 and the other end portion thereof is inserted into the first cylindrical groove 1115b in a state in which the other end portion 1151b thereof is rolled up. In this case, the other end portion 1151b of the first light blocking film 1151 is unfolded while being released when the traction part 1170 moves to the pre-exposure position P1 along with the exposure member 1130, and then is again rolled up by the elastic force in itself when the exposure member 1130 returns to the post-exposure position P2.

One end portion 1153a of the second light blocking film 1153 is fixed to the rear end portion 1134b of the frame 1133 and the other end portion thereof is inserted into the second cylindrical groove 1179 (see FIG. 34b) in a state in which the other end portion 1153b thereof is rolled up. In this case, the other end portion 1153b of the second light blocking film 1153 is unfolded while being released when returning to the post-exposure position P2 in the state in which the traction part 1170 stays in the pre-exposure position P1, and then the exposure member 1130 is again rolled up by the elastic force in itself when the traction part 1170 returns to the post-exposure position P2 where the exposure member 1130 is positioned.

According to the present disclosure, to clearly display the image printed on the instant film 1140, the exposure amount may be controlled by appropriately controlling the moving speed of the exposure member 1130 including the lens array 1131 moving from the pre-exposure position P1 to the post-exposure position P2. For this purpose, according to the present disclosure, as illustrated in FIG. 29, the damping part 1157 may be provided.

Referring to FIGS. 27A and 29, the damping part 1157 may include a typical rotary damper 1157a, a pinion 1157c, and a rack 1157d.

The rotary damper 1157a is fixedly inserted into the mounting groove 1135a and a rotating shaft 1157b of the rotary damper 1157a is coupled with the pinion 1157c. The pinion 1157c is coupled with the rotating shaft 1157b of the rotary damper 1157a, and thus rotates while interlocking with the rotating shaft 1157b and is engaged with the rack 1157d fixed to the other side of the inner housing 1115.

The damping part 1157 may reduce the moving speed of the exposure member 1130 due to the rotary damper 1157a when the exposure member 1130 moves from the pre-exposure position P1 to the post-exposure position P2 by the elastic force of the elastic member 1137 to appropriately expose the instant film 1140 to light through the lens array 1131.

In this case, the damping part 1157 may be used by replacing the rotary damper 1157a with a typical mechanical vibrator (not illustrated).

If the user force inserts the portable display device 400 into the insertion hole 1111a and then pushes the portable display device 400 in the insertion direction, the traction part 1170 tows the exposure member 1130 from the post-exposure position P2 to the pre-exposure position P1 in the state in which it is coupled with the exposure member 1130.

Referring to FIG. 27A and 27B, the inside of the traction part 1170 is provided with the insertion groove 1171 into which one end portion of the portable display device 400 is inserted.

Further, a front end portion of the traction part 170 is provided with a pair of hook parts 1173a and 1173b. The pair of hook parts 1173a and 1173b are detachably coupled with a pair of insertion holes 421a and 421b of the traction cover 420 (see FIG. 32) which is coupled with the portable display device 400.

In this case, as illustrated in FIG. 34A, when one end portion of the portable display device 400 with which the traction cover 420 is coupled is inserted into the insertion groove 1171 of the traction part 1170 through the insertion hole 1111a, the pair of hook parts 1173a and 1173b are inserted into the pair of insertion holes 421a and 421b of the traction cover 420.

Therefore, if the portable display device 400 is pushed to move the traction part 1170 from the post-exposure position P2 to the pre-exposure position P1 and then the portable display device 400 is pulled in a direction opposite to the insertion direction, the traction part 1170 may move the traction part 1170 to the post-exposure position P2 while the state in which the pair of hook parts 1173a and 1173b are locked to the pair of insertion holes 421a and 421b of the traction cover 420 is maintained.

A locking member 1173 extends from one side of the rear end portion of the traction part 1170 and the locking member 1173 includes a locking protrusion 1173a and an unlocking protrusion 1173b.

The locking protrusion 1173a is detachably inserted into the locking hole 1138 of the exposure member 1130. In this case, as the state in which the locking protrusion 1173a is coupled with the locking hole 1138 is maintained when the traction part 1170 moves from the post-exposure position P2 to the pre-exposure position P1, the exposure member 1130 may be towed from the post-exposure position P2 to the pre-exposure position P1 when the traction part 1170 moves.

Figure 35:
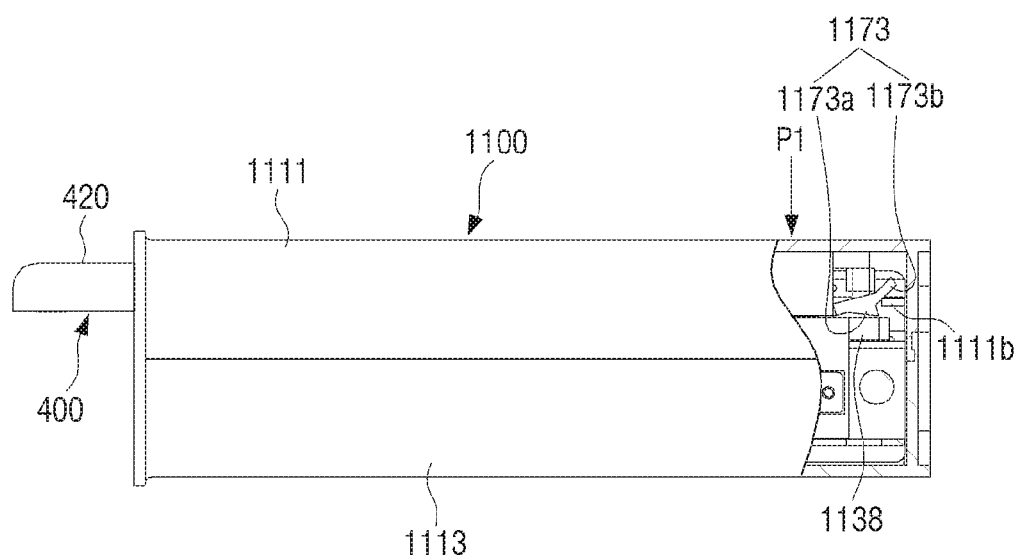
FIG. 35 is a partial cut-away cross-sectional view illustrating a state in which the portable display device is pressed in an insertion direction to be pushed into the image-forming device.

The unlocking protrusion 1173b is formed at the rear portion of the upper side of the locking protrusion 1173a to be inclined upwardly. If the traction part 1170 moves to the pre-exposure position P1, the unlocking protrusion 1173b climbs up the protrusion 1111b protruding from the inside of the rear end of the first outer housing 1111 as illustrated in FIG. 35. Therefore, the locking protrusion 1173a inserted into the locking hole 1138 is separated from the locking hole 1138 and the exposure member 1130 moves to the post-exposure position P2 by the elastic force of the elastic member 1137 while being unlocked from the traction part 1170.

Further, both sides of the traction part 1170 are each coupled with third and fourth guide blocks 1174a and 1174b that are slidably coupled with the third and fourth guide rails 1118c and 1118d. Therefore, the traction part 1170 is linearly reciprocated along a length direction of the portable image-forming device 1100.

Further, the traction part 1170 makes an arm 1175 be downwardly formed toward the side where the driver 1187 is positioned, in which the arm 1175 is provided with a gripping groove 1175a that grips a portion of a driving belt 1187a of the driver 1187. Therefore, the arm 1175 drives the driver 1187 when the traction part 1170 moves from a pre-printing position P1 to a printing completion position P2.

Further, a rear end portion of the traction part 1170 is detachably coupled with an instant film setting member 1176. A push bar 1176a extends from one side of the instant film setting member 1176.

The push bar 1176a pushes a rear end portion of the instant film 1140 up to an introduction part where the instant film 1140 is engaged with the pair of pressure rollers 1181 and 1183 so that the instant film 1140 may be discharged through the discharge hole 1113a while a front end portion of the instant film 1140 is engaged with the pair of pressure rollers 1181 and 1183 of the developer spreading member 1180 when the traction part 1170 moves from the pre-exposure position P1 to the post-exposure position P2. A front end portion of the push bar 1176*a* is provided with an insertion groove 1176*b* into which the rear end portion of the instant film 1140 is inserted to stably push the instant film 1140.

The developer spreading member 1180 includes the pair of pressure rollers 1181 and 1183, a pair of driven gears 1184 and 1185, and the driver 1187.

The pair of pressure rollers 1181 and 1183 are rotatably disposed at the front end portion of the inner housing 1115 and maintain a predetermined interval from each other to feed the instant film 1140 in the state in which the pressure rollers 1181 and 1183 press the instant film 1140.

The pair of driven gears 1184 and 1185 is each coupled with one side of the rotating shafts 1181*a* and 1183*a* of the pair of pressure rollers 1181 and 1183. The pair of driven gears 1184 and 1185 is engaged with each other to interlock with each other and thus when any one of the driven gears 1184 and 1185 rotates, the driven gears 1184 and 1185 simultaneously rotate the pair of pressure rollers 1181 and 1183.

The driver 1187 includes first and second gear pulleys 1187*a* and 1187*b* that are rotatably installed at the front and rear end portions of one side of the inner housing 1115, respectively, a driving belt 1187*c* connected to each of the gear pulleys 1187*a* and 1187*b*, and first and second power transfer gears 1187*d* and 1187*e*.

The first power transfer gear 1187*d* is fixed to the same rotating shaft as the first gear pulley 1187*a* to rotate together with the first gear pulley 1187*a*.

Referring to FIGS. 31 to 37, the operation of the portable image-forming device 1100 according to the embodiment of the present disclosure will be described.

Figure 31:
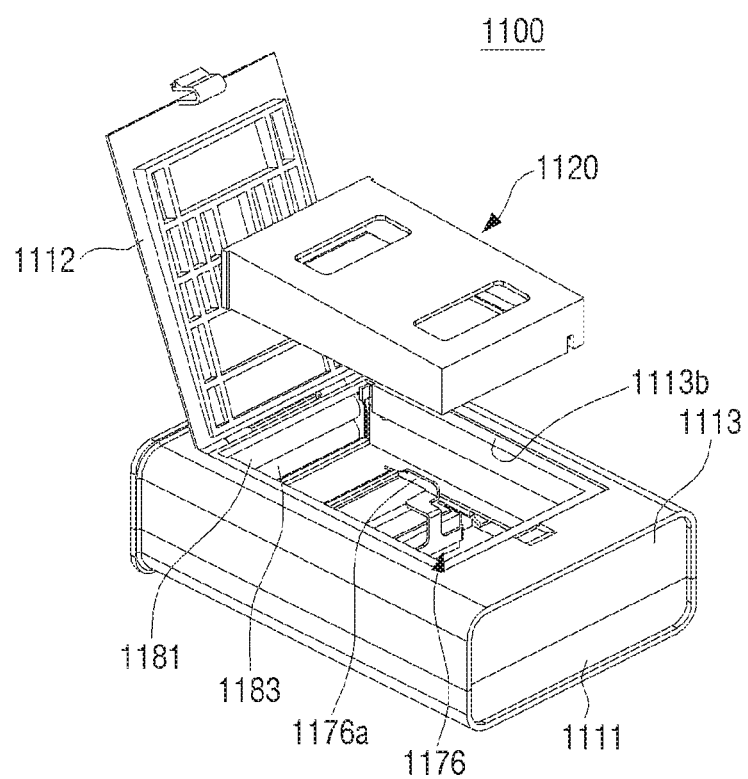
FIG. 31 is a perspective view illustrating a state in which a film cassette is mounted in the image-forming device according to the embodiment of the present disclosure.
Figure 32:
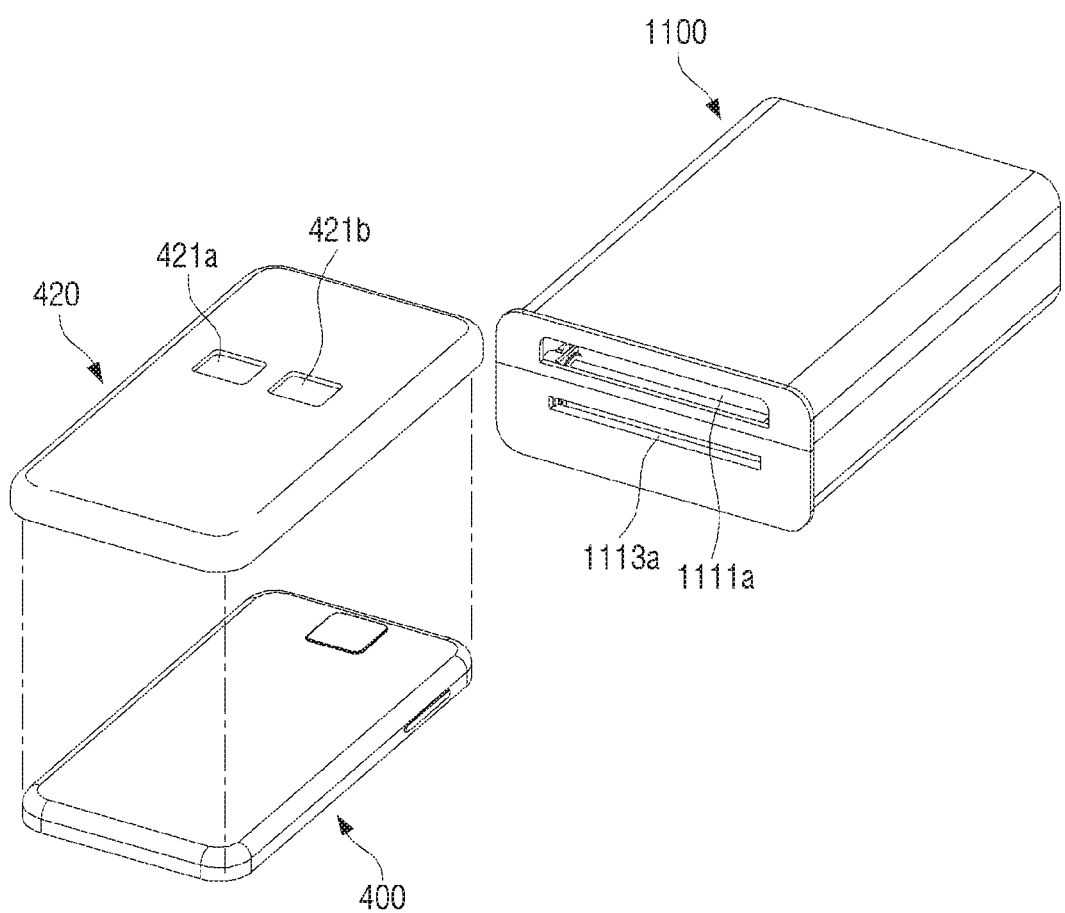
FIG. 32 is a perspective view illustrating a state in which a rear portion of the portable display device is covered with an auxiliary cover before the portable display device is inserted into an insertion hole of the image-forming device according to the embodiment of the present disclosure.
Figure 33:
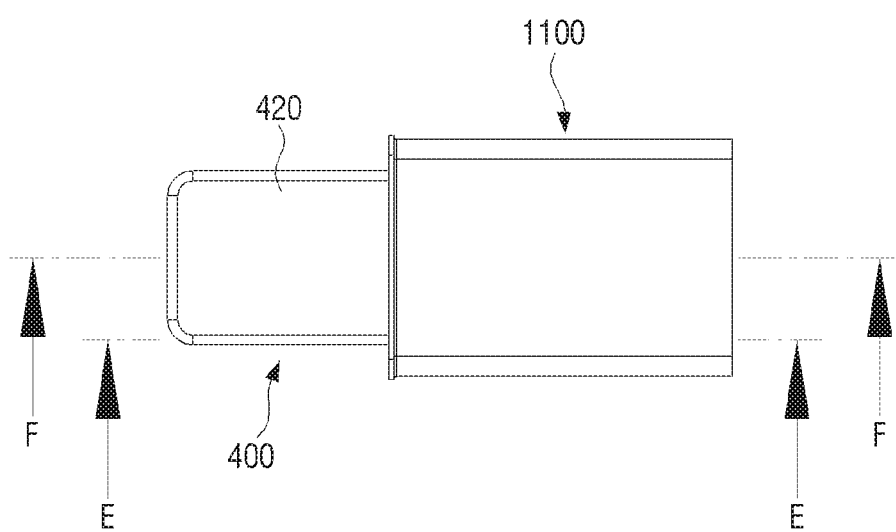
FIG. 33 is a plan view illustrating a state in which the portable display device is inserted into the image-forming device according to the embodiment of the present disclosure.
Figure 36:
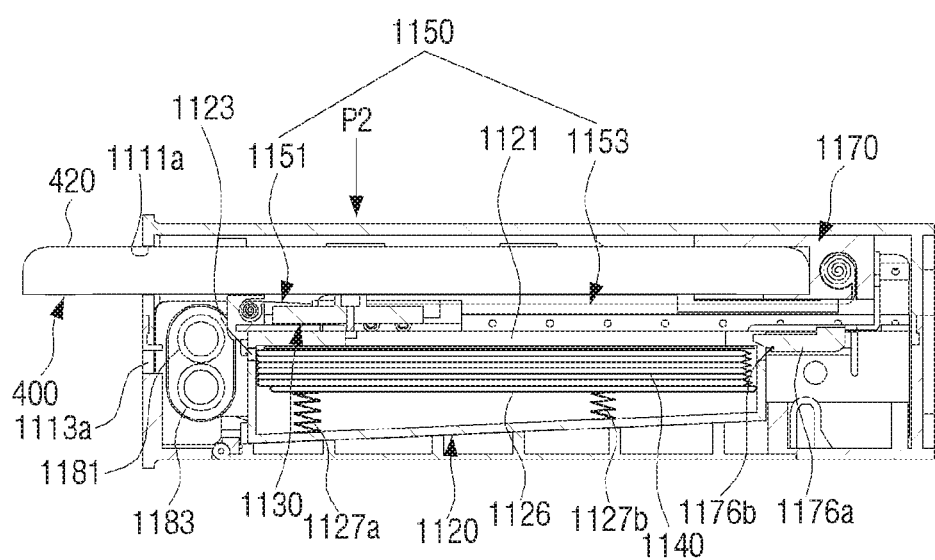
FIG. 36 is a cross-sectional view illustrating a state in which an exposure member returns from an exposure completion position to a post-exposure position.
Figure 37:
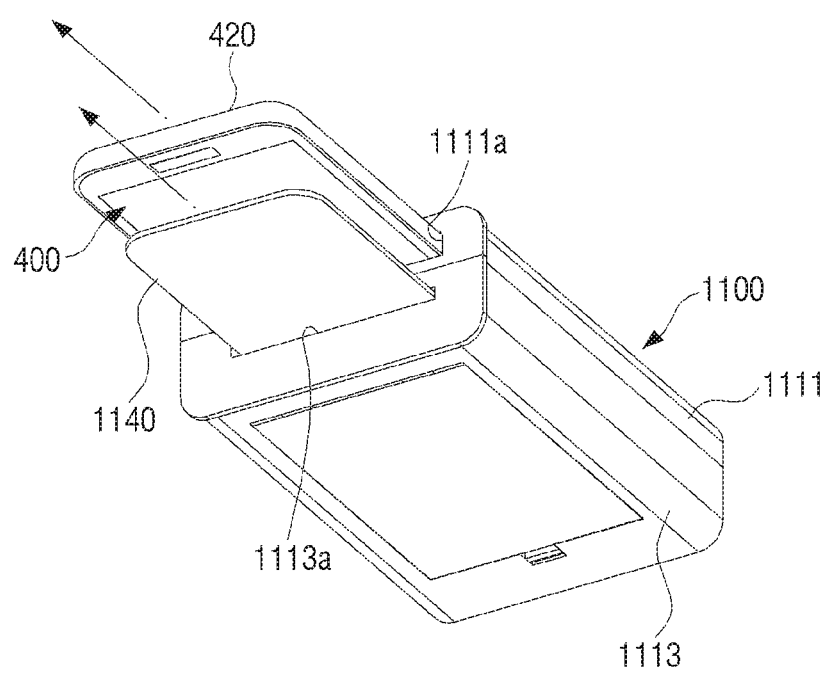
FIG. 37 is a perspective view illustrating a state in which the portable display device is pulled to drive a developer spreading member while returning a traction part to an original position to thereby discharge an instant film.

FIG. 31 is a perspective view illustrating a state in which a film cassette is mounted in the image-forming device according to the embodiment of the present disclosure, FIG. 32 is a perspective view illustrating a state in which a rear portion of the portable display device is covered with an auxiliary cover before the portable display device is inserted into an insertion hole of the image-forming device according to the embodiment of the present disclosure, FIG. 33 is a plan view illustrating a state in which the portable display device is inserted into the image-forming device according to the embodiment of the present disclosure, FIG. 34A is a cross-sectional view taken along the line E-E illustrated in FIG. 33, FIG. 34B is a cross-sectional view taken along the line F-F illustrated in FIG. 33, FIG. 35 is a partial cut-away cross-sectional view illustrating a state in which the portable display device is pressed in an insertion direction to be pushed into the image-forming device, FIG. 36 is a cross-sectional view illustrating a state in which an exposure member returns from an exposure completion position to a post-exposure position, and FIG. 37 is a perspective view illustrating a state in which the portable display device is pulled to drive a developer spread member while returning a traction part to an original position to thereby discharge an instant film.

First, as illustrated in FIG. 31, the instant film cassette 1120 is mounted in the inner housing 1115.

Next, as illustrated in FIG. 32, the traction cover 420 is coupled with the rear portion of the portable display device 400 and then the screen 401 is toward the instant film 1140 in the state in which a predetermined image 403 (see FIG. 20) to be printed is previously displayed on the screen 401 (see FIG. 20) of the display device 400 to push one end portion of the portable display device 400 into the insertion space 1171 of the traction part 1170 through the insertion hole 1111*a* as illustrated in FIG. 33.

In this case, as illustrated in FIG. 34A, the pair of hook parts 1172*a* and 1172*b* of the traction part 1170 are each snap-coupled with the insertion holes 421*a* and 421*b* of the traction cover 420 and the locking protrusion 1173*a* of the traction part 1170 is snap-coupled with the locking hole 1138 of the exposure member 1130.

In this state, the lens array 1131 of the exposure member 1130 is disposed at a position deviating from the screen 401 of the portable display device 400, and therefore the instant film 1140 is not exposed to the light diverging from the screen 401 while the exposure member 1130 moves from the post-exposure position P2 to the pre-exposure position P1 by the traction part 1170.

If the portable display device 40 is pushed in the insertion direction in the state in which one end portion of the portable display device 400 is inserted into the insertion space 1171 of the traction part 1170, the exposure member 1130 moves to the pre-exposure position P1 together with the traction part 1170 by the locking protrusion 1173*a*.

Referring to FIG. 35, if the traction part 1170 reaches the pre-exposure position P1, the unlocking protrusion 1173*b* climbs up the protrusion 1173*b* to move up and thus the locking protrusion 1173*a* is separated from the locking hole 1138 of the exposure member 1130.

Therefore, the exposure member 1130 moves to the post-exposure position P2 by the elastic force of the elastic member 1137 as illustrated in FIG. 36 while being unlocked from the traction part 1170. In this case, the light diverging while the image 403 being displayed on the screen 401 of the display device 400 when the exposure member 1130 moves to the post-exposure position P2 is exposed to the photo-sensitive surface 1140 of the instant film 1140 while being irradiated along the instant film 1140 through the lens array 1131.

In this case, the moving speed of the exposure member 1130 toward the post-exposure position P2 is controlled (reduced) by the foregoing damping part 1157 and the exposure member 1130 appropriately exposes the photosensitive surface of the instant film 1140 to light.

Thereafter, if a user pulls the portable display device 400 in a direction opposite to the insertion direction, the push bar 1176*a* of the instant film setting member 1176 pushes the rear end portion of the instant film 1140 while the traction part 1170 moving to the post-exposure position P2 to introduce the front end portion of the instant film 1140 to a position where the instant film 1140 may be engaged with the pair of pressure rollers 1181 and 1183 of the developer spreading member 1180.

Simultaneously, the pair of pressure rollers 1181 and 1183 rotate by the driver 1187 interlocking with the traction part 1170 to feed the front end portion 1140*a* of the instant film 1140 toward the discharge hole 1113*a*.

In this case, the liquid-phase developer 145 (see FIG. 24) included in the instant film 1140 is gradually spread to the instant film 1140 while being pressed by the pair of pressure rollers 1181 and 1183. Therefore, the developer 145 is absorbed into an emulsion (not illustrated) of three layers which is disposed in the instant film 1140 to perform development.

The instant film 1140 is discharged to the outside of the portable image-forming device 1100 through the discharge hole 1113*a* by the pair of pressure rollers 1181 and 1183 and then after approximately few minutes, an image is displayed on a print surface of the instant film 1140.

Figure 38:
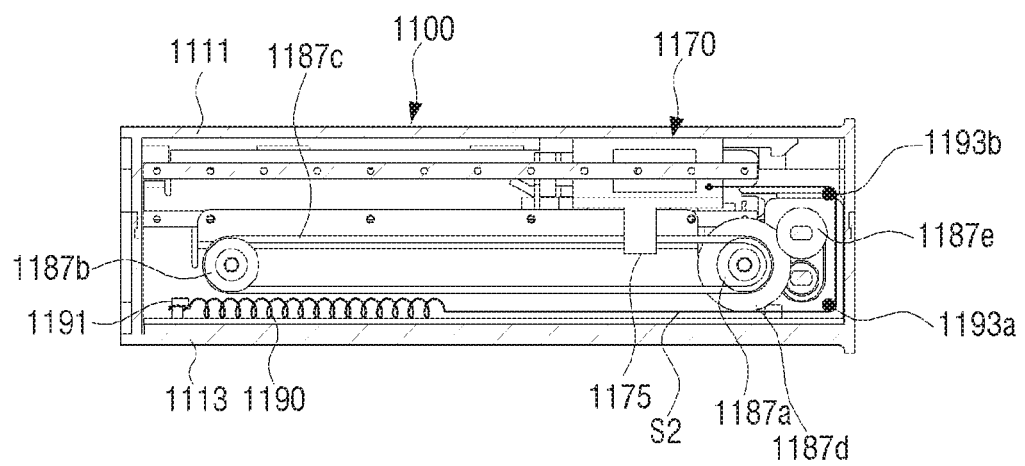
FIG. 38 is a diagram schematically illustrating an example in which an elastic member is connected to the other side of the exposure member so that the developer spreading member of the portable image-forming device according to the embodiment of the present disclosure is driven by an elastic force.

Meanwhile, the portable image-forming device 1100 according to the embodiment of the present disclosure has a structure in which the user pulls the portable display device 400 in the direction opposite to the insertion direction to move the traction part 1170 from the pre-exposure position P1 to the post-exposure position P2, but is not limited thereto. As illustrated in FIG. 38, the traction part 1170 may move from the pre-exposure position P1 to the post-exposure position P2 by using the elastic force of the elastic member 1190 which is connected to one side of the traction part 1170 through the second string S2.

In this case, one end portion of the elastic member 1190 is fixed to the fixed protrusion 1191 formed in the second outer housing 1113 and the other end portion thereof is connected to one end portion of the second string S2. In this case, the second string S2 is supported on a pair of support protrusions 1193a and 1193b formed in the inner housing 1115.

As such, as the other end portion of the second string S2 is connected to one side of the traction part 1170, the elastic force of the elastic member 1190 is increased while the traction part 1170 moves from the post-exposure position P2 to the pre-exposure position P1.

Therefore, after the exposure member 1130 is disconnected from the traction part 1170 and then moves from the pre-exposure position P1 to the post-exposure position P2, if the user force pressing the portable display device 400 in the insertion direction is removed, the traction part 1170 drives the driver 1187 while moving to the post-exposure position P2 by the elastic force of the elastic member 1190 to drive the developer spreading device 1180.

As such, when the elastic member 1190 is adopted, the traction cover 420 coupled with the portable display device 400 and the pair of hook parts 1172a and 1172b of the traction part 1170 may be omitted.

Referring to FIGS. 34B and 36, non-explained reference number 1121 shows an exposure hole, 1123 shows the discharge hole of the instant film cassette 1120 through which the instant film is discharged, 1126 shows a support plate on which the instant film 1140 is loaded, 1127a and 1127b each show a plurality of coil springs elastically supporting the support plate 1126 to the exposure hole 1121.

Figure 39:
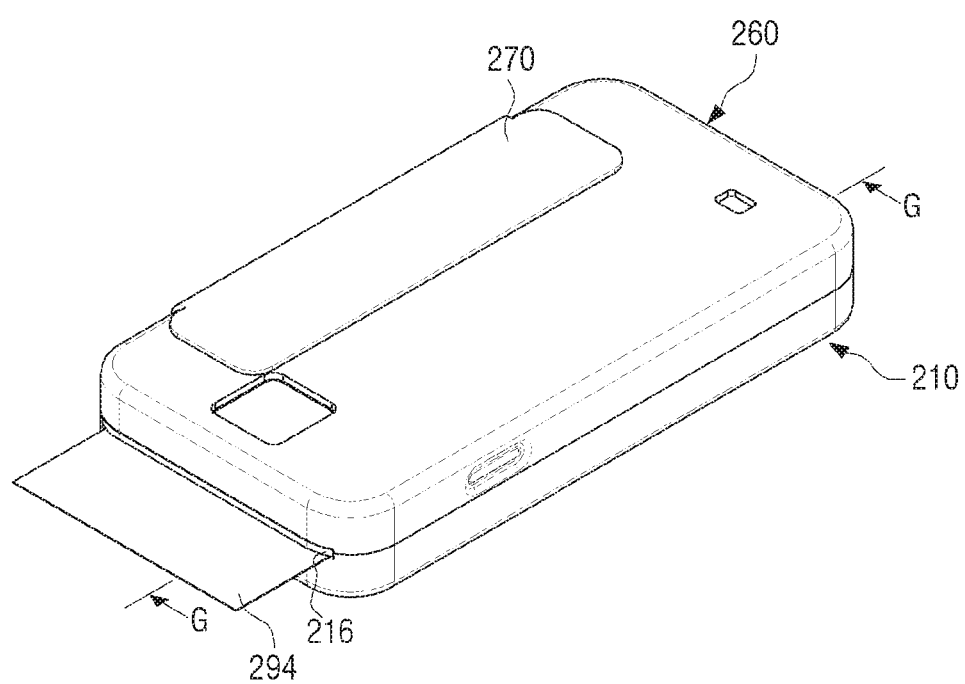
FIG. 39 is a perspective view illustrating a portable image-forming device according to an embodiment of the present disclosure.
Figure 40:
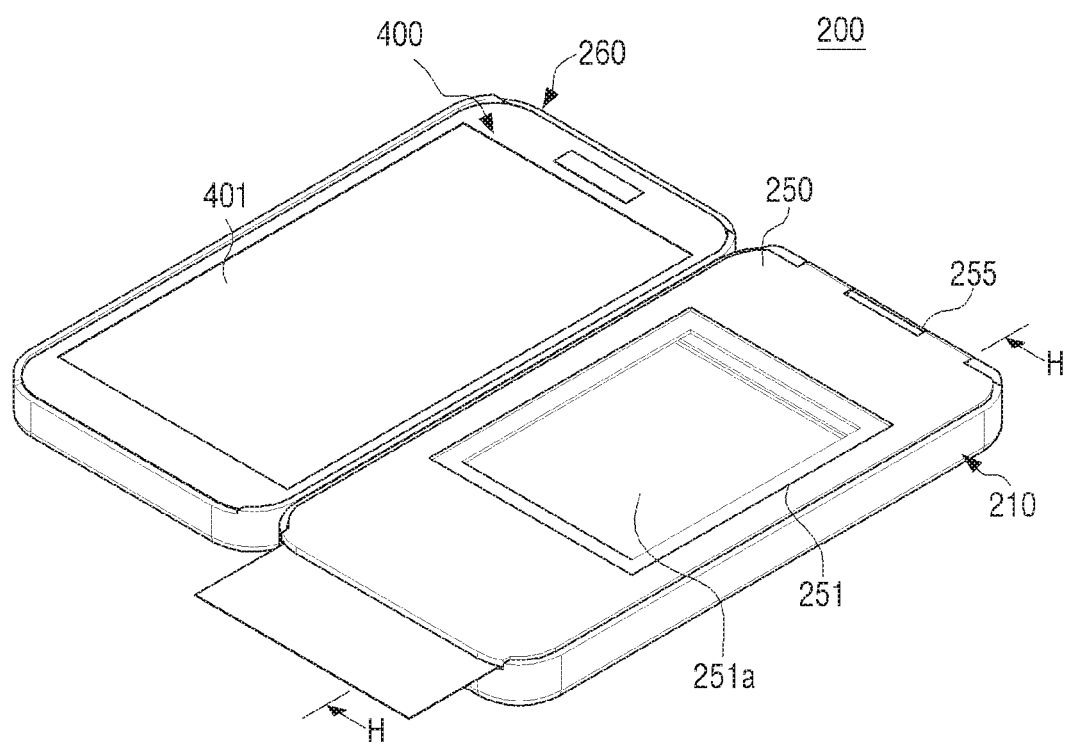
FIG. 40 is a perspective view illustrating a state in which a display fixing part in the portable image-forming device according to the embodiment of the present disclosure is open with respect to a housing.
Figure 41:
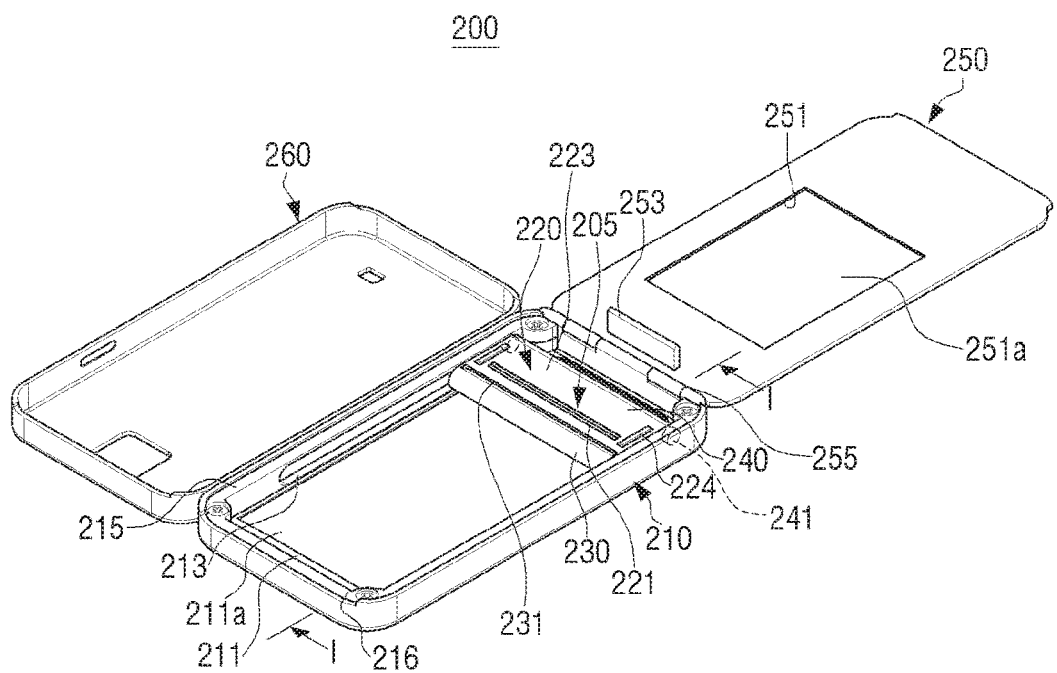
FIG. 41 is a perspective view illustrating a state in which an instant film and a display device are not mounted in the portable image-forming device according to the embodiment of the present disclosure.
Figure 42:
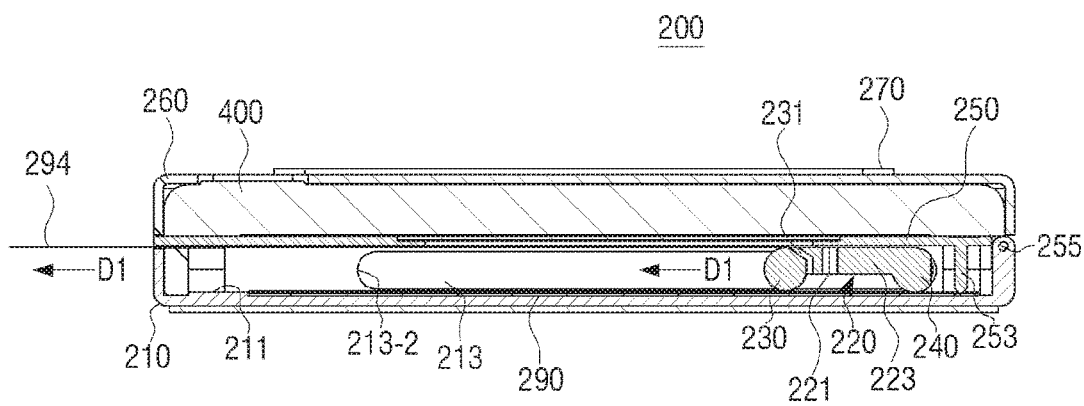
FIG. 42 is a cross-sectional view of the portable image-forming device of FIG. 39 taken along the line G-G.
Figure 43:
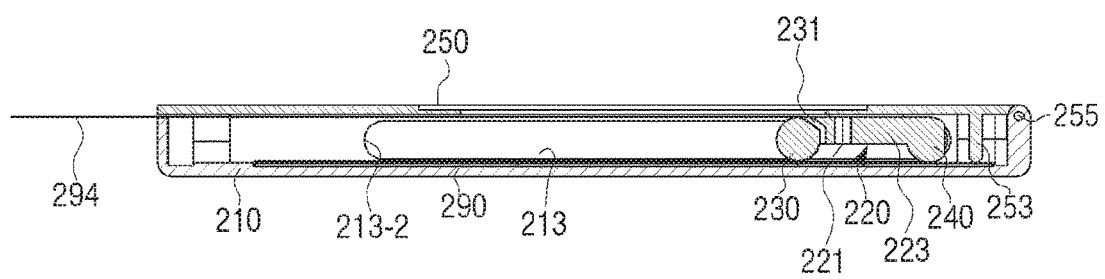
FIG. 43 is a cross-sectional view of the portable image-forming device of FIG. 40 taken along the line H-H.
Figure 44:
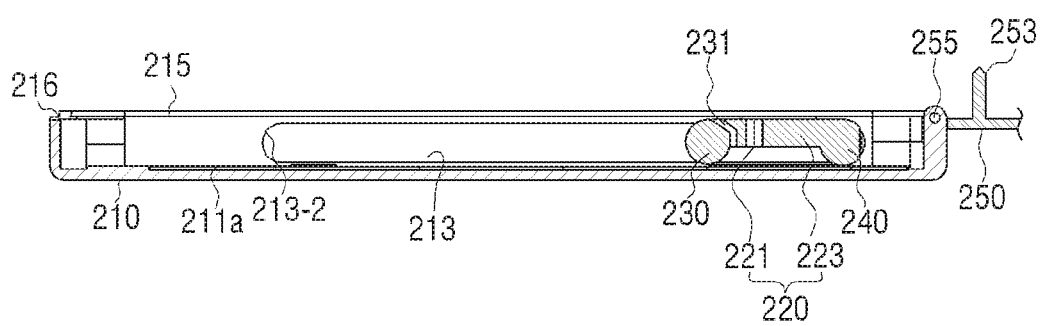
FIG. 44 is a cross-sectional view of the portable image-forming device of FIG. 41 taken along the line I-I.

FIG. 39 is a perspective view illustrating a portable image-forming device according to a embodiment of the present disclosure and FIG. 40 is a perspective view illustrating a state in which a display fixing part in the portable image-forming device according to the embodiment of the present disclosure is open with respect to a housing. FIG. 41 is a perspective view illustrating a state in which an instant film and a display device are not mounted in the portable image-forming device according to the embodiment of the present disclosure. FIG. 42 is a cross-sectional view of the portable image-forming device of FIG. 39 taken along the line G-G and FIG. 43 is a cross-sectional view of the portable image-forming device of FIG. 40 taken along the line H-H. FIG. 44 is a cross-sectional view of the portable image-forming device of FIG. 41 taken along the line I-I.

Referring to FIGS. 39 to 44, a portable image-forming device 200 according to a embodiment of the present disclosure may include a housing 210, an exposure member 220, a moving member 230, and a pressure member 240.

The housing 210 has approximately a rectangular shape to correspond to the screen 401 of the display device 400 like a smart phone and a floor surface 211 is provided with a film mounting groove 211a in which an instant film 290 may be mounted. Both inner side surfaces of the housing 210 are provided with a pair of guide grooves 213 along a length direction of the housing 210. An upper end portion of the housing 210 is provided with a support part 215 formed at a predetermined depth along a circumference of the housing 210 so that the housing 210 may accommodate a middle plate 250 to be described below. A depth from the upper end of the housing 210 to the support part 215 may be determined at a size corresponding to a thickness of the middle pate 250. The upper end portion of the housing 210 protruding from the support part 215 is removed from one end of the housing 210 in a length direction. A portion 216 from which a portion of the housing 210 is removed forms a gap through which a light blocking cover extension 294 of the instant film 290 fixed to the floor surface 211 of the housing 210 may be exposed to the outside of the housing 210.

The exposure member 220 is installed in the housing 210 to move along the instant film 290 mounted at the floor surface 211 of the housing 210. The exposure member 220 serves to form the image displayed on the screen 401 of the display device 400 on the instant film 290. That is, the exposure member 220 focuses the light from the screen 401 of the display device 400 on the instant film 290 to expose the instant film 290. The exposure member 220 includes a lens array 221 and a lens support part 223 supporting the lens array 221.

The lens array 221 forms the image displayed on the screen 401 of the display device 400 on the instant film 290. As the lens array 221, a lens forming an image by a difference in refractive index within a glass fiber may be used. The lens array having the structure has been used in a typical scanner. The lens array 221 may be formed at a length corresponding to a width of the screen 401 of the display device 400. An upper end portion of the lens array 221 is installed to be spaced apart from the screen 401 of the display device 400 by a predetermined distance and a lower end portion of the lens array 221 is installed to be spaced apart from the instant film 290 mounted on the floor surface 211 of the housing 210 by a predetermined distance. A distance between the upper end portion of the lens array 221 and the screen 401 of the display device 400 and a distance between the lower end portion of the lens array 221 and the instant film 290 may be equal to or different from each other depending on a specification of the lens array 221.

Figure 45:
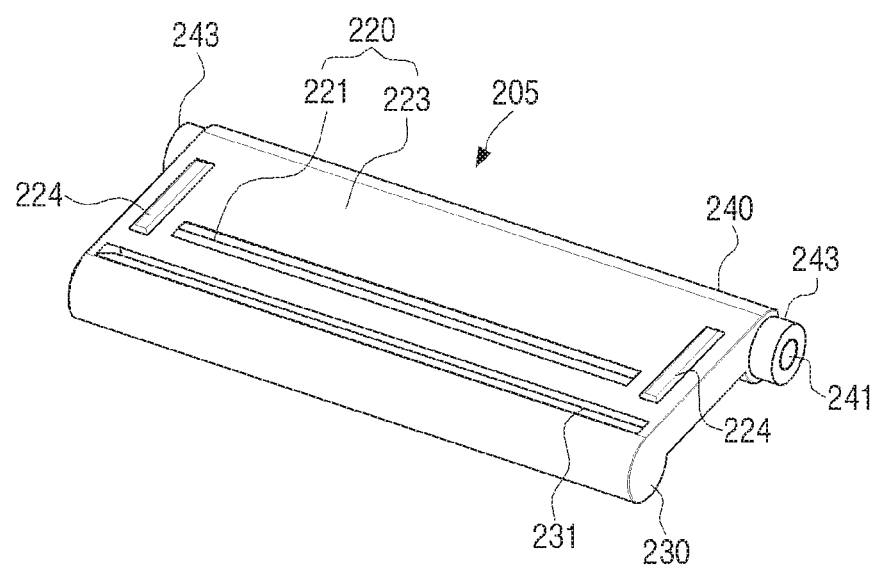
FIG. 45 is a perspective view illustrating an exposure member of the portable image-forming device of FIG. 41.

The lens support part 223 fixes the lens array 221 and may move the lens array 221 along a length direction of the housing 210. An upper surface of the lens support part 223 is provided with a friction protrusion 224 to minimize a friction with the middle plate 250 upon the movement. The friction protrusion 224 is formed to constantly maintain an interval between the lens support part 223 and the middle plate 250 while minimizing a contact area therebetween. Referring to FIGS. 41 and 45, according to the present embodiment, a pair of friction protrusions 224 is formed at both sides of the lens array 221 in parallel. Front and rear surfaces of the lens support part 223 are provided with a pressure member 240 and a moving member 230 in parallel. FIG. 45 is a perspective view illustrating an example of the exposure member 220 of the portable image-forming device 200 of FIG. 41. Referring to FIG. 45, the pressure member 240 and the moving member 230 may be formed with the exposure member 220 in one body.

The pressure member 240 has approximately a cylindrical shape and is coupled with the rear surface of the lens support part 221 of the exposure member 220 to be integrally formed with the exposure member 220. Further, the pressure member 240 protrudes from the lens support part 223. Both end portions of the pressure member 240 are provided with a pair of guide protrusions 241 and guide rings 243 are inserted into the pair of guide protrusions 241, respectively. Therefore, when the pressure member 240 is installed in the housing 210 to position the pair of guide protrusions 241 of the pressure member 240 in the pair of guide grooves 213 of the housing 210, the guide ring 243 is positioned between the guide protrusion 241 and the guide groove 213. The guide ring 243 serves to stably move the pressure member 240 without shaking when the pressure member 240 moves along the guide groove 213. According to the present embodiment, the pressure member 240 has a cylindrical shape, but the shape of the pressure member 240 is not limited thereto. As long as the pressure member 240 may press the upper surface of the instant film 290 to develop the exposed portion of the instant film 290 with the developer embedded in the instant film 290, the pressure member 240 may have any shape.

FIG. 45 describes the case in which the guide rings 243 are inserted into the guide protrusions 241 of both end portions of the pressure member 240 but is not necessarily limited thereto. As another example, the guide protrusions 241 of both ends of the pressure member 240 may be formed to be directly guided by the guide groove 213 of the housing 210, without the guide ring 243. When the exposure member 220 moves, the pressure member 240 presses the upper surface of the instant film 290 mounted on the floor surface 211 of the housing 210 to spread the developer embedded in the instant film 290 to the whole of the instant film 290, thereby developing the portion exposed by the lens array 221.

The moving member 230 is provided to move the exposure member 220 and the pressure member 240 with respect to the housing 210. That is, the moving member 230 is formed to allow a user to manually move the exposure member 220 and the pressure member 240. In the following description, integrally forming the exposure member 220, the pressure member 240, and the moving member 230 is called an exposure member assembly 205 (see FIG. 45), if necessary. Referring to FIG. 45, the moving member 230 has approximately a cylindrical shape and is integrally installed at an opposite side of the pressure member 240 based on the lens array 221, that is, the lens support part 223 on the front surface of the exposure member 220. The moving member 230 is formed to protrude approximately at the same height as the pressure member 240 at the lower surface of the lens support part 223. In detail, the moving member 230 may be formed to be lower than the pressure member 240 by a thickness of a light blocking cover 293 of the instant film 290.

Figure 47:
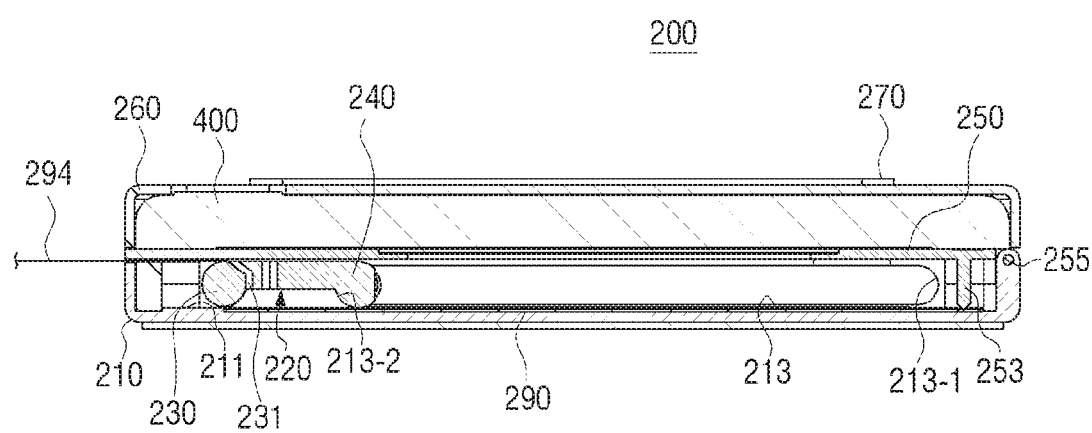
FIG. 47 is a cross-sectional view illustrating a state in which a print of a display device screen in the portable image-forming device is completed.

Further, an opening 231 having a length corresponding to a width of the instant film 290, in detail, a width of the light blocking cover extension 294 of the instant film 290 may be formed between the moving member 230 and the lens support part 223 of the exposure member 220. The width of the opening 231 is formed to be larger than the thickness of the light blocking cover extension 294 of the instant film 290. Therefore, the light blocking cover extension 294 of the instant film 290 mounted on the floor surface 211 of the housing 210 may pass through the opening 231 of the moving member 230, and therefore the front end portion of the light blocking cover extension 294 is inserted into the opening 231 of the moving member 230 and then may protrude outwardly through a gap 216 of the housing 210 as illustrated in FIGS. 42, 43, and 47.

According to the present embodiment illustrated in FIG. 45, both end portions of the pressure member 240 are provided with a pair of guide protrusions 241 and both ends of the moving member 230 are not provided with the pair of guide protrusions. However, according to another embodiment, although not illustrated, both ends of the moving member 230 may also be provided with the pair of guide protrusions identically with or similar to the guide protrusion 241 installed at both end portions of the pressure member 240.

The upper end portion of the housing 210 is fixed with the instant film 290 and may be provided with the middle plate 250 to constantly maintain the interval between the lens array 221 of the exposure member 220 and the screen 401 of the display device 400. As illustrated in FIGS. 40 and 41, the middle plate 250 may be rotatably provided rotate with respect to one end portion of the housing 210 by a hinge 255. The middle plate 250 is supported by the support part 215 that is provided at the upper end portion of the housing 210. Therefore, the thickness of the middle plate 250 is formed at a size corresponding to the depth of the support part 215 of the housing 210. In detail, the middle plate 250 may be formed to have a thickness equal to or larger than the depth of the support part 215 of the housing 210.

Further, a center of the middle plate 250 is provided with an input window 251 through which the light from the screen 401 of the display device 400 passes. The input window 251 may be provided with transparent glass 251a. As another example, the input window 251 may be maintained in an empty state, without being provided with the transparent glass 251a. The size of the input window 251 may be appropriately formed depending on the size of the screen 401 of the display device 400 and the size of the instant film 290. Referring to FIG. 41, one end portion of the middle plate 250, that is, a portion adjacent to the hinge 255 is provided with a fixed protrusion 253 for fixing the instant film 290 to the housing 210. Therefore, as illustrated in FIG. 42, in the state in which the housing 210 is covered with the middle plate 250, the fixed protrusion 253 presses the instant film 290 to the floor surface 211 of the housing 210 to fix the instant film 290.

To print the image displayed on the display device 400, there is a need to fix the display device 400 to the housing 210. To fix the display device 400 to the housing 210, the display fixing part 260 may be provided at the upper side of the middle plate 250 on the housing 210. Referring to FIGS. 39 to 41, according to the embodiment of the present disclosure, the display fixing part 260 fixing the display device 400 is formed at a shape and a size corresponding to the housing 210. In detail, the display fixing part 260 has a rectangular container shape corresponding to the housing 210 and the display device 400 may be inserted into the inside of the display fixing part 260. The display fixing part 260 may be rotatably coupled to the housing 210. According to the present embodiment, as illustrated in FIG. 39, the display fixing part 260 is a flexible plate 270 and coupled with the housing 210. Therefore, as illustrated in FIG. 40, the display fixing part 260 may be open to the housing 210.

According to the present embodiment, the rectangular display fixing part 260 corresponding to the housing 210 and having the display device 400 inserted thereinto is provided to fix the display device 400, but a method for fixing a display device 400 to a housing 210 is not limited thereto. Although not illustrated, a separate fixture or a user's hand may fix the display device 400 to the upper portion of the housing 210, that is, the upper surface of the middle plate 250.

Figure 46:
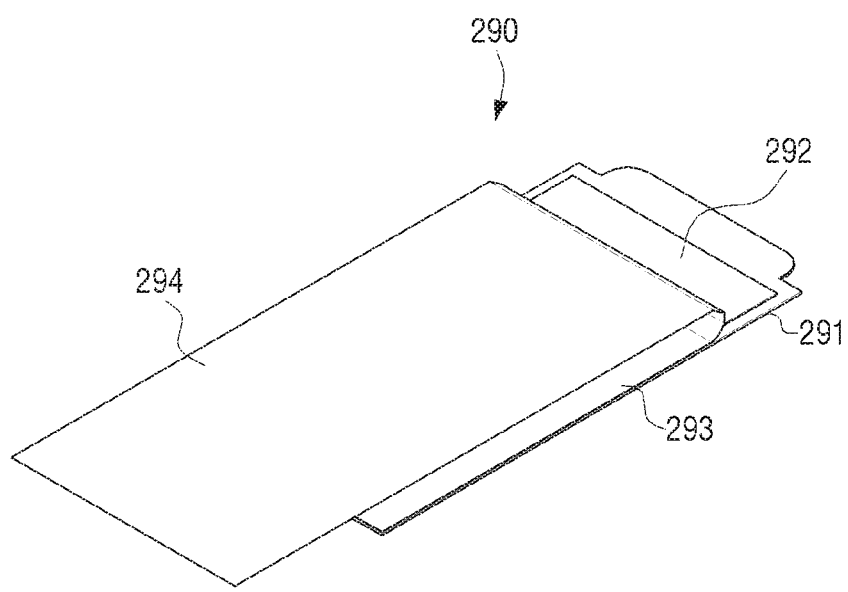
FIG. 46 is a perspective view illustrating an example of an instant film used in the portable image-forming device according to the embodiment of the present disclosure.

FIG. 46 is a perspective view illustrating the instant film 290 used in the portable image-forming device 200 according to the embodiment of the present disclosure. FIG. 46 illustrates the case in which a potion of the light blocking cover 293 is taken off and thus a portion of the instant film member 292 is exposed.

The instant film 290 is configured to include a protective plate 291, the instant film member 292, the light blocking cover 293, and the light blocking cover extension 294. The protective plate 291 is disposed on the floor surface 211 of the housing 210 and has a shape corresponding to the film mounting groove 211a disposed on the floor surface 211 of the housing 210. The instant film member 292 is exposed by the lens array 221 of the exposure member 220 and is a portion developed by a developer and is provided on an upper surface of the protective plate 291. The developer may be received in the portion of the exposed instant film member 292 in FIG. 46. The light blocking cover 293 blocks the instant film member 292 from being exposed to the light from the outside and may be disposed on the protective plate 291 to cover the instant film member 292. The light blocking cover extension 294 extends from one end portion of the light blocking cover 293.

The light blocking cover extension 294 serves as a handle moving the moving member 230 and therefore has a length longer than that of the protective plate 291. Therefore, if the light blocking cover extension 294 passes through the opening 231 of the moving member 230 and then the instant film 290 is mounted in the film mounting groove 211a of the housing 210, the front end portion of the light blocking cover extension 294 protrudes to the outside through the gap 216 of the housing 210. If a user pulls the front end portion of the light blocking cover extension 294 exposed to the outside of the housing 210, the moving member 230 moves by the light blocking cover extension 294, and at the same time the light blocking cover 293 is separated from the protective plate 291 to allow the instant film member 292 to be exposed. If the user continuously pulls the light blocking cover extension 294, the portion of the light blocking cover 293 separated from the protective plate 291 moves the moving member 230 while moving toward the gap 216 of the housing 210 through the opening 231 of the moving member 230. If the moving member 230 moves by the light blocking cover extension 294 and the light blocking cover 293, the exposure member 220 and the pressure member 240 integrally formed with the moving member 230 also move to expose and develop the exposed instant film member 292.

Hereinafter, a method for printing an image displayed on the screen 401 of the display device 400 using the portable image-forming device 200 according to the embodiment of the present disclosure having the foregoing structure will be described.

First, a user mounts the instant film 290 in the housing 210. In detail, the user rotates the display fixing part 260 with respect to the housing 210 to open the upper end portion of the housing 210 and then rotates the middle plate 250 to allow the exposure member assembly 205 to be exposed as illustrated in FIG. 41.

In this state, the user mounts the instant film 290 in the film fixing groove 211a of the floor surface 211 of the housing 210 and inserts the front end portion of the light blocking cover extension 294 of the instant film 290 into the exposure member assembly 205, in detail, the opening 231 of the moving member 230. If the light blocking cover extension 294 of the instant film 290 completely exits through the opening 231 of the exposure member assembly 205, the front end portion of the light blocking cover extension 294 is exposed to the outside of the housing 210. Next, if the middle plate 250 is positioned at the support part 215 of the housing 210 while covering the middle plate 250, as illustrated in FIGS. 40 and 43, the front end portion of the light blocking cover extension 294 is exposed to the outside of the housing 210 and the middle plate 250.

Next, the user operates the display device 400 to display the image to be printed on the screen 401.

Next, as illustrated in FIG. 40, the screen 401 of the display device 400 is mounted in the display fixing part 260 to be upward and the display fixing part 260 covers the upper end portion of the housing 210. Then, the portable image-forming device 200 according to the embodiment of the present disclosure is in the state as illustrated in FIGS. 39 and 47. In this state, the screen 401 of the display device 400 on which the image is displayed faces the input window 251 of the middle plate 250.

In this state, the user holds the housing 210 and the display fixing part 260 with one hand and pulls the front end portion of the light blocking cover extension 294 exposed to the outside of the housing 210 in a D1 direction of FIG. 42 with the other hand.

Then, the exposure member assembly 205 moves in the arrow D1 direction like the light blocking cover extension 294 along the pair of guide grooves 213 of the housing 210 by the pulling force of the user and the light blocking cover 293 is separated from the protective plate 291 to start to expose the instant film member 292 positioned below the light blocking cover 293.

If the user continuously pulls the light blocking cover extension 294, the exposure member assembly 205 exposes the instant film member 292 to the light from the screen 401 of the display device 400 through the lens array 221 of the exposure member assembly 205 while moving. If the exposure member assembly 205 moves in the arrow D1 direction, the pressure member 240 provided at the rear portion of the lens array 221 presses the developer provided in the instant film 290 to allow the developer to develop the exposed portion of the instant film member 292.

If the guide protrusion 241 of the exposure member assembly 205 is positioned at an end portion 213-2 of the guide groove 213 of the housing 210, even when the user pulls the light blocking cover extension 294, the exposure member assembly 205 no longer moves. Further, if the exposure member assembly 205 is positioned at a tip 213-2 of the guide groove 213 of the housing 210, the light blocking cover 293 is completely taken off, and as a result the instant film member 292 is completely exposed and the image displayed on the screen 401 of the display device 400 is completely exposed to the instant film member 292 to be in a developed state.

In this state, if the user opens the display fixing part 260 and the middle plate 250, the instant film 290 mounted on the floor surface 211 of the housing 210 may be separated. Therefore, the user may obtain the printed output of the image displayed on the screen 401 of the display device 400.

Figure 48:
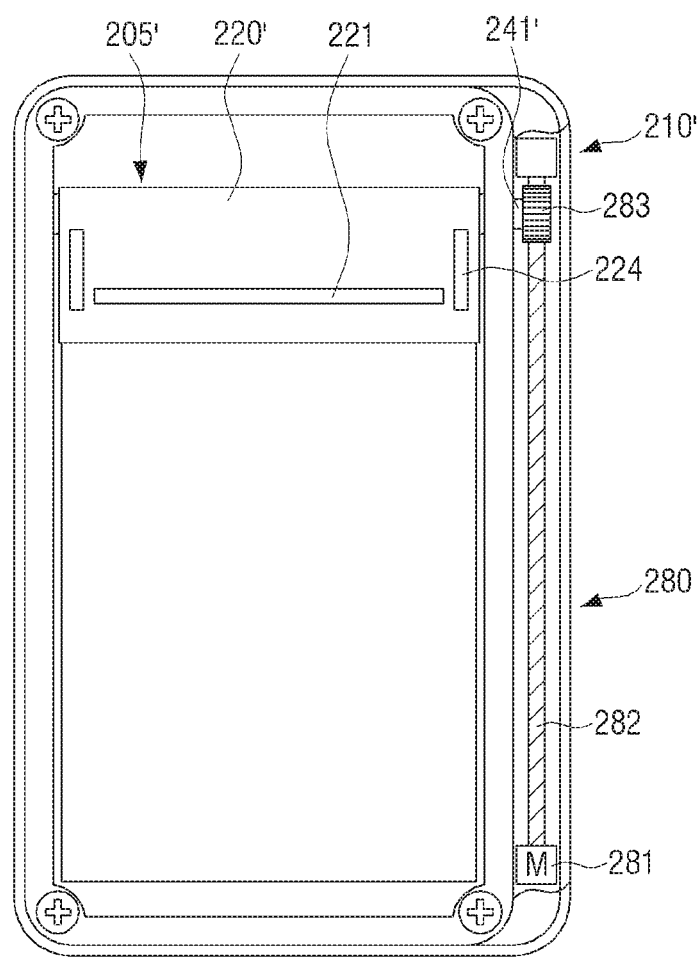
FIG. 48 is a partial plan view illustrating a modified example of the portable image-forming device according to the embodiment of the present disclosure.

As described above, the case in which the user moves the exposure member assembly in which the exposure member, the pressure member, and the moving member are formed in one body has been described. However, a method for moving an exposure member assembly is not limited to the manual operation. If necessary, the exposure member assembly may be configured to automatically move by using a motor. An example of a structure of automatically moving the exposure member assembly is illustrated in FIG. 48. FIG. 48 is a plan view illustrating only the housing of the portable image-forming device of FIG. 41. Therefore, similar to FIG. 41, a housing 210' illustrated in FIG. 48 may be coupled with the middle plate 250 and the display fixing part 260.

Referring to FIG. 48, one side of the housing 210' is provided with a driver 280 for driving an exposure member assembly 205'. The driver 280 includes a pinion 283, a screw 282, and a motor 281. The pinion 283 is fixed to a guide protrusion 241' of one end portion of the exposure member assembly 205'. The screw 282 is rotatably installed in parallel with the housing 210' and is installed to be engaged with the pinion 283. The motor 281 is coupled with one end portion of the screw 282 and rotates the screw 282. Therefore, if the motor 281 is operated, the screw 282 rotates and the pinion 283 moves along the housing 210' by the rotation of the screw 282. Therefore, the exposure member assembly 205' in which the pinion 283 is installed moves along the housing 210'. According to the present embodiment, the driver may be configured to move the exposure member assembly 205' using the pinion 283 and the screw 282 or various mechanisms that may change a rotational motion of the motor into a straight motion such as a ball screw.

Hereinafter, a portable image-forming device according to a embodiment of the present disclosure will be described with reference to FIGS. 49 to 57.

Figure 49:
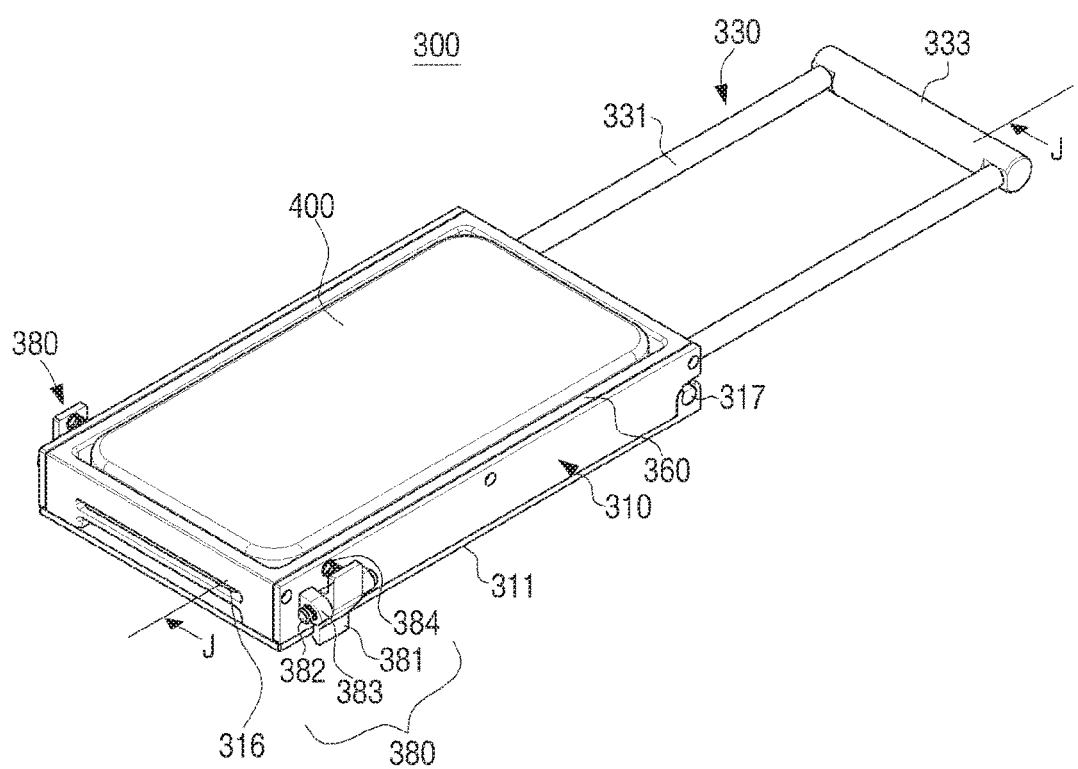
FIG. 49 is a perspective view illustrating a portable image-forming device according to an embodiment of the present disclosure.
Figure 50:
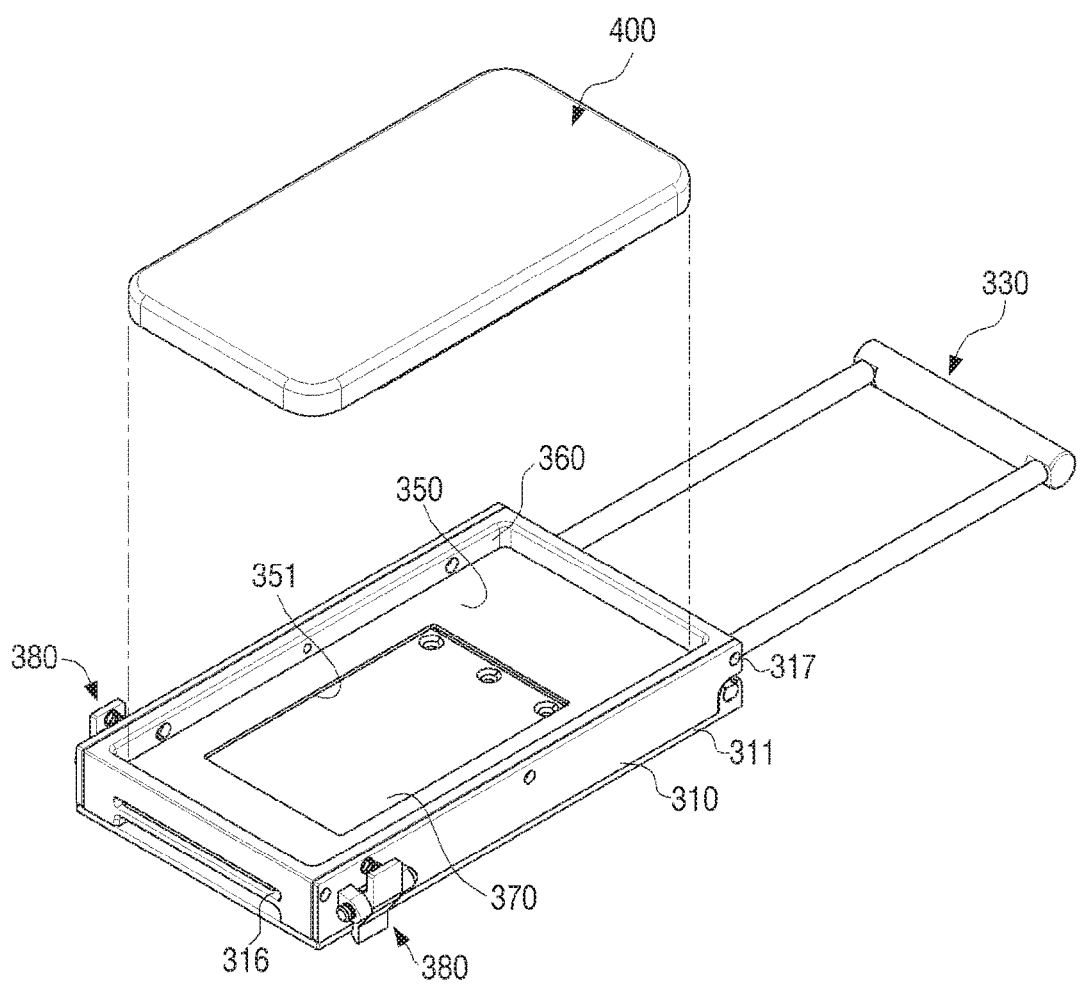
FIG. 50 is a perspective view illustrating a state in which the display device is separated from the portable image-forming device of FIG. 49.
Figure 51:
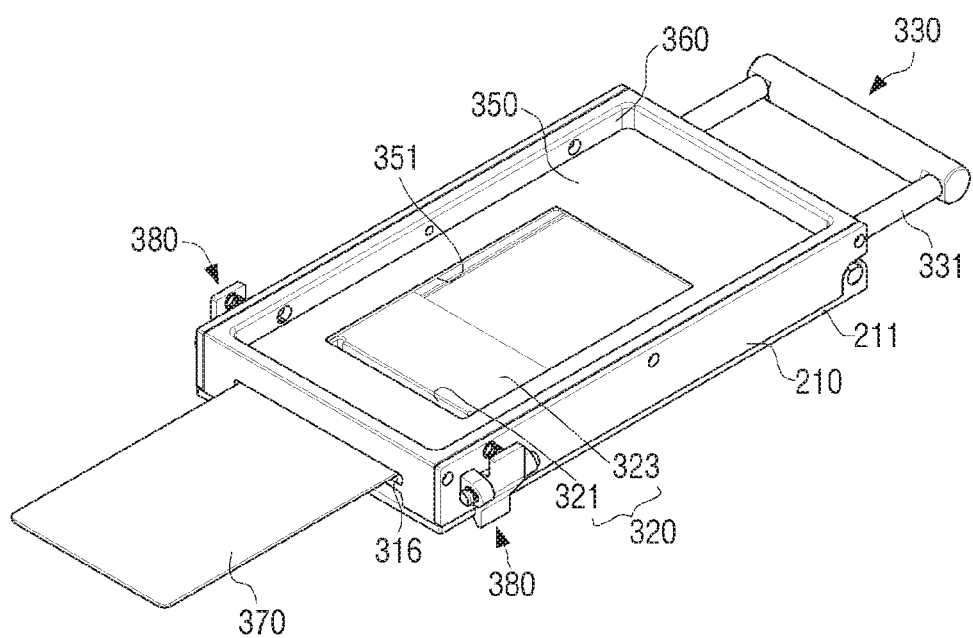
FIG. 51 is a perspective view illustrating a state in which a handle in the portable image-forming device of FIG. 49 is pushed maximally.
Figure 52:
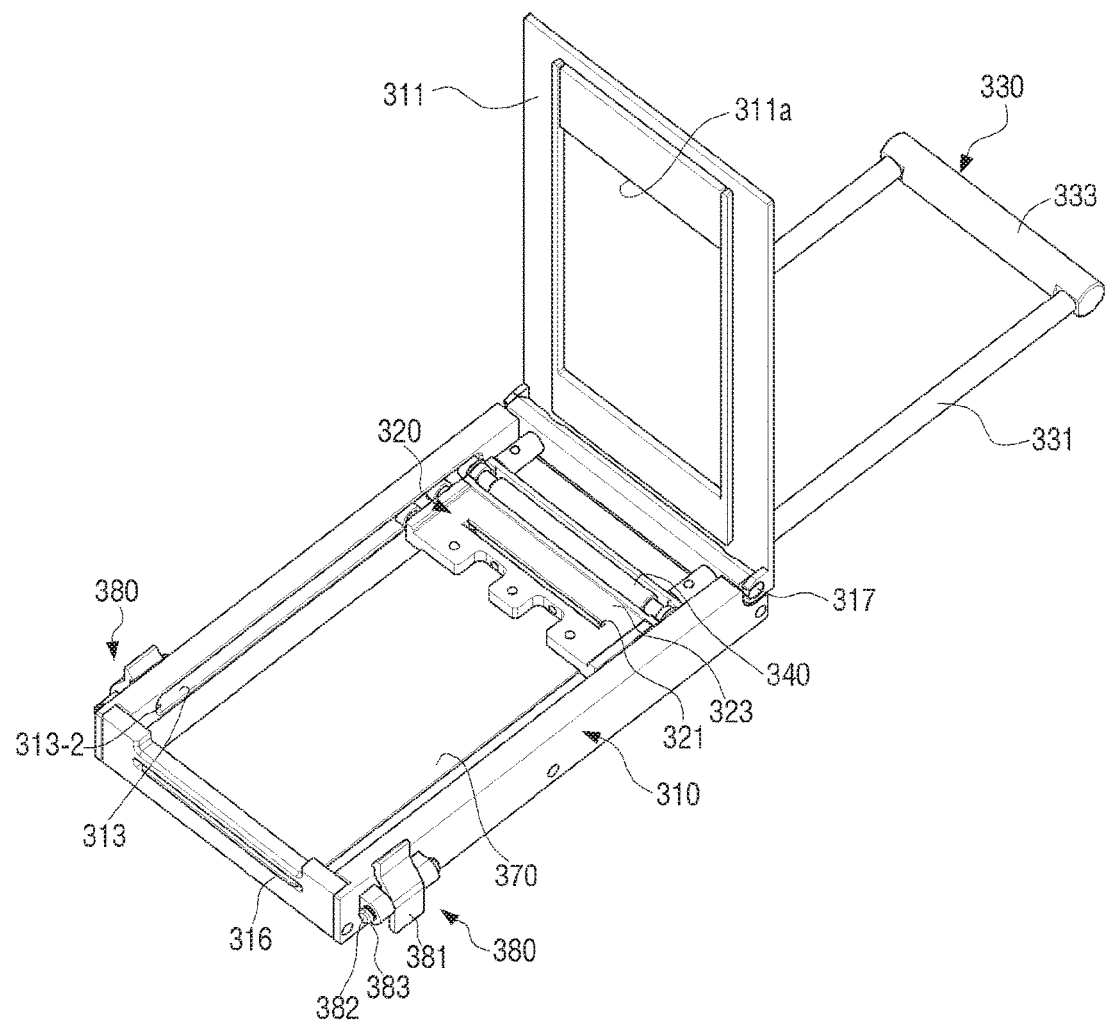
FIG. 52 is a perspective view illustrating a state in which a floor plate of a housing in the portable image-forming device according to the embodiment of the present disclosure is open.
Figure 53:
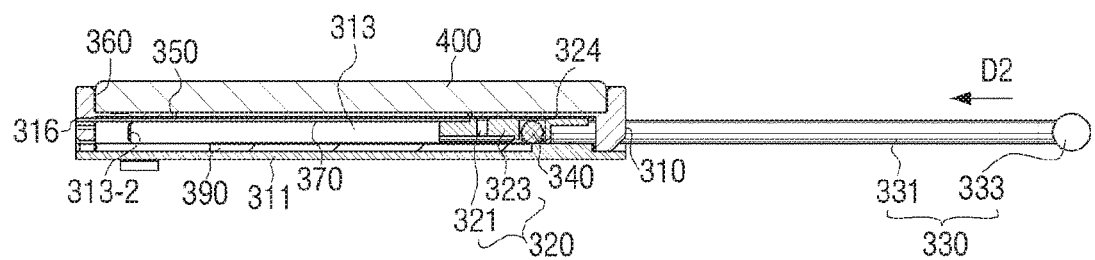
FIG. 53 is a cross-sectional view of the portable image-forming device of FIG. 49 taken along the line J-J.
Figure 54:
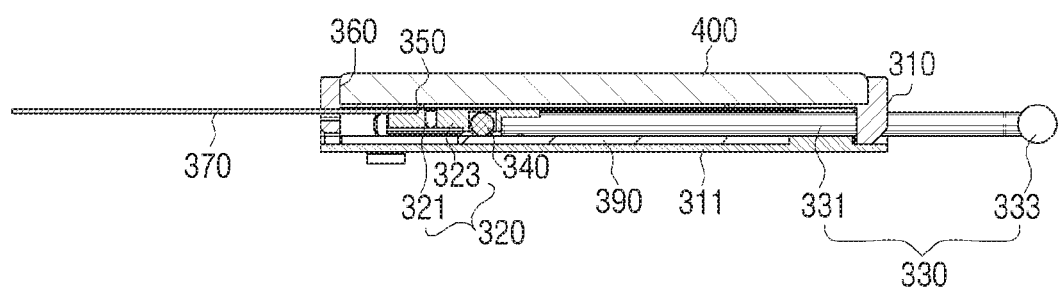
FIG. 54 is a cross-sectional view illustrating a state in which the handle of the portable image-forming device of FIG. 53 is pushed to the end.
Figure 55:
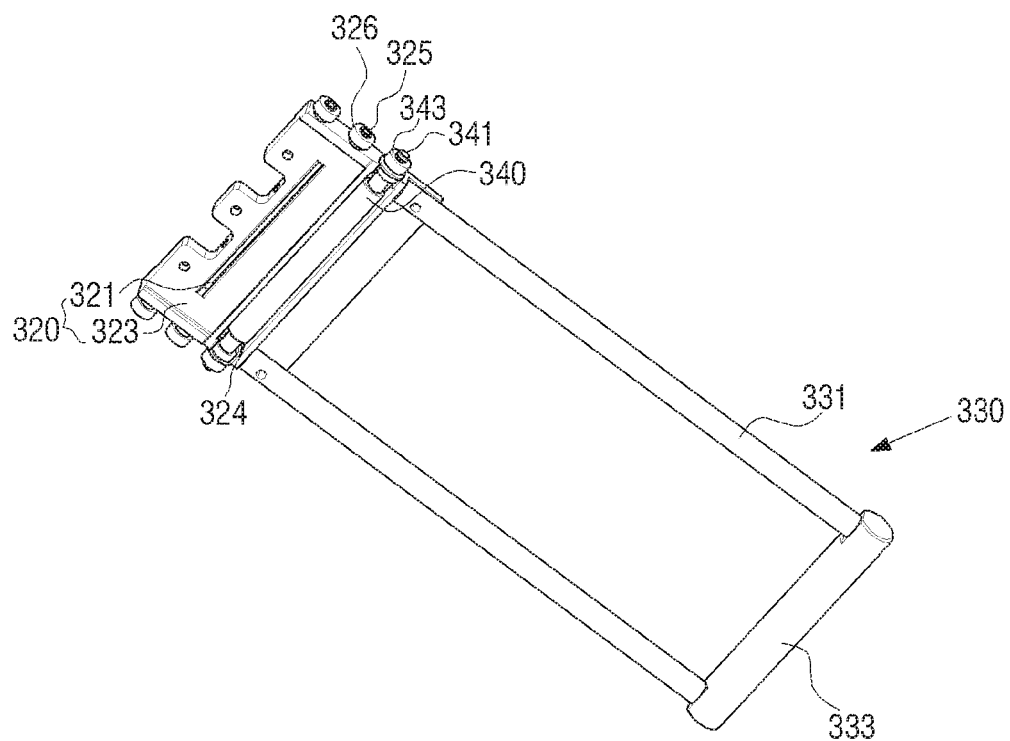
FIG. 55 is a perspective view illustrating an assembly of an exposure member and a moving member of the portable image-forming device of FIG. 49.

FIG. 49 is a perspective view illustrating a portable image-forming device according to a embodiment of the present disclosure and FIG. 50 is a perspective view illustrating a state in which the display device is separated from the portable image-forming device of FIG. 49. FIG. 51 is a perspective view illustrating a state in which a handle in the portable image-forming device of FIG. 50 is pushed maximally. FIG. 52 is a perspective view illustrating a state in which a floor surface of a housing in the portable image-forming device according to the embodiment of the present disclosure is open. FIG. 53 is a cross-sectional view of the portable image-forming device of FIG. 49 taken along the line J-J and FIG. 54 is a cross-sectional view illustrating a state in which the handle of the portable image-forming device of FIG. 53 is pushed into the housing. FIG. 55 is a perspective view illustrating an assembly of an exposure member and a moving member of the portable image-forming device of FIG. 49.

Referring to FIGS. 49 to 55, a portable image-forming device 300 according to a embodiment of the present disclosure may include a housing 310, an exposure member 320, a moving member 330, and a pressure member 340.

The housing 310 has approximately a rectangular shape to correspond to the screen 401 of the display device 400 like a smart phone. The whole circumference of an upper end portion of the housing 310 extends up to form a display fixing part 360 having a predetermined depth. That is, according to the present embodiment, the portable image-forming device 200 according to the embodiment, the display fixing part 360 and the housing 310 are formed in one body. A fixed plate 350 supporting the display device 400 is provided between the display fixing part 360 and the housing 310. Therefore, the display device 400 is accommodated on the fixed plate 350 and the exposure member 320 and the instant film 390 are accommodated under the fixed plate 350. The fixed plate 350 is provided with an input window 351 corresponding to the screen of the display device 400. Both inner side surfaces of the housing 310 under the fixed plate 350 are provided with a pair of guide grooves 313 along a length direction of the housing 310. FIG. 52 illustrates only one guide groove 313, but an inner side surface of the other housing (not illustrated) is provided with the same guide groove.

According to the present embodiment, unlike the portable image-forming device 200 according to the embodiment as described above, the floor surface of the housing 310 is formed to be closed or opened with respect to the housing 310. Referring to FIG. 52, a floor plate 311 configuring the floor surface of the housing 310 is rotatably coupled with a rear surface of the housing 310 by a hinge 317. The front surface of the housing 310 is provided with a slit 316 through which a light blocking plate 370 to be described below passes. The floor plate 311 is provided with a film mounting groove 311a in which the instant film 390 is mounted.

Both side surfaces of the housing 310 are provided with a pair of fixed parts 380 fixing the floor plate 311. The fixed part 380 includes a clamp 381, a rotating shaft 382 protruding from both end portions of the clamp 381, a pair of support protrusions 383 rotatably supporting the rotating shaft 382, and an elastic member 384 elastically supporting one end portion of the clamp 381. The support protrusion 383 is provided with a rotating hole into which the rotating shaft 382 is inserted. The elastic member 384 is installed between a side surface of the housing 310 and one end portion of the clamp 381 to press the other end portion of the clamp 381 to the side surface of the floor plate 311 all the time. Therefore, if the user presses one end portion of the clamp 381 of the pair of fixed parts 380, the elastic member 384 is compressed and thus the other end portion of the clamp 381 is spaced apart from the side surface of the floor plate 311, such that the floor plate 311 may be open at the lower end portion of the housing 310. As the elastic member 384, a compression coil spring may be used.

The exposure member 320 is installed in the housing 310 to move along a length direction of the housing 310, that is, a pair of guide grooves 313. That is, the exposure member 320 is installed to move along the upper surface of the instant film 390 mounted on the floor plate 311 of the housing 310. The exposure member 320 serves to form the image displayed on the screen 401 of the display device 400 on the instant film 390. That is, the exposure member 320 focuses the light from the screen 401 of the display device 400 on the instant film 390 to expose the instant film 390. The exposure member 320 includes a lens array 321, a lens support part 323, and a light blocking plate 370.

The lens array 321 forms the image displayed on the screen of the display device 400 on the instant film 390 and the same one as the lens array 221 of the portable image-forming device according to the embodiment as described above may be used. That is, as the lens array 331, the lens for forming an image due to the difference in refractive index in the glass fiber may be used. The lens array 321 may be formed at a length corresponding to the width of the screen 401 of the display device 400. An upper end portion of the lens array 321 is installed to be spaced apart from the screen 401 of the display device 400 by a predetermined distance and a lower end portion of the lens array 321 is installed to be spaced apart from the instant film 390 mounted on the floor plate 311 of the housing 310 by a predetermined distance. A distance between the upper end portion of the lens array 321 and the screen 401 of the display device 400 and a distance between the lower end portion of the lens array 321 and the instant film 390 may be equal to or different from each other depending on a specification of the lens array 321.

The lens support part 323 fixes the lens array 321 and may move the lens array 321 along a length direction of the housing 310. Referring to FIG. 55, both side surfaces of the lens support part 323 are provided with at least a pair of guide protrusions 325. According to the present embodiment, both side surfaces of the lens support part 323 are provided with two pairs of guide protrusions 325 and each of the guide protrusions 325 is inserted with guide rings 326. Therefore, when the exposure member 320 is installed in the housing 310 to position at least a pair of guide protrusions 325 of the exposure member 320 in the pair of guide grooves 313 of the housing 310, the guide ring 326 is positioned between the guide protrusion 325 and the guide groove 313. The guide ring 326 serves to stably move the exposure member 320 without shaking when the exposure member 320 moves along the guide groove 313.

FIG. 55 describes the case in which the guide rings 326 are inserted into the guide protrusions 325 of both end portions of the exposure member 320 but the present embodiment is not necessarily limited thereto. As another example, although not illustrated, the guide protrusions 325 of both side surfaces of the exposure member 320 may be formed to be directly guided by the guide groove 313 of the housing 310, without the guide ring 326. Further, the number of guide protrusions 325 provided at both side surfaces of the lens support part 323 illustrated in FIG. 55 is only an example, and one or at least three guide protrusions 325 may be installed on one side surface of the lens support part 323.

The lens support part 323 may be provided with a pressure member 340 pressing the instant film 390 mounted on the floor plate 311 while moving when the exposure member 320 moves. The pressure member 340 may be formed as a cylindrical pressure roller. A lower surface of the lens support part 323 is provided with a roller groove 324 in which the pressure roller 340 is rotatably installed. Both ends of the pressure roller 340 is provided with a pair of guide protrusions 341 which are inserted into the pair of guide grooves 313 of the housing 310. The pair of guide protrusions 341 may each be inserted with the guide rings 343. If the lens support part 323 at which the pressure roller 340 is installed is installed between the pair of guide grooves 313 in the housing 310, the pressure roller 340 protrudes from the lower surface of the lens support part 323. Therefore, when the exposure member 320 moves, the pressure roller 340 installed at the lens support part 323 of the exposure member 320 presses the upper surface of the instant film 390 mounted on the floor plate 311 of the housing 310 to spread the developer embedded in the instant film 390 to the whole of the instant film 390, thereby developing the portion exposed by the lens array 321.

The front and rear surfaces of the lens support part 323 are provided with the light blocking plate 370 and the moving member 330. The light blocking plate 370 is installed on the front surface of the lens support part 323 adjacent to the lens array 321 and the moving member 330 is installed on the other side of the light blocking plate 370, that is, the rear surface of the lens support part 323 adjacent to the roller groove 324.

The light blocking plate 370 covers the instant film 390 mounted on the floor plate 311 of the housing 310 to block the light from the screen of the display device 400 from exposing the instant film 390. Therefore, the light blocking plate 390 is made of a material blocking light and may be formed in black color absorbing light.

Figure 56:
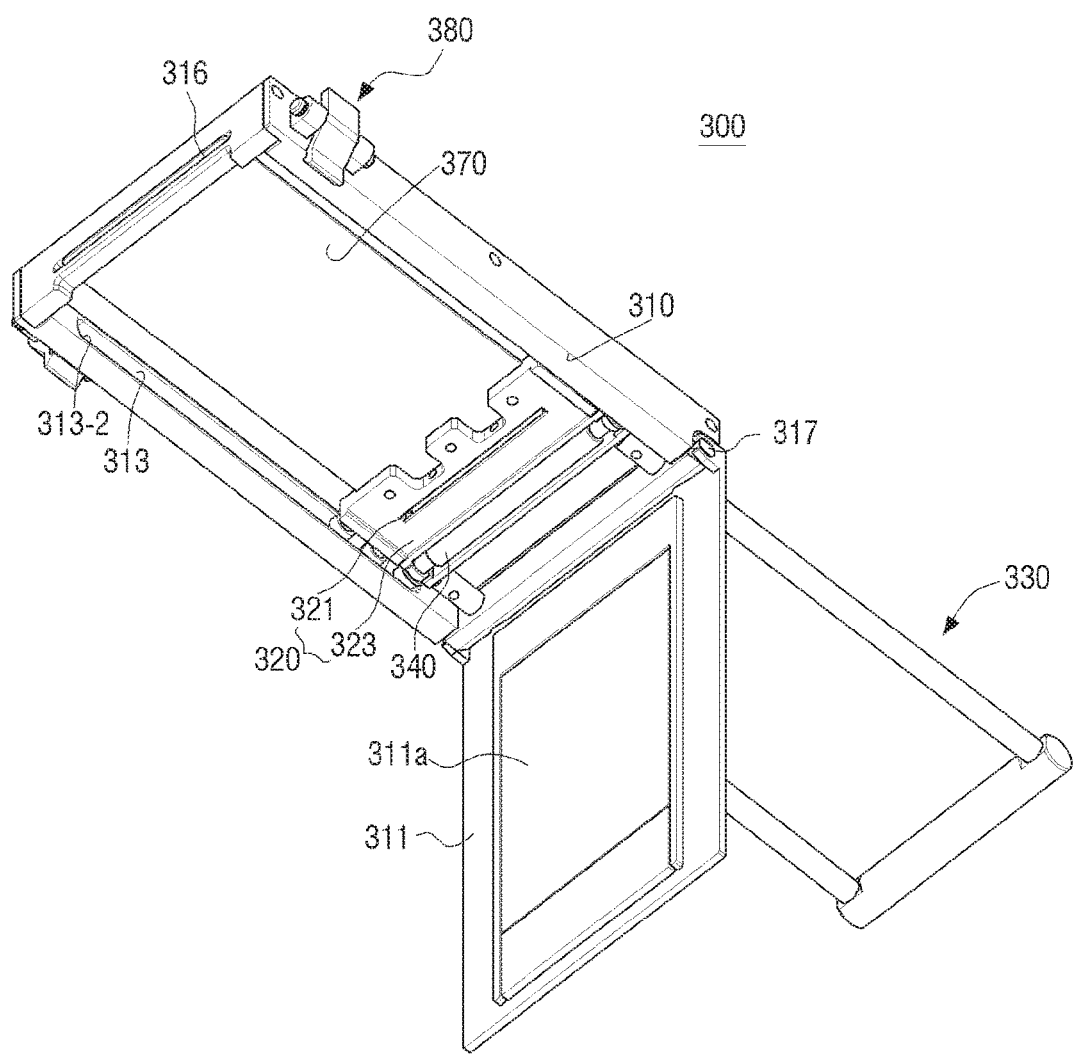
FIG. 56 is a perspective view illustrating a state in which a floor plate is open to install an instant film in the portable image-forming device of FIG. 49.

The moving member 330 is to allow the user to manually move the exposure member 320 and may be formed as a handle. Referring to FIGS. 55 and 56, the handle 330 is configured of a pair of arms 331 and a horizontal bar 333 connecting between both ends of the pair of arms 331. The pair of arms 331 are installed in parallel to penetrate through the rear surface of the housing 310 and one end portion of the pair of arms 331, respectively, are fixed to the rear surface adjacent to the roller groove 324 by the lens support part 323 of the exposure member 320 while being spaced apart from each other. An interval between the pair of arms 331 is formed to be larger than the width of the instant film 390 mounted on the floor plate 311 of the housing 310. Therefore, when the exposure member 320 moves by the handle 330, the instant film 390 does not interfere with the handle 330. Further, the handle 330, in detail, the pair of arms 331 are formed to have a length corresponding to the length of the light blocking plate 370. For example, the length of the pair of arms 331 may be longer than that of the light blocking plate 370.

Hereinafter, a method for printing an image displayed on the screen 401 of the display device 400 using the portable image-forming device 300 according to the embodiment of the present disclosure having the foregoing structure will be described.

First, a user mounts the instant film 390 in the housing 310. In detail, the user opens the floor plate 311 of the housing 310 as illustrated in FIG. 56 and mounts the instant film 390 in the film mounting groove 311a of the floor plate 311. In this case, to open the floor plate 311, the user presses the clamp 381 of the pair of fixed parts 380 to space one end portion of the clamp 381 apart from the side surface of the floor plate 311. As the instant film 390, the same one as the instant film 390 used in the embodiment as described above may be used.

Figure 58:
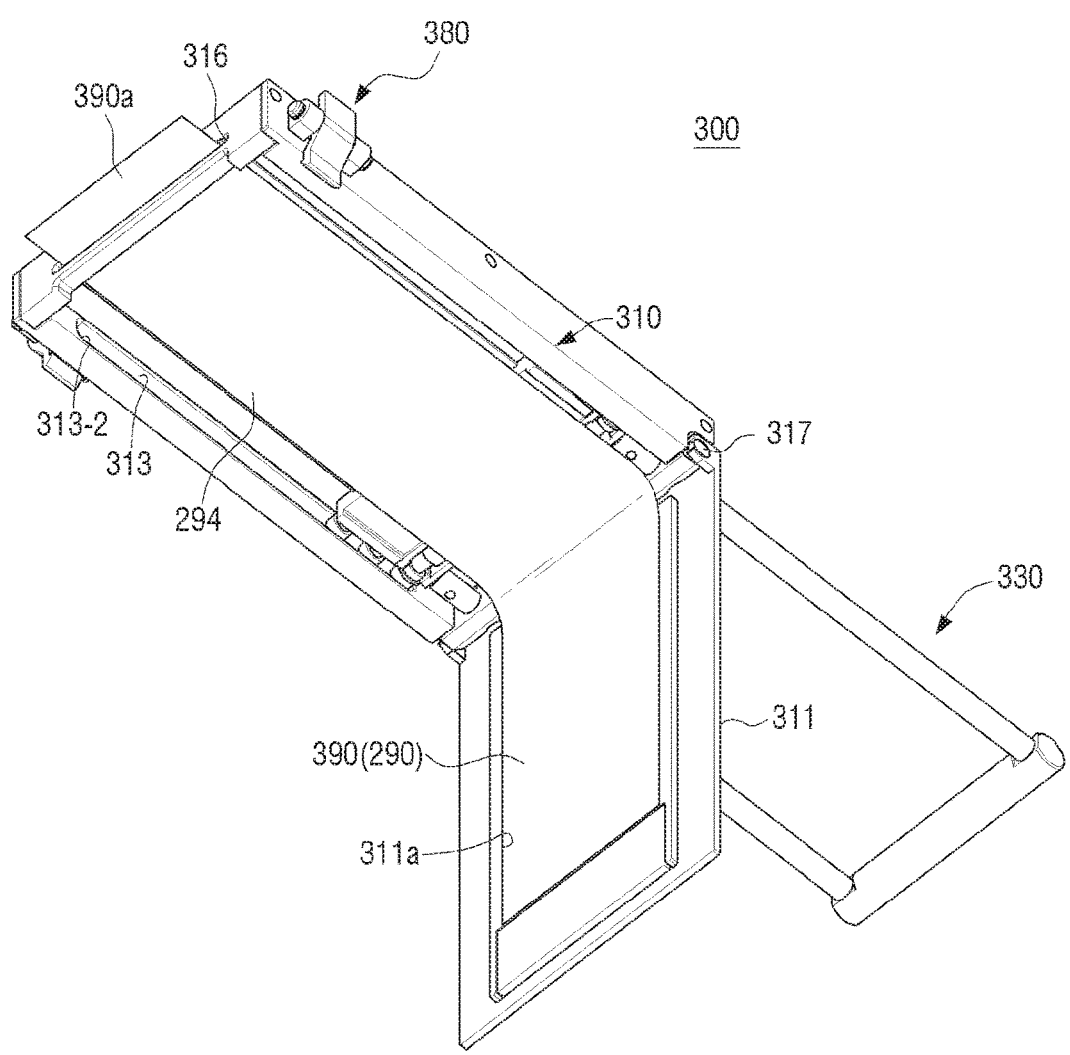
FIG. 58 is a perspective view illustrating a state in which the instant film is mounted in the portable image-forming device of FIG. 56.

Next, as illustrated in FIG. 58, the user mounts the instant film 390 in the film mounting groove 311a and inserts the front end portion 390a of the light blocking cover extension 294 into the slit 316 of the housing 310 to make the front end portion 390a of the light blocking cover extension 294 protrude to the outside of the housing.

Figure 59:
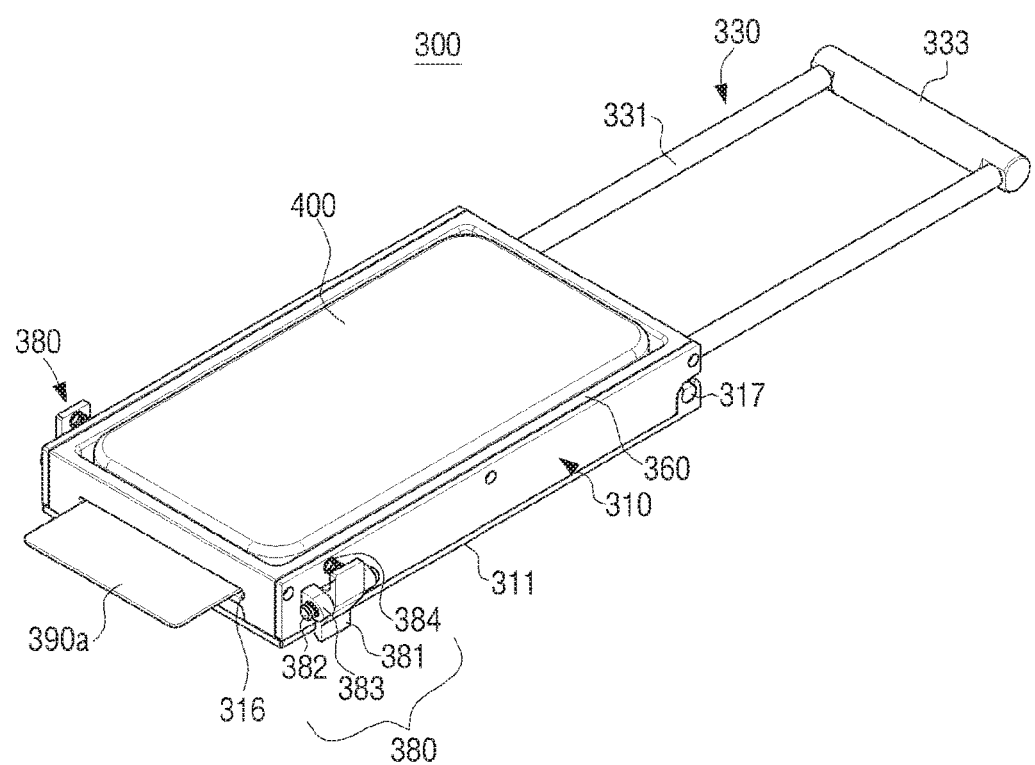
FIG. 59 is a perspective view illustrating a state in which a floor plate of the portable image-forming device of FIG. 58 is closed.

Next, the user rotates the floor plate 311 to cover the lower end portion of the housing 310. Then, the floor plate 311 is fixed between the pair of clamps 381 by the elastic force of the pair of fixed parts 380 installed at both side surfaces of the housing 310 and thus becomes in the state as illustrated in FIG. 59. In this case, the front end portion 390a of the light blocking cover extension 294 of the instant film 390 becomes in a state in which it protrudes to the outside of the housing 310. Therefore, if the user pulls the front end portion 390a of the light blocking cover extension 294 of the instant film 390 protruding to the outside in this state, the light blocking cover 293 (see FIG. 46) is separated from the protective plate 291 (see FIG. 46) and thus the instant film member 292 (see FIG. 46) is exposed to be in the exposable state. However, in this state, the light blocking plate 370 at the upper side of the instant film 390 blocks external light and therefore the instant film member 292 is not exposed.

Next, the user operates the display device 400 to display the image to be printed on the screen 401.

Next, the screen of the display device 400 is mounted at the display fixing part 360 to be toward the input window 351 of the fixed plate 350. Then, the portable image-forming device 300 according to the embodiment of the present disclosure is in the state illustrated in FIGS. 49 and 53. In this state, the screen of the display device 400 on which the image is displayed faces the input window 351 of the fixed plate 350 and the input window 351 is blocked by the light blocking plate 370 installed under the fixed plate 350. Therefore, the image displayed on the screen 401 of the display device 400 does not expose the instant film 390 mounted on the floor plate 311.

In this state, the user grips the housing 310 and the display fixing part 360 with one hand and grips the horizontal bar 333 of the handle 330 protruding to the outside of the housing 310 with the other hand to push the handle 330 toward the housing 310.

Then, the exposure member 320 moves in an arrow D2 direction of FIG. 53 along the guide groove 313 of the housing 310 by the user force pushing the handle 330 to position the lens array 321 of the exposure member 320 under the screen of the display device 400. Then, the instant film 390 mounted on the floor plate 311 starts to be exposed by the light from the screen of the display device 400.

If the user continuously pushes the handle 330, the instant film 390 is continuously exposed to the light from the screen of the display device 400 through the lens array 321 of the exposure member 320 while the exposure member 320 moves. Further, if the exposure member 320 moves in the arrow D2 direction, the pressure roller 340 provided at the rear portion of the lens array 321 presses the developer provided in the instant film 390 to allow the developer to develop the exposed portion of the instant film 390.

Figure 57:
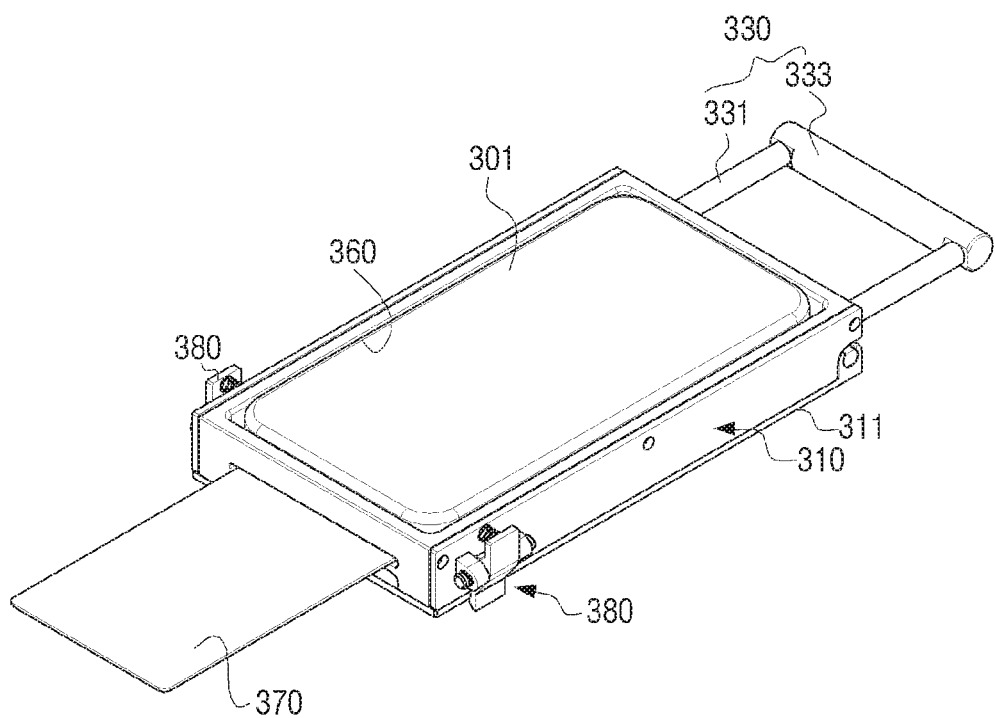
FIG. 57 is a perspective view illustrating a state in which a print of a display device screen in the portable image-forming device is completed.

If the exposure member 320 is positioned at the tip 313-2 of the guide groove 313 of the housing 321, the exposure member 320 no longer moves even when the user pushes the handle 330. FIGS. 54 and 57 are diagrams illustrating the state in which the exposure member 320 is positioned at the tip 313-2 of the guide groove 313 of the housing 310. As illustrated in FIGS. 54 and 57, if the exposure member 320 is positioned at the tip 313-2 of the guide groove 313 of the housing 310, the light blocking plate 370 is completely exposed to the outside of the housing 310 and the image displayed on the screen of the display device 400 is completely exposed to the instant film 390 to be in a developed state.

If the user presses the pair of fixed parts 380 to open the floor plate 311 of the housing 310 in this state, the instant film 390 mounted on the floor plate 311 of the housing 310 may be separated. Therefore, the user may obtain the printed output of the image displayed on the screen of the display device 400.

As described above, the portable image-forming device according to the embodiment of the present disclosure allows the user to manually move the exposure member without the separate driving source to print an image displayed on a liquid crystal screen of a display device on the instant film.

Therefore, the portable image-forming device according to the embodiment of the present disclosure does not use the driving source like the motor and the power transfer apparatus and therefore may be simple in the structure, inexpensive, and easily miniaturized.

Further, the portable image-forming device according to the embodiment of the present disclosure may perform manual printing and therefore does not require the power source unlike other portable image-forming devices using the driving source. Therefore, the portable image-forming device according to the embodiment of the present disclosure may have more enhanced portability than other portable image-forming devices using the driving source.

Figure 60:
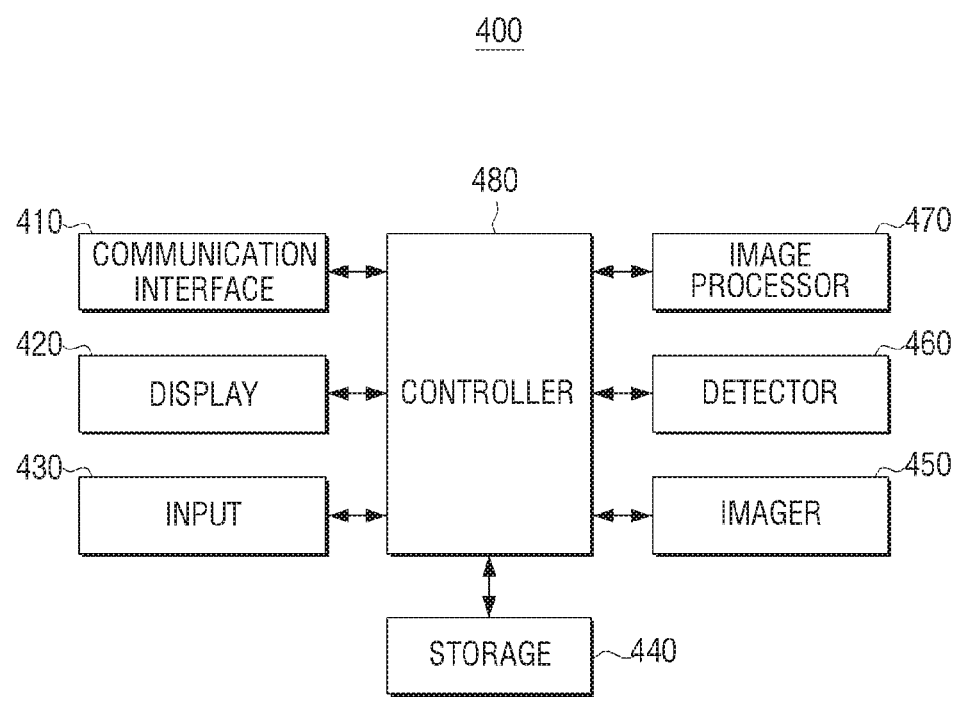
FIG. 60 is a block diagram illustrating a configuration of the display device according to the embodiment of the present disclosure.

FIG. 60 is a block diagram illustrating a configuration of the display device according to the embodiment of the present disclosure.

Referring to FIG. 60, the display device 400 according to the present embodiment is configured to include a communication interface 410, a display 420, an input 430, a storage 440, an imager 450, a detector 460, and an image processor 470, and a controller 480. In this configuration, the display device 400 may be a notebook, a tablet PC, a mobile phone, a smart phone, a PMP, an MP3 player, a smart watch, a monitor, a TV, etc., all of which include a display device.

The communication interface 410 is formed for connecting the display device 400 to external devices (not illustrated) and the display device may be connected to the external device through a local area network (LAN) and an internet network and may be connected to the external devices by a wireless communication (for example, wireless communications such as GSM, UMTS, LTE, and WiBRO) scheme.

Further, the communication interface 410 may communicate with the external devices (not illustrated). In detail, the communication interface 410 may communicate with an NFC tag attached to the portable image-forming device 100 and receive information on the portable image-forming device 100 from the corresponding NFC tag. Here, the information on the portable image-forming device may be information such as kind (or size) information of the instant film used in the portable image-forming device 100, the exposure speed, a required brightness value, and the remaining number of instant films.

Further, the communication interface 410 may receive contents from the external devices (not illustrated). Here, the received contents may be an image and stored in the storage 440 to be described below.

Further, the communication interface 410 may transmit the contents stored in the display device 400 to an external cloud server (not illustrated) through the Internet network and may also transmit and receive information for ordering required consumables to the portable image-forming device 100.

The display 420 displays an image. In detail, the display 420 may display the image at predetermined brightness and a predetermined refresh rate. Further, the display 420 may display the image that is image-processed by the image processor 470 to be described below and adjust the predetermined brightness and/or the refresh rate depending on the control of the controller 480 to be described below to display the image. The display 420 may be implemented as display devices such as active matrix organic light emitting diodes (AMOLEDs) and an LCD. Further, an example of the screen that may be displayed on the display 420 will be described below with reference to FIGS. 61 and 62.

The input 430 includes a plurality of function keys by which the user may set or select various kinds of functions supported by the display device 400. In detail, the input 430 may receive an image display command or receive a printing command on the displayed image from a user. Meanwhile, although the illustrated example illustrates that the display 420 and the input 430 are separately configured from each other, upon the implementation, the display 420 and the input 430 may be implemented as a device that simultaneously performs an input and an output like a touch screen. Further, upon the implementation, a separate physical key may also be provided in the display device 400 along with the touch screen.

The input 430 may select applications (or programs) for a printing operation using the portable image-forming device 100. Further, the input 430 may select an image (or contents) to be printed in the driving state of the corresponding application. Meanwhile, although the present embodiment describes that the application is selected and then the image is selected, upon the implementation, the input 430 may also be implemented in the form that after the user image is selected, the application is driven depending on the user printing command.

Here, the portable image-forming device is a printing device exposing the instant film to the light from the screen displayed on the display 420 and may be the instant printing device having a structure as described above with reference to FIG. 2, the instant printing device according to the embodiment described with reference to FIG. 25, the instant printing device according to the embodiment described with reference to FIG. 39, the instant printing device according to the embodiment described with reference to FIG. 49, the device having the foregoing structure, and the device exposing the instant film using the exposure member 130 manually driven.

Further, the input 430 may receive the printing command on the selected image. Meanwhile, when the input 430 is implemented as the touch screen, the printing command may be received as the printing command when the touch corresponding to the disposition form of the plurality of touch sensors disposed on the portable image-forming device 100 is input.

Further, the input 430 may receive a printing option of the corresponding image. Here, the printing option may be brightness, exposure, chroma, etc., and printing options different therefrom may also be selected.

The storage 440 stores a program for driving the display device 400. In detail, the storage 440 may store a program that is a set of various commands required upon the driving of the display device 400. Here, the program includes operating programs for driving the application programs as well as application programs for providing specific services. Further, the application program may be one for the printing operation using the portable image-forming device.

Further, the storage 440 includes contents. In detail, the storage 440 may store contents received through the communication interface 410 as well as contents (for example, photograph image, moving picture) generated from the imager 450 to be described below.

Further, the storage 440 may store the exposure speed detected by the detector 460 to be described below and may also store the information received from the NFC patch attached to the portable image-forming device 100 through the communication interface 410. Further, the storage 440 may store information on the refresh rate corresponding to the portable image-forming device.

Further, the storage 440 may be implemented as a storage medium in the display device 400 and an external storage medium, for example, a removable disk including a USB memory, a web server though a network, and the like.

The imager 450 photographs an image. In detail, the imager 450 may photograph the exposure position of the portable image-forming device. The photographed result may be transmitted to the detector 460 to be described below.

The detector 460 detects the exposure area of the portable image-forming device 100. In detail, the detector 460 may detect the exposure areas depending on the position of the plurality of touch sensors of the portable image-forming device on the touch screen. Here, the exposure speed refers to the moving speed of the exposure member of the portable image-forming device 100 and may be called a scan speed of the portable image-forming device 100. The detection method will be described below with reference to FIG. 63. In this case, the detector 460 may also use the plurality of touch sensors on the touch screen to detect the disposition direction between the portable image-forming device and the display device.

The detector 460 detects the exposure speed of the portable image-forming device 100. In detail, the detector 460 may detect the exposure speeds depending on the positions of the plurality of touch sensors of the portable image-forming device on the touch screen. The detection method will be described below with reference to FIG. 64. Alternatively, the detector 460 may detect the exposure speed depending on the exposure position photographed by the imager 450. The detected exposure speed may be stored in the storage 440.

The image processor 470 adjusts the size of the image to be displayed on the display 420. In detail, the image processor 470 may adjust the size and position of the image so that the image is displayed in the area of the display 420 corresponding to the exposure area of the portable image-forming device.

Further, the image processor 470 adjusts the brightness of the image displayed on the display 420. In detail, the image processor 470 adjusts a brightness value of an image so that the same light quantity at each exposure position of the portable image-forming device is provided to the instant film.

In more detail, the portable image-forming device according to the present embodiment uses the exposure member 130 manually driven and therefore the moving speed of the exposure member 130 may not be constant upon the exposure. Therefore, to correct the deviation in the exposure speed, the display device 400 according to the present embodiment detects the moving speed (that is, exposure speed) of the exposure member 130 by the detector 460 and adjusts the brightness of the image to have the brightness value corresponding to the detected exposure speed in the direction of the image corresponding to the exposure direction.

For example, when the whole image has the same brightness value, if the moving speed of the exposure member 130 is fast, the exposure in the corresponding section may be insufficient compared to other areas. On the contrary, if the moving speed of the exposure member 130 is slow, the exposure in the corresponding section may be excessive compared to other areas.

Therefore, the image processor 470 according to the present embodiment may adjust the brightness of the images corresponding to the moving speeds of the image areas for each of the plurality of image areas corresponding to the exposure section. For example, the image is divided into an A area, a B area, and a C area, and when the moving speed of the A area is fastest, the B area has an average speed, and the moving speed of the C area is slowest, the image processor 470 corrects the whole image so that B area has the brightness value corresponding to the moving speed of the B area but may correct the image so that the A area has the brightness value higher than the B area and the C area has the brightness value lower than the B area. Meanwhile, to facilitate the above description, adjusting the brightness of the image by dividing the image into three areas is described, but upon the implementation, the image may be divided into at least three areas and the area may also be divided by the number of pixels corresponding to the exposure direction.

Meanwhile, although the case in which the image processor 470 divides the image into the plurality of areas and adjusts the brightness value for each of the plurality of divided areas is described, this is the case in which the detection of the exposure speed is performed before the printing command and when the detection of the exposure speed and the correction of the brightness value depending thereon are performed in real time, the brightness of the whole image corresponding to the exposure speed may also be corrected to meet the detected exposure speed.

The controller 480 controls each component of the display device 400. In detail, if the printing command of the user is input, the controller 480 may control a display 420, a detector 460, and an image processor 470 to perform the printing operation in the portable image-forming device for the image which is being currently displayed.

Further, if the printing command is input, the controller 480 may control the display 420 to display the image in the display area of the display 420 corresponding to the detected exposure area.

Further, if the printing command is input, the controller 480 may adjust the brightness of the display 420 to be the predetermined brightness or more and control the image processor to adjust the brightness of the image depending on the adjusted brightness of the display. The above operation may be performed when the display 420 is implemented as the AMOLED.

Further, if the printing command is input, the controller 480 may control the display 420 to display an image at a refresh rate having a value different from a first value (value in a general operation state) in which the refresh rate of the display 420 is predetermined. In detail, the controller 480 may control the display 420 to display the image at the refresh rate corresponding to the exposure speed of the portable image-forming device.

In more detail, the general display device displays the image at the predetermined refresh rate in displaying the image. By the way, when the moving speed of the exposure member 130 is fast, a black line like a left image a of FIG. 65 may be generated by a cross of the moving speed of the exposure member 130 with the refresh rate. Therefore, manufacturers of the display device 400 or manufacturers of the portable image-forming device may determine refresh rate values that do not generate black lines depending on various moving speeds of the exposure member 130 based on various experiments. Therefore, the controller 480 may control the display 420 to display the image based on the information or the refresh rate corresponding to the detected speed (exposure speed) of the exposure member 130 which are pre-stored in the storage 440. Meanwhile, if the display 420 displays the image in the state in which the refresh rate is 0, the black color as described above is not generated at all and therefore the controller 480 may control the display 420 to display the image in the state in which the refresh rate is 0.

Further, if the printing command is input and the predetermined time lapses, the controller 480 may change the changed refresh rate to an original state. Meanwhile, although the present embodiment describes that the refresh rate is changed when the predetermined time lapses, but upon the implementation, when the touch corresponding to the disposition form of the plurality of touch sensors is no more detected, the refresh rate may be changed. That is, when it is detected that the portable image-forming device and the display device are spaced apart from each other, an embodiment may also be implemented in the form that the refresh rate is changed to the original state.

The display device 400 according to the present embodiment may perform the operations such as the image quality correction even in the printing operation using the portable image-forming device exposing the instant film using the exposure member manually driven. In particular, the deterioration in image quality that may occur due to the exposure member manually operated may be corrected. Further, the deterioration in image quality due to the cross of the exposure speed of the exposure member with the refresh line may be corrected.

Figure 61:
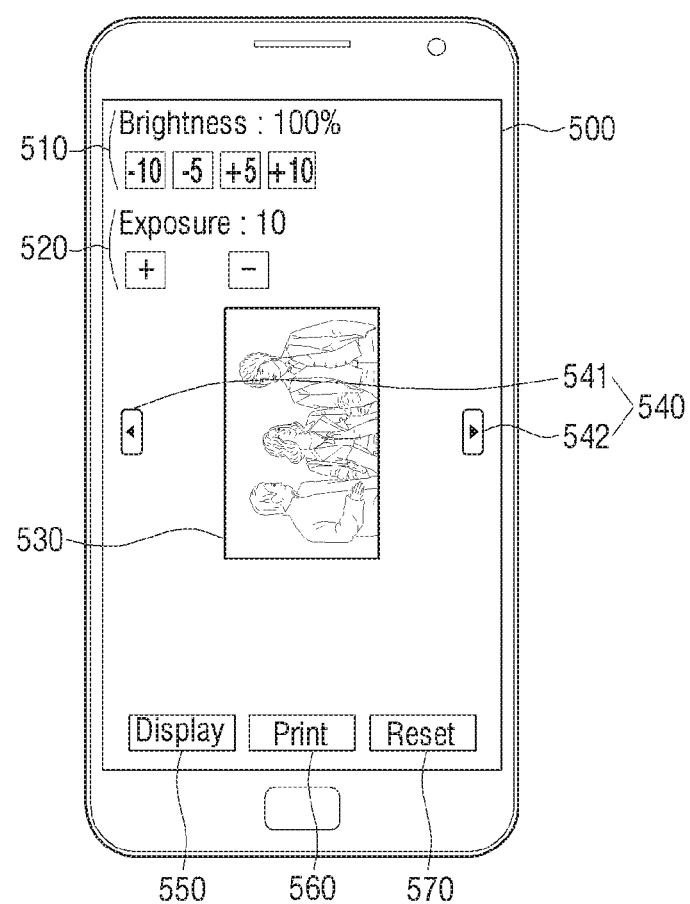
FIGS. 61 and 62 are diagrams illustrating an example of a user interface window that may be displayed in the display of FIG. 60.
Figure 62:
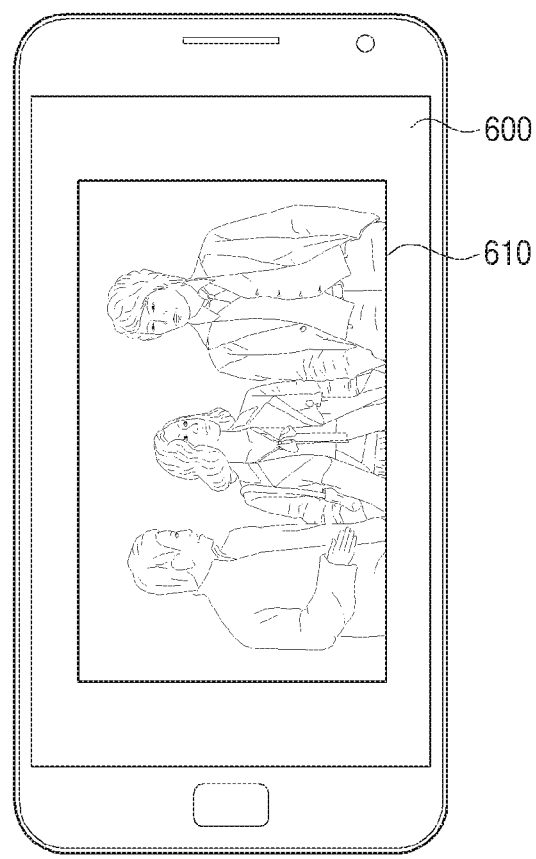

FIGS. 61 and 62 are diagrams illustrating an example of a user interface window that may be displayed in the display of FIG. 60.

Referring to FIG. 61, a user interface window 500 includes a brightness adjustment area 510, an exposure adjustment area 520, an image display area 530, an image selection area 530, a display area 550, a printing area 560, and a reset area 570.

The brightness adjustment area 510 is an area in which the brightness to be applied to the selected image is selected from the user. When the user selects the brightness adjustment area, the display device reflects the selected brightness value to adjust the brightness of the displayed image.

The exposure adjustment area 520 is an area in which what the selected image is continuously printed for few seconds is selected. For example, after the image illustrated in FIG. 62 is displayed by the printing command of the user, if the set time from the user lapses, the screen may be recovered to the screen as illustrated in FIG. 61.

The image selection area 530 is an area in which the currently selected image is displayed.

The image selection area 530 is an area in which the display of an image before the image which is being currently displayed among the images stored in the storage 440 is selected or the display of an image after the image which is being currently displayed is selected.

The display area 550 is an area in which a user command displaying a list of the printable images is received.

The printing area 560 is an area in which the printing command for the image selected in the image selection area 530 is received. If the user selects the printing area 560, the image selected in the image selection area 530 is adjusted to the state in which it may be printed without the deterioration in image quality in the portable image-forming device and thus is displayed as illustrated in FIG. 62.

A reset area 570 is an area in which the user receives a command for initializing the pre-selected options.

Figure 63:
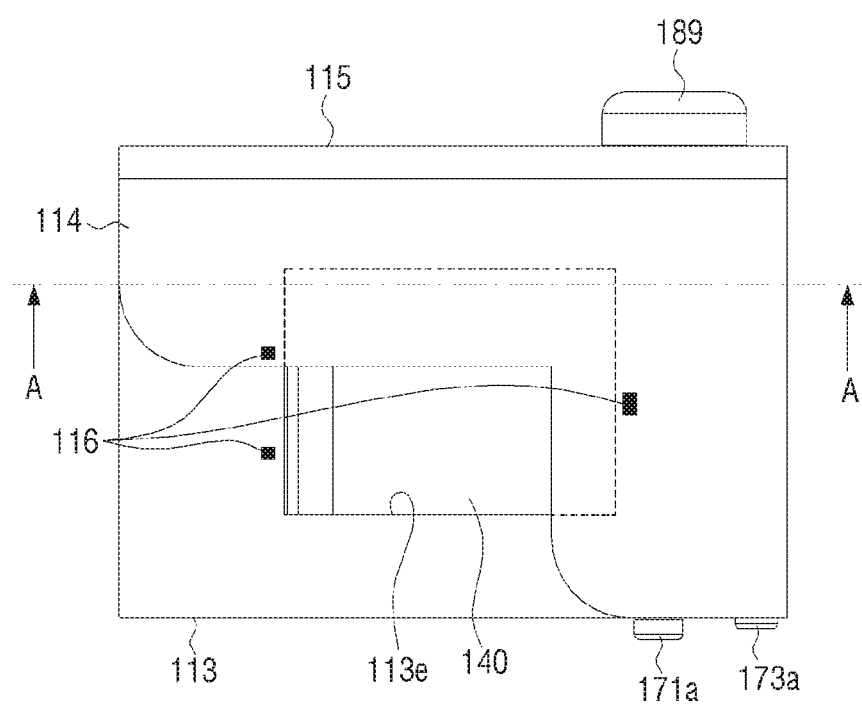
FIG. 63 is a diagram illustrating a form of a portable image-forming device according to an embodiment of the present disclosure.

FIG. 63 is a diagram illustrating a form of a portable image-forming device according to a embodiment of the present disclosure.

Referring to FIG. 63, a portable image-forming device 100' according to a embodiment of the present disclosure further includes a plurality of touch sensors 116 in addition to the components of the portable image-forming device 100 according to the embodiment of the present disclosure. The portable image-forming device 100' according to a embodiment of the present disclosure has the same components as the embodiment except that the plurality of touch sensors 116 are additionally provided and therefore the description of other components will be omitted.

The plurality of touch sensors 116 are disposed around the incident window 113*e*. Therefore, when the portable image-forming device 100' and the display device 400 are attached as illustrated in FIG. 21 for printing, the touch screen of the display device 400 may detect the positions of the plurality of touch sensors 116 to detect the size of the incident window 113*e*. For example, when the display device 400 knows that the touch sensor is spaced apart from the incident window 113*e* by 5 mm, the display device 400 may know the size of the incident window by subtracting 10 mm from the distance between the detected two positions. Further, if the plurality of touch sensors are disposed in the area in which the position of the incident window 113*e* (for example, positioned at a vertex of the incident window) may be figured out, the display device 400 may understand the position of the incident window based on the detected position.

Further, the plurality of touch sensors 116 may be disposed in the form in which the disposition direction of the display device for the instant printing device may be understood. For example, when the display device is attached as illustrated in FIG. 21, one touch is detected at the upper portion of the display device 400 and two touches are detected at the lower portion thereof. If the upper/lower portions of the display device contact each other while being changed to each other, two touches may be detected at the upper portion of the touch screen and one touch may be detected at the lower portion of the touch screen. Therefore, the display device 400 may recognize the attachment form between the display device 400 and the portable image-forming device 100' based on the disposition form of the touch sensor 116 and in the case of the attachment form that does not meet the manufacturers' intention, may output an error message (voice) or rotate the displayed image by 180° and output it.

Further, the plurality of touch sensors 116 may be used to understand whether the display device is accurately disposed on the instant printing device. For example, when the two devices accurately meet each other, if the touch position at the upper portion is at specific coordinates but the currently detected touch position is not at the specific coordinates, the display device may output that the touch position is not currently accurately disposed and when the display device is disposed at the accurate position, may inform that the touch position is properly disposed.

Figure 64:
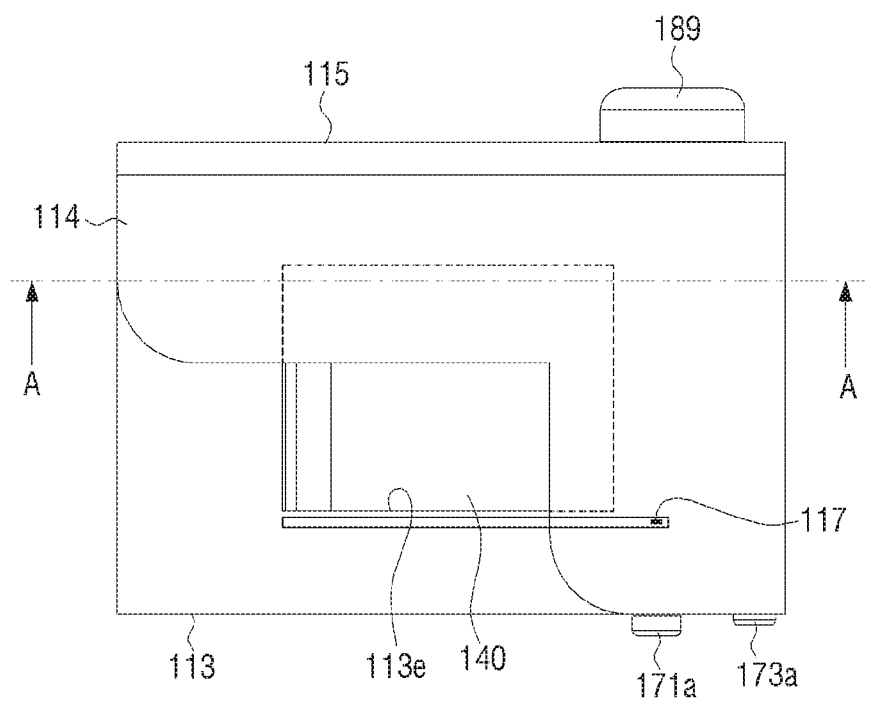
FIG. 64 is a diagram illustrating a form of a portable image-forming device according to an embodiment of the present disclosure.

FIG. 64 is a diagram illustrating a form of a portable image-forming device according to a embodiment of the present disclosure.

Referring to FIG. 64, a portable image-forming device 100" according to a embodiment of the present disclosure further includes the touch sensor 117 moving to correspond to the movement of the exposure member 130 in addition to the components of the portable image-forming device 100 according to the embodiment of the present disclosure. The portable image-forming device 100' according to a embodiment of the present disclosure has the same components as the embodiment except that the touch sensor 117 is additionally provided and therefore the description of other components will be omitted.

The touch sensor 117 is disposed around the incident window 113e and moves to correspond to the movement of the exposure member 130. Therefore, when the portable image-forming device 100" and the display device 400 are attached as illustrated in FIG. 21 for printing, the touch screen of the display device 400 may detect the position of the touch sensor 117. In this case, when the user manually drives the exposure member 130, the display device 400 detects the movement of the touch sensor and may detect the moving speed (exposure speed) of the exposure member 130 based on the detected movement of the touch sensor.

Figure 65:
FIG. 65 is a diagram illustrating a print state of the instant film depending on brightness of the display.
Figure 65:
Figure 66:
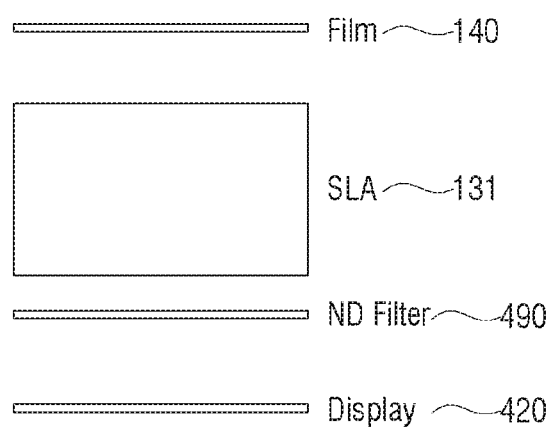
FIG. 66 is a diagram illustrating an example of adjusting the brightness of the display.

FIG. 65 is a diagram illustrating the printing state of the instant film depending on the brightness value when the display 420 is implemented as the AMOLED. In detail, the left image is a printing image when the brightness of the AMOLED is set to be 71% and the right image is a printing image when the brightness of the AMOLED is set to be 72%.

The AMOLED is linearly operated for the brightness in the high luminance area and is operated by being applied with an AMOLED impulsive driving (AID) function in middle to low luminance areas and implements a change in brightness by applying an AID fixing section (off duty 40%) in the middle luminance and a variable AID section (off duty change) in a low luminance area (110cd or less).

As such, the AMOLED has different driving schemes for each luminance section, and therefore to perform the printing operation in the portable image-forming device, the display 420 is preferably controlled to operate the AMOLED in the high luminance area, that is, to be operated at the brightness value of 72% or more.

However, if the brightness value of the display device 420 is increased, the brightness value of the print output is also increased. Therefore, to correct it, as illustrated in FIG. 49, an ND filter may be provided between the exposure member 130 and the display 420 to reduce a light quantity transferred to the portable image-forming device 100.

Alternatively, the image may be processed so that the light quantity in the portable image-forming device 100 is equal and the brightness of the image is dark to correspond to the adjusted brightness of the display 420.

Figure 67:
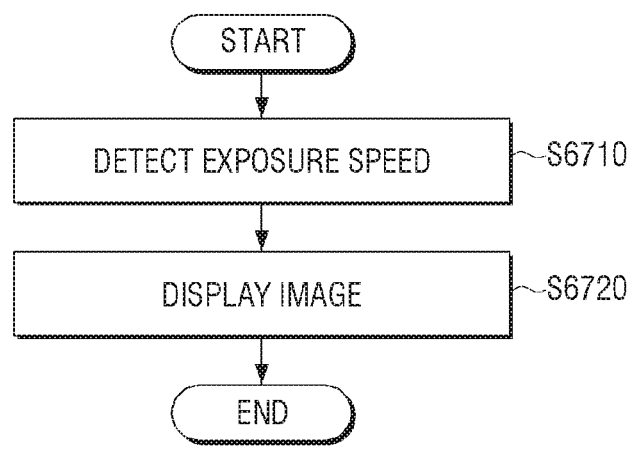
FIG. 67 is a flow chart for describing a print control method according to an embodiment of the present disclosure.

FIG. 67 is a flow chart for describing a print control method according to a embodiment of the present disclosure.

Referring to FIG. 67, first, the exposure speed of the portable image-forming device which exposes an instant film to light using light from a screen displayed on the display is detected (S6710). In detail, the detector 460 may detect the exposure speed depending on the position of the touch sensor of the portable image-forming device on the touch screen. The detection method is described above with reference to FIG. 64, and therefore the overlapping description thereof will be omitted. Upon the implementation, the exposure position may be photographed to detect the exposure speed based on the change in the exposure position in the photographed image. Here, the portable image-forming device is a printing device which exposes the instant film to light using light from the screen displayed on the display 420.

Further, the image of which the brightness is adjusted is displayed by adjusting the brightness of the image displayed on the display depending on the detected exposure speed (S6720). In detail, the brightness value of the image may be adjusted so that the same light quantity at each exposure position of the portable image-forming device is provided to the instant film.

The display control method according to the embodiment of the present disclosure as described above may correct the deterioration in image quality that may occur due to the exposure member 130 manually operated. The display control method as illustrated in FIG. 50 may be executed on the display device having the configuration of FIG. 60 and may also be executed on the display device having other configuration.

Further, the display control method as described above may be implemented in programs (or applications) including algorithm which may be executed in a computer and the programs may be provided while being stored in a non-transitory computer readable medium.

The non-transitory computer readable medium is not a medium that stores data therein for a while, such as a register, a cache, a memory, or the like, but refers to a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Figure 68:
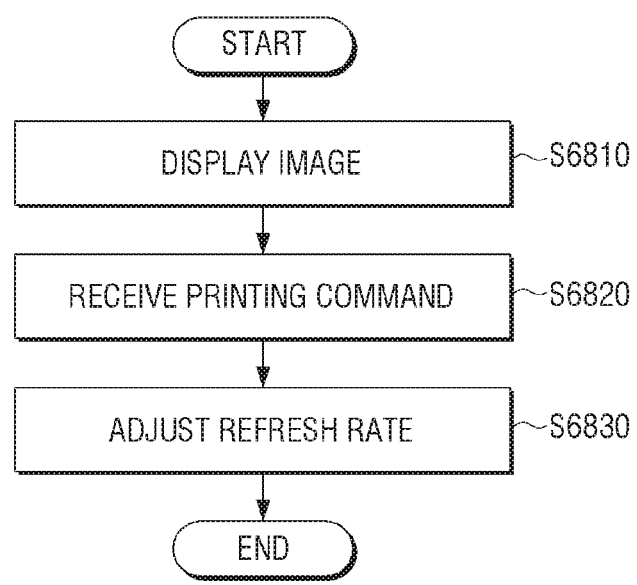
FIG. 68 is a flow chart for describing a print control method according to an embodiment of the present disclosure.

FIG. 68 is a flow chart for describing a print control method according to a embodiment of the present disclosure.

Referring to FIG. 68, the image is displayed at the predetermined refresh rate (S6810).

Further, the printing command is received (S6820). The printing command may be the selection of the predetermined area on the touch screen and may also be performed by the detection of the touch sensor included in the portable image-forming device based on the contact with the portable image-forming device. Meanwhile, the fact that the printing command is received by using the connection on the touch screen of the touch sensor is described above, but upon the implementation, in addition to the touch sensor, a lid switch may also be used.

Further, if the printing command is input, the predetermined refresh rate is displayed and thus the image is adjusted at the refresh rate different from the predetermined refresh rate (S6830). In detail, the refresh rate of the display may be changed so that the image is displayed at the refresh rate corresponding to the exposure speed of the portable image-forming device.

The display control method according to the embodiment of the present disclosure as described above may correct the deterioration in image quality due to the cross of the exposure speed of the exposure member with the refresh line. The display control method as illustrated in FIG. 68 may be executed on the display device having the configuration of FIG. 60 and may also be executed on the display device having other configuration.

Further, the display control method as described above may be implemented in programs (or applications) including algorithm which may be executed in a computer and the programs may be provided while being stored in a non-transitory computer readable medium.

Although embodiments of the present disclosure have been shown and described hereinabove, the present disclosure is not limited to specific embodiments described above, but may be variously modified by those skilled in the art to which the present disclosure pertains without departing from the scope and spirit of the disclosure as disclosed in the accompanying claims. In addition, such modifications should also be understood to fall within the scope and spirit of the present disclosure.

The invention claimed is:

1. A display apparatus, comprising:
  a display including a touch screen to display an image;
  a detector to detect, by sensing on the touch screen a touch of a touch sensor of a portable image-forming apparatus while the touch sensor moves along the touch screen, an exposure speed of a movable exposure member of the portable image-forming apparatus that exposes an instant film to light using light emitted from the image displayed on the display; and
  an image processor to adjust a brightness of the image displayed on the display based on the detected exposure speed to provide a same light quantity at each exposure position among a plurality of exposure positions of the movable exposure member to the instant film, to thereby compensate for a deviation in the exposure speed of the movable exposure member.

2. The display apparatus as claimed in claim 1, wherein the touch sensor corresponds to an exposure position of the movable exposure member, and
  the detector is to detect the exposure speed of the movable exposure member based on the position of the touch sensor on the touch screen.

3. The display apparatus as claimed in claim 2, wherein the image processor is to adjust the brightness of the image in real time based on the exposure speed detected in real time.

4. The display apparatus as claimed in claim 1, further comprising:
  an imager to photograph an exposure position of the movable exposure member,
  wherein the detector is further to detect the exposure speed of the movable exposure member based on the photographed exposure position of the movable exposure member.

5. The display apparatus as claimed in claim 1, further comprising:
  a storage to store the detected exposure speed,
  wherein the image processor is to adjust the brightness of the image based on the stored exposure speed.

6. The display apparatus as claimed in claim 1, wherein the exposure member is manually driven.

7. The display apparatus as claimed in claim 1, wherein the image processor is to divide the image into a plurality of areas corresponding to an exposure direction of the movable exposure member, and
  the image processor is to adjust the brightness of each of the plurality of areas to provide the same light quantity at each exposure position among the plurality of exposure positions of the of the movable exposure member to the instant film.

8. The display apparatus as claimed in claim 1, wherein the image processor is to adjust the brightness of the image to have a brightness value corresponding to the detected exposure speed in a direction of the image corresponding to an exposure direction of the movable exposure member.

9. The display apparatus as claimed in claim 1, wherein the detector is to detect the exposure speed of the movable exposure member for a plurality of exposure sections, respectively, and
  the image processor is to adjust the brightness for a plurality of image areas of the image based on the detected exposure speeds, for the plurality of exposure sections which respectively correspond to the plurality of image areas.

10. The display apparatus as claimed in claim 1, further comprising:
  a controller to adjust a brightness of the display to be at least a predetermined brightness and to control the image processor to adjust the brightness of the image based on the adjusted brightness of the display, upon receiving a printing command.

11. The display apparatus as claimed in claim 1, further comprising:
  a controller to control the display to display the image at a refresh rate different from a predetermined refresh rate upon receiving a printing command.

12. The display apparatus as claimed in claim 11, wherein the controller is to control the display to display the image at the predetermined refresh rate.

13. The display apparatus as claimed in claim 11, wherein the controller is to control the display to display the image at a refresh rate corresponding to the detected exposure speed of the movable exposure member.

14. The display apparatus as claimed in claim 1, wherein the image processor is to divide the image into a plurality of areas, including a first area, a second area, and a third area, and
  when the exposure speed of the movable exposure member is higher with respect to the first area compared to the second and third areas, and the exposure speed of the movable exposure member is higher with respect to the second area compared to the third area and less compared to the first area, the image processor is to adjust a brightness value of the first area to be higher than a brightness value of the second and third areas, and to adjust a brightness value of the third area to be lower than a brightness value of the first and second areas.

15. A display control method of a display apparatus, the method comprising:
    displaying an image on a touch screen of the display apparatus;
    sensing, on the touch screen, a touch of a touch sensor of a portable imaqe-forming apparatus while the touch sensor moves along the touch screen;
    detecting based on the sensing of the touch of the touch sensor, by at least one processor of the display apparatus, an exposure speed of a movable exposure member of the a portable image-forming apparatus that exposes an instant film to light using light emitted from the image displayed on the display;
    adjusting, by the at least one processor of the display apparatus, a brightness of the image displayed on the display based on the detected exposure speed to provide a same light quantity at each exposure position among a plurality of exposure positions of the movable exposure member to the instant film, to thereby compensate for a deviation in the exposure speed of the movable exposure member; and
    displaying, on the display of the display apparatus, the image of which the brightness is adjusted.

16. A display apparatus, comprising:
    a display to display an image;
    an imager to photograph exposure positions of a movable exposure member of a portable image-forming apparatus that exposes an instant film to light using light emitted from the image displayed on the display,
    a detector to detect an exposure speed of the movable exposure member based on the exposure positions of the movable exposure member photographed by the image; and
    an image processor to adjust a brightness of the image displayed on the display based on the detected exposure speed so that a same light quantity at each exposure position of the movable exposure member is provided to the instant film to thereby compensate for a deviation in the exposure speed of the movable exposure member.

* * * * *

UNITED STATES PATENT AND TRADEMARK OFFICE
CERTIFICATE OF CORRECTION

PATENT NO. : 10,110,758 B2
APPLICATION NO. : 15/038610
DATED : October 23, 2018
INVENTOR(S) : Yong-shik Park et al.

Page 1 of 1

It is certified that error appears in the above-identified patent and that said Letters Patent is hereby corrected as shown below:

In the Claims

In Column 44, Line 21, in Claim 7, delete "of the of the" and insert -- of the --, therefor.

In Column 45, Line 9, in Claim 15, delete "imaqe-forming" and insert -- image-forming --, therefor.

In Column 45, Line 14, in Claim 15, delete "the a" and insert -- the --, therefor.

Signed and Sealed this
Nineteenth Day of February, 2019

Andrei Iancu
*Director of the United States Patent and Trademark Office*